US011529711B2

(12) United States Patent
Zhong et al.

(10) Patent No.: US 11,529,711 B2
(45) Date of Patent: Dec. 20, 2022

(54) SANDING MACHINE, OPERATING METHOD THEREOF AND WORKING BASEPLATE DISASSEMBLY-ASSEMBLY METHOD

(71) Applicant: Positec Power Tools (Suzhou) Co., Ltd., Jiangsu (CN)

(72) Inventors: Hongfeng Zhong, Suzhou (CN); Yimin Sun, Suzhou (CN); Shisong Zhang, Suzhou (CN)

(73) Assignee: POSITEC POWER TOOLS (SUZHOU) CO., LTD., Jiangsu (CN)

( * ) Notice: Subject to any disclaimer, the term of this patent is extended or adjusted under 35 U.S.C. 154(b) by 938 days.

(21) Appl. No.: 16/221,847

(22) Filed: Dec. 17, 2018

(65) Prior Publication Data

US 2019/0247973 A1 Aug. 15, 2019

Related U.S. Application Data

(63) Continuation of application No. PCT/CN2017/090664, filed on Jun. 28, 2017.

(30) Foreign Application Priority Data

Jun. 28, 2016 (CN) .......................... 201620658566.8
Aug. 15, 2016 (CN) .......................... 201610667847.4
(Continued)

(51) Int. Cl.
*B24B 23/02* (2006.01)
*B24B 55/00* (2006.01)
(Continued)

(52) U.S. Cl.
CPC ............ *B24B 23/022* (2013.01); *B24B 23/02* (2013.01); *B24B 55/00* (2013.01); *F16P 3/00* (2013.01); *B25F 5/00* (2013.01)

(58) Field of Classification Search
CPC ....... B24B 23/022; B24B 23/02; B24B 55/00; F16P 3/00; B25F 5/00
See application file for complete search history.

(56) References Cited

U.S. PATENT DOCUMENTS

| 5,482,499 | A | 1/1996 | Satoh |
| 6,132,300 | A | 10/2000 | Martin |

(Continued)

FOREIGN PATENT DOCUMENTS

| CN | 1115232 | 7/2003 |
| CN | 101804597 A | 8/2010 |

(Continued)

OTHER PUBLICATIONS

State Intellectual Property Office of the P.R. China, International Search Report and Written Opinion (English Translation included) of PCT/CN2017/090664 dated Sep. 15, 2017.

*Primary Examiner* — Carlos Amaya
(74) *Attorney, Agent, or Firm* — Middleton Reutlinger

(57) ABSTRACT

The present invention relates to a sander, and a method for disassembling or installing a working head of the sander. The sander includes: a main body, including a housing, a motor disposed in the housing, a switch mechanism for controlling the motor includes a switch, and a drive component driven by the motor to rotate; and a working head adapted to the drive component. The main body further includes an interlocking mechanism, the interlocking mechanism includes an operation member movably disposed relative to the housing, the operation member is operably shifted between a first state and a second state, when the operation member is in the first state, the interlocking mechanism allows the switch to be triggered, when the switch is in a triggered state, the operation member is prevented from being shifted from the first state to the second state; and when the operation member is in the (Continued)

second state, the interlocking mechanism prevents the switch from being triggered. The sanding machine of the present invention has high security and can be operated conveniently.

6 Claims, 51 Drawing Sheets

(30) Foreign Application Priority Data

| Aug. 15, 2016 | (CN) | 201610668154.7 |
|---|---|---|
| Aug. 15, 2016 | (CN) | 201620881343.8 |
| Sep. 9, 2016 | (CN) | 201621046952.8 |
| Nov. 30, 2016 | (CN) | 201621305117.1 |
| Dec. 28, 2016 | (CN) | 201611237210.8 |

(51) Int. Cl.
*F16P 3/00* (2006.01)
*B25F 5/00* (2006.01)

(56) References Cited

U.S. PATENT DOCUMENTS

| 8,821,220 | B2 | 9/2014 | King et al. | |
|---|---|---|---|---|
| 2003/0190877 | A1* | 10/2003 | Gallagher | B24B 55/00 |
| | | | | 451/344 |
| 2015/0075830 | A1* | 3/2015 | Zhang | B24B 23/022 |
| | | | | 173/213 |
| 2015/0118945 | A1 | 4/2015 | Kuehne et al. | |

FOREIGN PATENT DOCUMENTS

| CN | 102896619 | 1/2013 |
|---|---|---|
| CN | 103068530 | 4/2013 |
| CN | 103506923 | 1/2014 |
| CN | 103862351 | 6/2014 |
| CN | 204621741 U | 9/2015 |
| CN | 105538241 | 5/2016 |
| CN | 107745312 | 3/2018 |
| EP | 2688715 | 1/2014 |
| WO | 2012040891 | 4/2012 |

\* cited by examiner

SANDING MACHINE, OPERATING METHOD THEREOF AND WORKING BASEPLATE DISASSEMBLY-ASSEMBLY METHOD

BACKGROUND

Technical Field

The present invention relates to a handheld electric grinding tool, and in particular, to a sander, and the present invention further relates to a method for disassembling or installing a working head of the sander.

Related Art

Existing sanding machines include round sanding machines, flat sanding machines, and the like. An output shaft of a round sanding machine drives a grinding baseboard to perform round sanding motion, that is, regular orbital motion of revolution and rotation, to grind a relatively large amount of materials. Rotary motion of a grinding baseboard of a flat sanding machine is limited. Therefore, the grinding baseboard performs flat sanding motion, that is, can only perform regular orbital motion of revolution, and is suitable for grinding a relatively small amount of materials, for example, for precision machining or fine machining. If a user desires to have two processing abilities, that is, rough grinding and fine grinding, two tools (or baseplates) need to be prepared for working, and a working situation can be finished only when a tool (a baseboard) is replaced during working, so that a sanding operation is troublesome and complicated.

U.S. Pat. No. 6,132,300 discloses a sanding machine with a replaceable working baseband, and the sanding machine uses a fastener to connect and lock the working baseband and a main body of the sanding machine. During a process of replacing the working baseplate, first, the fastener needs to be loosened till the working baseplate is disassembled or separated from the main body portion, a new working baseplate replaces the working baseplate to be fitted to the main body, and then, the new working baseplate and the main body are connected and fastened through the fastener.

In the prior art, in addition to the working baseplate and the main body of the sanding machine, a third member is further used in an operation process of the replaceable working baseplate, and needs to be completely separated from the main body of the sanding machine during an operation process; therefore, the third member is easily lost. Furthermore, during a process of installing the working baseplate, the third member needs to be fastened to be positioned again, and the installation process is very troublesome and the working efficiency is low.

In addition, in the prior art, during the process of replacing the working baseplate, if an operator unconsciously touches a trigger member to trigger the switch, a motor will drive an output shaft to rotate at a high speed, and in this case, an operator of a handheld working baseplate is easily hurt. Therefore, security of the sanding machine is relatively low.

Based on this, it is necessary to improve the security problem possibly generated in the process of replacing the working baseplate in the prior art.

SUMMARY

Regarding the defect in the prior art, the present invention provides a sanding machine that is used securely.

The present invention resolves the technical problem by using the following technical solution. A sanding machine includes: a main body, including a housing, a motor disposed in the housing, a switch mechanism for controlling the motor, and a drive component driven by the motor to rotate; and a working head adapted to the drive component; where the main body further includes an interlocking mechanism, the interlocking mechanism includes an operation member movably disposed relative to the housing, the operation member is operably shifted between a first state and a second state, when the operation member is in the first state, the interlocking mechanism allows a switch to be triggered, when the switch is in a triggered state, the operation member is prevented from being shifted from the first state to the second state; and when the operation member is in the second state, the interlocking mechanism prevents the switch from being triggered.

Since the sanding machine uses the interlocking mechanism, when the working head is not installed in place, the switch cannot be started, and when the switch is started, the working head cannot be disassembled, to ensure security during a process of using the sanding machine, including the installation process of the working head.

Preferably, the switch mechanism includes a trigger member and the switch, the interlocking mechanism includes a first interlocking member that is selectively adapted to or separated from the operation member; when the operation member is in the first state, the first interlocking member is adapted to the operation member, and allows the trigger member to trigger the switch, and when the switch is in a triggered state, the operation member is prevented from being separated from the first interlocking member; and when the operation member is in the second state, the first interlocking member is separated from the operation member, and the first interlocking member prevents the trigger member from triggering the switch.

Preferably, the interlocking mechanism further includes an abutting member capable of abutting against or getting separated from the first interlocking member, when the operation member is in the first state, the abutting member is separated from the first interlocking member, and when the operation member is in the second state, the abutting member abuts against the first interlocking member, to prevent the trigger member from triggering the switch.

Preferably, the abutting member and the trigger member are integrally formed

Preferably, the operation member is disposed reversibly relative to the housing.

Preferably, the operation member is set as a cam wrench, the cam wrench includes a handle portion and a cam portion, the cam portion is connected to the housing, and the handle portion includes a free end.

Preferably, the housing includes a head shell portion for accommodating the motor and a holding portion provided with a handle, the operation member is disposed at the head portion, and the trigger member is disposed at the holding portion. The trigger member is slidably disposed along an extending direction of the holding portion, when the first interlocking member is adapted to the operation member, the first interlocking member allows the trigger member to slide; and when the first interlocking member is separated from the operation member, the first interlocking member prevents the trigger member from sliding.

Preferably, the first interlocking member is disposed pivotally relative to the housing, the interlocking mechanism further includes an elastic member abutting the first interlocking member, when the operation member is adapted to the first interlocking member, the first interlocking member overcomes a biasing force of the elastic member to pivot from an initial position to a working position; and when the operation member is separated from the first interlocking member, the first interlocking member restores to the initial position from the working position under an action of the biasing force of the elastic member.

Preferably, the first interlocking member includes a first end capable of abutting the abutting member and a second end capable of getting engaged with the operation member; when the first end abuts against the abutting member, the first interlocking member prevents the trigger member from moving along a first direction; when the second end is engaged with the operation member, the first interlocking member allows the trigger member to move along the first direction to trigger the switch, and when the switch is in a triggered state, the first interlocking member prevents the operation member from pivoting. An urging portion is disposed at the second end, a clamping groove is disposed at a position, corresponding to the urging portion, on the operation member, and when the second end is engaged with the operation member, the urging portion extends into the clamping groove.

Preferably, the working head includes at least two baseplates having different shapes and one of the baseplates is selected to be separated from or fitted to the drive component.

Another optional technical solution is as follows: a sanding machine includes a main body, including a housing, a motor disposed in the housing, a switch mechanism for controlling the motor, and a drive component driven by the motor to rotate, where the motor has a motor axis; and a working head, selectively separated from or fitted to the drive component; where the sanding machine further includes an interlocking mechanism, the interlocking mechanism includes an operation member movably disposed relative to the housing, the operation member is operably shifted between a first state and a second state, when the operation member is in the first state, the interlocking mechanism allows a switch to be triggered, when the switch is in a triggered state, the working head is prevented from being separated from or fitted to the main body; and when the operation member is in the second state, the interlocking mechanism allows the working head to be separated from or fitted to the main body and prevents the switch from being triggered.

Preferably, the switch mechanism includes a trigger member and the switch, the interlocking mechanism includes a first interlocking member that is selectively fitted to or separated from the operation member; when the operation member is in the first state, the first interlocking member is fitted to the operation member, and allows the trigger member to trigger the switch, and when the switch is in a triggered state, the operation member is prevented from being separated from the first interlocking member; and when the operation member is in the second state, the first interlocking member is separated from the operation member, and the first interlocking member prevents the trigger member from triggering the switch.

Preferably, the interlocking mechanism further includes an abutting member capable of abutting against or getting separated from the first interlocking member, when the operation member is in the first state, the abutting member is separated from the first interlocking member, and when the operation member is in the second state, the abutting member abuts against the first interlocking member, to prevent the trigger member from triggering the switch.

Preferably, the abutting member and the trigger member are integrally formed

Preferably, the first interlocking member is capable of pivotally moving between an initial position at which the first interlocking member is separated from the operation member and a working position at which the first interlocking member is fitted to the operation member. A pivot axis of the first interlocking member is perpendicular to the first interlocking member.

Preferably, the first interlocking member includes a first end close to the trigger member and a second end close to the operation member, when the first interlocking member is at an initial position, the first end abuts against the trigger member to prevent the trigger member from moving; and when the first interlocking member is at a working position, the first end stops abutting the trigger member to allow the trigger member to move, to trigger the switch, and the second end is engaged with the operation member. When the trigger member moves to a position for triggering the switch, the trigger member abuts against the first end to prevent the first interlocking member from moving.

Preferably, the interlocking mechanism further includes a second interlocking member disposed between the trigger member and the working head, the second interlocking member moves between a first position close to the trigger member and a second position away from the trigger member; when the working head is fitted to the main body, the second interlocking member is at the second position and allows the trigger member to move; and when the working head is separated from the main body, the second interlocking member is at the first position to prevent the trigger member from moving.

Preferably, the second interlocking member performs linear motion between the first position and the second position. The second interlocking member performs linear motion parallel to the motor axis. The second interlocking member is disposed parallel to the motor axis.

Preferably, the housing includes a head shell portion for accommodating the motor and a holding portion provided with a handle, the operation member is disposed at the head shell portion, and the trigger member is disposed at the holding portion. The trigger member is disposed slidably along an extension axis of the holding portion.

Preferably, the operation member is disposed pivotally relative to the housing when being shifted between the first state and the second state. A pivot axis of the operation member is perpendicular to the operation member.

Preferably, the operation member is set as a cam wrench, the cam wrench includes a handle portion and a cam portion, and the cam portion is connected to a pivot of the housing.

Preferably, the main body includes a drive component driven by the motor to rotate, and the drive component includes a tension ring that is fitted to the working head and the operation member drives the tension ring to perform linear motion. The main body further includes a transmission device connected to the operation member and the tension ring, and through the transmission device, the operation member drives the tension ring to perform linear motion parallel to the motor axis.

Preferably, the drive component further includes a support disc for supporting the tension ring and an elastic member disposed between the tension ring and the support disc, and the elastic member provides a biasing force for moving toward the high position to the tension ring.

Preferably, when the operation member is fitted to the first interlocking member, the tension ring is at a high position close to the motor; and when the operation member is separated from the first interlocking member, the tension ring is at a low position away from the motor, so that the working head is operably fitted to or separated from the tension ring.

Preferably, a first fitting member is disposed on the tension ring, a second fitting member for clamping the first fitting member is disposed on the working head, and when the working head is fitted to the tension ring, the first fitting member and the second fitting member at least partially overlap along an axial direction of a motor shaft.

Preferably, when the operation member is pivoted from an opening position at which the operation member is separated from the first interlocking member to a closing position at which the operation member is fitted to the first interlocking member, the tension ring moves from the low position to the high position, so that the working head fitted to the tension ring is locked tightly on the main body.

Another objective of the present invention is to provide a method for installing a working head of a sanding machine conveniently and rapidly.

The present invention resolves the technical problem by using the following technical solution. The method for installing a working head of a sanding machine includes the following operation steps: providing a main body of the sanding machine, where the main body includes a housing, a motor disposed in the housing, and an interlocking mechanism, the motor has a motor axis, the interlocking mechanism includes an operation member capable of being shifted between a first state and a second state, when the operation member is in the first state, the interlocking mechanism allows a switch to be triggered; and when the operation member is in the second state, the interlocking mechanism prevents the switch from being triggered; providing a working head, where the working head is capable of being fitted to the main body; operating the operation member to be in the second state; moving the working head along a direction of the motor axis to be fitted to the main body; and operating the operation member to be in the second state.

Preferably, operating the operation member is pivoting the operation member.

Yet another objective of the present invention is to provide a method for disassembling a working head of a sanding machine conveniently and rapidly.

The present invention resolves the technical problem by using the following technical solution. A method for disassembling a working head of a sanding machine includes the following operation steps: providing a sanding machine, where the sanding machine includes a main body and a working head connected to the main body, the main body includes a housing, a motor disposed in the housing, and an interlocking mechanism, the motor has a motor axis, the interlocking mechanism includes an operation member capable of being shifted between a first state and a second state, when the operation member is in the first state, the interlocking mechanism allows a switch to be triggered, when the operation member is in the second state, the interlocking mechanism prevents the switch from being triggered; operating the operation member to be in the second state; and moving the working head along a direction of the motor axis to be separated from the main body.

Preferably, operating the operation member is pivoting the operation member.

The present invention further provides a sanding machine that is used conveniently.

The present invention resolves the technical problem by using the following technical solution. A sanding machine includes a main body portion and a working head connected to the main body portion, the main body portion includes a housing, a motor accommodated in the housing, and a drive component driven by the motor, the motor has a motor shaft, the drive component can rotate around an eccentric axis and an axis of the motor shaft or around the eccentric axis and an axis of an output shaft forming an angle with the axis of the motor shaft, the working head is detachably fitted to the drive component, the drive component includes a first clamping member, the working head includes a second clamping member disposed corresponding to the first clamping member, the first clamping member and the second clamping member are clamped axially along the output shaft, to prevent the working head from being separated from the drive component, and the first clamping member and the second clamping member are disconnected along the output shaft, to allow the working head to be separated from the drive component.

Preferably, the first clamping member includes several first clamping options disposed circumferentially around the eccentric axis.

Preferably, the drive component further includes an output head body, the first clamping member can move between a first position and a second position relative to the output head body, at the first position, the first clamping member can be clamped with the second clamping member, and at the second position, the first clamping member allows the second clamping member to be disconnected.

Preferably, the first clamping member moves axially along the output shaft. One optional solution is that, the first clamping member pivotally rotates relative to the output head body. Another optional solution is that, the first clamping member moves radially along the output shaft.

Preferably, an elastic element is disposed between the first clamping member and the output head body, and the elastic element drives the first clamping member to move from the second position to the first position. One optional solution is that, the first clamping member is an elastic member and the elastic member automatically restores to the first position from the second position.

Preferably, the working head includes a baseplate main body and the second clamping member can move relative to the baseplate main body, to clamp with or disconnect from the first clamping member. The second clamping member can move radially along the motor shaft. The second clamping member is an elastic member.

Preferably, the sanding machine further includes a release component, the release component is capable of being shifted between a disassembly and assembly mode and a working mode, to allow the working head to be disassembled from the main body portion and prevent the working head from being separated from the main body portion. The release component is in a disassembly and assembly mode, the first clamping member is disconnected from the second clamping member, the release component is in the working mode, and the first clamping member and the second clamping member are clamped with each other. The release component includes a control member and a transmission member driven by the control member, and through the transmission member, the control member can operably control the first clamping member or the second clamping member to move. The control member is at least partially disposed outside the housing.

One optional solution is that, the release component includes an operation portion and a positioning member that are disposed on the working head, the operation portion operably controls the positioning member to move between a locking position and a release position, when the positioning member is in a locking position, the first clamping member and the second clamping member are clamped with each other, and when the positioning member is at the release position, and the first clamping member and the second clamping member can be disconnected from each other.

Preferably, the working head and the drive component are fitted radially and seamlessly along the motor shaft. The working head is provided with a first cone surface, the drive component is provided with a second cone surface, and when the working head and the drive component are fitted, the first cone surface and the second cone surface are wedged. The first cone surface is an inner circumferential surface and the second cone surface is an outer circular cone surface.

Preferably, the sanding machine includes a locking member that is selectively fitted to or separated from the drive component, when the drive component is fitted to the locking member, the drive component is static relative to the housing, and when the drive component is separated from the locking member, the drive component can rotate relative to the housing. The locking member is disposed in the housing, the sanding machine is provided with a switch trigger for controlling starting of a motor, and the locking member and the switch trigger are set as linked. Preferably, the working head includes a first baseplate and a second baseplate. The first baseplate is a round sanding baseplate and the second baseplate is a flat sanding baseplate. The sanding machine further includes a swing pin fixedly disposed relative to the housing and at least one of the first baseplate and the second baseplate is provided with a connection portion fitted to the swing pin.

The present invention resolves the technical problem by using another following technical solution. A sanding machine includes a main body portion and a working head removably connected to the main body portion. The main body portion includes a housing, a motor accommodated in the housing, and a drive component driven by the motor, the motor has a motor shaft, the drive component can rotate around an eccentric axis and an axis of the motor shaft or around the eccentric axis and an axis of an output shaft forming an angle with the axis of the motor shaft, the working head is detachably fitted to or separated from the drive component, the drive component includes a first clamping member, the working head includes a second clamping member disposed corresponding to the first clamping member, and when the working head is fitted to the drive component, the first clamping member and the second clamping member are fitted axially and seamlessly along an output shaft.

Preferably, when the working head is fitted to the drive component, the first clamping member and the second clamping member are axially clamped with each other along the output shaft.

Preferably, the drive component and the working head are fitted radially and seamlessly along the output shaft. The working head is provided with a first cone surface, the drive component is provided with a second cone surface, and when the working head and the drive component are fitted, the first cone surface and the second cone surface are wedged. The first cone surface is an inner circumferential surface and the second cone surface is an outer circular cone surface.

Preferably, the drive component further includes an output head body, the first clamping member can move between a first position and a second position relative to the output head body, at the first position, the first clamping member can be clamped with the second clamping member, and at the second position, the first clamping member allows the second clamping member to be disconnected.

Preferably, the working head includes a baseplate main body and the second clamping member can move relative to the baseplate main body, to be clamped with or disconnected from the first clamping member.

Another objective of the present invention is to provide a method for installing a working head of a sanding machine rapidly.

The present invention resolves the technical problem by using the following technical solution. The method for installing a working head of a sanding machine includes the following operation steps: providing a main body portion of the sanding machine, where the main body portion includes a housing, a motor, and a drive component, the motor has a motor shaft, the drive component is driven by the motor and can rotate around an eccentric axis and an axis of the motor shaft or around the eccentric axis and an axis of an output shaft forming an angle with the axis of the motor shaft, the drive component includes a first clamping member, and the working head includes a second clamping member disposed corresponding to the first clamping member; providing a working head that is detachable and is fitted to the drive component; and moving the working head axially along the output shaft relative to the drive component, to be fitted to the drive component.

Preferably, the drive component further includes an output head body and the first clamping member can move between a first position and a second position relative to the output head body. The installing method further includes the following operation steps: before the working head moves axially along the output shaft relative to the drive component, moving the first clamping member from the first position to the second position; and after the working head moves axially along the output shaft relative to the drive component, to be fitted to the drive component, moving the first clamping member from the second position to the first position, so that the first clamping member and the second clamping member are clamped axially.

The moving the first clamping member from the first position to the second position is controlled and driven by a control member at least partially disposed outside the housing.

One optional solution is that, the working head moves axially along the motor shaft relative to the drive component, so that the first clamping member and the second clamping member are clamped axially and the working head and the main body portion are fitted.

Another optional solution is that, the working head moves axially along the output shaft relative to the drive component, so that the working head is fitted to the drive component; and the working head rotates relative to the drive component, so that axial positions of the working head and the drive component are locked relatively.

Yet another objective of the present invention is to provide a method for disassembling a working head of a sanding machine rapidly.

The present invention resolves the technical problem by using the following technical solution. A method for disassembling a working head of a sanding machine includes the following operation steps: providing a sanding machine, where the sanding machine includes a main body portion having a housing, a motor, and a drive component, and a working head fitted to the drive component, the motor has a motor shaft, the drive component is driven by the motor and can rotate around an eccentric axis and an axis of the motor shaft or around the eccentric axis and an axis of an output shaft forming an angle with the axis of the motor shaft, the drive component includes a first clamping member, and the working head includes a second clamping member disposed corresponding to the first clamping member; and moving the working head axially along the output shaft relative to the drive component, to be separated from the drive component.

Preferably, the drive component further includes an output head body and the first clamping member can move between a first position and a second position relative to the output head body, and the disassembling method further includes the following operation steps: before the working head moves axially along the output shaft relative to the drive component, to be separated from the drive component, moving the first clamping member from the first position to the second position, so that the first clamping member and the second clamping member are axially disconnected. The moving the first clamping member from the first position to the second position is controlled and driven by a control member at least partially disposed outside the housing.

One optional solution is that, the working head rotates around a center line of the working head, and the working head is axially separated along the output shaft relative to the drive component.

Preferably, before the working head rotates, the method further includes the following step: releasing position locking on the working head through an operation portion disposed on the working head.

Since the present invention uses the foregoing technical solution, the first clamping member on the working head and the second clamping member of the drive component of the sanding machine can be axially clamped or disconnected along the output shaft, so that the working head can be disassembled from the main body portion of the sanding machine conveniently and rapidly, or another working head having a different function is installed, and the operation steps are simple. When the working head and the drive component are fitted, a first cone surface provided on the working head and a second cone surface provided on the drive component are wedged, so that the working head can, under an action of an axial hanging force, remove axial and radial gaps between the working head and the drive component in a better way and the working head and the drive component can substantially be kept coaxial and synchronous during rotation, to reduce additional energy consumption generated by asynchronism between the working head and the drive component caused by gaps and obviously enhance working efficiency.

The present invention further provides a sanding machine that is used conveniently. Another optional technical solution is that, a sanding machine includes a main body portion and a working head connected to the main body portion, the main body portion includes a housing, a motor accommodated in the housing, a drive component driven by the motor to rotate around an eccentric axis, and a swing pin fixedly disposed relative to the housing, the working head is detachably fitted to the drive component, the drive component includes a first clamping member, the working head includes a second clamping member disposed corresponding to the first clamping member, and when the working head is fitted to the drive component, the first clamping member and the second clamping member are axially clamped with each other at least along the output shaft.

Preferably, the drive component and the working head are fitted radially and seamlessly along the output shaft. The working head is provided with a first cone surface, the drive component is provided with a second cone surface, and when the working head and the drive component are fitted, the first cone surface and the second cone surface are wedged. The first cone surface is an inner circumferential surface and the second cone surface is an outer circular cone surface.

Preferably, the first clamping member includes several first clamping options disposed circumferentially around the eccentric axis.

Preferably, the drive component further includes an output head body, the first clamping member can move between a first position and a second position relative to the output head body, the first clamping member can be clamped with the second clamping member at the first position, and the first clamping member can be disconnected from the second clamping member at the second position.

Preferably, the first clamping member moves axially along the output shaft. In one optional solution, the first clamping member pivotally rotates relative to the output head body. In another optional solution, the first clamping member moves radially along the output shaft.

Preferably, an elastic element is disposed between the first clamping member and the output head body, and the elastic element drives the first clamping member to move from the second position to the first position.

Preferably, the first clamping member is an elastic member and the elastic member automatically restores to the first position from the second position.

Preferably, the working head includes a baseplate main body and the second clamping member can move relative to the baseplate main body, to clamp with or disconnect from the first clamping member.

Preferably, the second clamping member can move axially along the output shaft. The second clamping member is an elastic member.

Preferably, the sanding machine further includes a release component, the release component is shifted between a disassembly and assembly mode and a working mode, to allow the working head to be disassembled from the main body portion and prevent the working head from being separated from the main body portion. The release component is in a disassembly and assembly mode, the first clamping member is disconnected from the second clamping member, the release component is in the working mode, and the first clamping member and the second clamping member are clamped with each other. The release component includes a control member and a transmission member driven by the control member, and through the transmission member, the control member can operably control the first clamping member or the second clamping member to move. The control member is at least partially disposed outside the housing.

In one optional solution, the release component includes an operation portion and a positioning member that are disposed on the working head, the operation portion operably controls the positioning member to move between a locking position and a release position, when the positioning member is in a locking position, the first clamping member and the second clamping member are clamped with each other, and when the positioning member is at the release position, and the first clamping member and the second clamping member can be disconnected from each other.

Preferably, the sanding machine includes a locking member that can be selectively fitted to or separated from the drive component, when the drive component is fitted to the locking member, the drive component is static relative to the housing, and when the drive component is separated from the locking member, the drive component can rotate relative to the housing. The locking member is disposed in the housing, the sanding machine is provided with a switch trigger for controlling starting of a motor, and the locking member and the switch trigger are set as linked.

Preferably, the working head includes a first baseplate and a second baseplate. The first baseplate is a round sanding baseplate and the second baseplate is a flat sanding baseplate. At least one of the first baseplate and the second baseplate is provided with a connection portion fitted to the swing pin.

The present invention resolves the technical problem by using the following technical solution. A sanding machine includes a main body portion and a working head connected to the main body portion, the main body portion includes a housing, a motor accommodated in the housing, a drive component driven by the motor to rotate around an eccentric axis, and a swing pin fixedly disposed relative to the housing, the working head is detachably fitted to the drive component, the drive component includes a first clamping member, the working head includes a second clamping member disposed corresponding to the first clamping member, and when the working head is fitted to the drive component, the first clamping member and the second clamping member are seamlessly fitted at least along the output shaft.

Another objective of the present invention is to provide a method for installing a working head of a sanding machine rapidly.

The present invention resolves the technical problem by using the following technical solution. The method for installing a working head of a sanding machine includes the following operation steps: providing a main body portion of the sanding machine, where the main body portion includes a housing, a motor, and a drive component, the motor has a motor shaft, the drive component is driven by the motor and can rotate around an eccentric axis and an axis of the motor shaft or around the eccentric axis and an axis of an output shaft forming an angle with the axis of the motor shaft, the drive component includes a first clamping member, and the working head includes a second clamping member disposed corresponding to the first clamping member; providing a working head that is detachable and is fitted to the drive component; and moving the working head axially along the output shaft relative to the drive component, to be fitted to the drive component.

Preferably, the drive component further includes an output head body and the first clamping member can move between a first position and a second position relative to the output head body. The installing method further includes the following operation steps: before the working head moves axially along the output shaft relative to the drive component, moving the first clamping member from the first position to the second position; and after the working head moves axially along the output shaft relative to the drive component, to be fitted to the drive component, moving the first clamping member from the second position to the first position, so that the first clamping member and the second clamping member are clamped axially.

Preferably, the sanding machine includes a control member, and the disassembly method further includes the following operation step: operating the control member, so that the first clamping member moves from the first position to the second position.

One optional solution is that, the working head moves axially along the output shaft relative to the drive component, so that the first clamping member and the second clamping member are clamped axially and the working head and the main body portion are fitted.

Another optional solution is that, the working head moves axially along the output shaft relative to the drive component, so that the working head is fitted to the drive component; and the working head rotates relative to the drive component, so that axial positions of the working head and the drive component are locked relatively.

Yet another objective of the present invention is to provide a method for disassembling a working head of a sanding machine rapidly.

The present invention resolves the technical problem by using the following technical solution. A method for disassembling a working head of a sanding machine includes the following operation steps: providing a sanding machine, where the sanding machine includes a main body portion having a housing, a motor, and a drive component, and a working head fitted to the drive component, the motor has a motor shaft, the drive component can rotate around an eccentric axis and an axis of the motor shaft or around the eccentric axis and an axis of an output shaft forming an angle with the axis of the motor shaft, the drive component includes a first clamping member, and the working head includes a second clamping member disposed corresponding to the first clamping member; and moving the working head axially along the output shaft relative to the drive component, to be separated from the drive component.

Preferably, the drive component further includes an output head body and the first clamping member can move between a first position and a second position relative to the output head body, and the disassembly method further includes the following operation step: before the working head moves axially along the output shaft relative to the drive component, to be separated from the drive component, moving the first clamping member from the first position to the second position, so that the first clamping member and the second clamping member are axially disconnected.

Preferably, the sanding machine includes a control member, and the disassembly method further includes the following operation step: operating the control member, so that the first clamping member moves from the first position to the second position.

One optional solution is that, the working head rotates around a center line of the working head, and the working head is axially separated along the output shaft relative to the drive component. An operation portion is further disposed on the working head and the disassembly method further includes the following operation step: operating the operation portion before the working head rotates, so that the working head releases position locking with the main body portion.

Since the present invention uses the foregoing technical solution, the first clamping member on the working head and the second clamping member of the drive component of the sanding machine can be seamlessly clamped or disconnected at least along an axial direction of the output shaft, so that the working head can be disassembled from the main body portion of the sanding machine conveniently and rapidly, or another working head having a different function is installed, and the operation steps are simple. When the working head and the drive component are fitted, a first cone surface provided on the working head and a second cone surface provided on the drive component are wedged, so that the working head can, under an action of an axial hanging force, remove axial and radial gaps between the working head and the drive component in a better way and the bottom plate-working head and the drive component can substantially be kept coaxial and synchronous during rotation, to reduce additional energy consumption generated by asynchronism between the working head and the drive component caused by gaps and obviously enhance working efficiency.

The present invention further provides a sanding machine that can be installed conveniently and connected firmly. Another technical solution is that, a sanding machine includes a drive component and a working head detachably fitted to the drive component, the drive component includes a first clamping member, the working head includes a second clamping member disposed corresponding to the first clamping member, and the second clamping member can move relative to the first clamping member, to be clamped with or separated from the first clamping member.

Orthographic projections of the first clamping member and the second clamping member on a plane perpendicular to a relative motion direction of the first clamping member and the second clamping member at least partially overlap, to prevent the first clamping member and the second clamping member from moving in opposite directions to be separated when the drive component and the working head are fitted.

For the foregoing sanding machine, the orthographic projections of the first clamping member and the second clamping member on the plane perpendicular to the relative motion direction of the first clamping member and the second clamping member overlap, and therefore, the drive component and the working head may be connected through the first clamping member and the second clamping member, to prevent the first clamping member and the second clamping member from moving in opposite directions to be separated, to stably install the working head on the drive component.

In one embodiment, the first clamping member includes a first clamping surface, the second clamping member includes a second clamping surface provided in parallel to the first clamping surface, and when the working head and the drive component are fitted, the first clamping surface and the second clamping surface at least partially overlap under a pressure applied to each other.

In one embodiment, the first clamping member includes a first clamping main body and a first clamping portion located at one end of the first clamping main body and protruded on one side of the first clamping main body, the first clamping surface is formed at one side of the first clamping portion close to the first clamping main body and obliquely extends from one side of the first clamping portion away from the first clamping main body to the first clamping main body; and the second clamping member includes a second clamping main body and a second clamping portion disposed at one side of the second clamping main body and protruded on one side of the second clamping main body, the second clamping surface is formed at one side of the second clamping portion close to the second clamping main body and obliquely extends from one side of the second clamping portion away from the second clamping main body to the second clamping main body.

In an embodiment, the drive component includes a tension ring, the plurality of first clamping members is disposed on the tension ring and arranged alternately along a circumferential direction of the tension ring, and the plurality of second clamping members are arranged alternately along a circumferential direction of the working head, to be corresponding to the first clamping members.

In an embodiment, the drive component further includes an output head body sleeved over the tension ring, a plurality of protruding pieces is disposed alternately on the output head body in a circumferential direction, the adjacent protruding pieces form a holding space, the first clamping member and the second clamping member stretch into the holding space from two ends of the holding space respectively and are clamped with each other under an action of the holding space.

In an embodiment, the holding space includes a first holding space and a second holding space, a size of the first holding space matches a size of the first clamping member and the second clamping member that are fitted, a size of the second holding space is greater than the size of the first holding space; when the first clamping portion and the second clamping portion are both located in the first holding space, the first clamping surface and the second clamping surface contact closely under an action of the first holding space, so that the first clamping member and the second clamping member are clamped with each other; and when the first clamping portion and the second clamping portion are both located in the second holding space, the second clamping member may move relative to the first clamping member, to be clamped with or separated from the first clamping member.

In one embodiment, the protruding piece includes a first segment and a second segment of which a size is less than that of the first segment, the first segments of the two adjacent protruding pieces form the first holding space, and the second segments of the adjacent two protruding pieces form the second holding space of which the size is greater than that of the first holding space.

In one embodiment, a first guide surface is formed between the first segment and the second segment of the protruding piece, the first guide surface obliquely extends outward gradually from the second segment to the first segment, a second guide surface coordinating with the first guide surface is disposed at the second clamping portion of the second clamping member, and the second clamping member may slide along the first guide surface along the first guide surface through the second guide surface, to slide into or leave the first holding space.

In one embodiment, a limiting portion is respectively disposed between every two adjacent first clamping members, a gap is formed between the first clamping member and the adjacent limiting portion, a boss portion extending from the protruding piece to one end of the limiting portion is disposed on the output shaft body, the boss portion may be limited in the gap, so that the tension ring is sleeved over the output shaft body.

In one embodiment, the sanding machine further includes an elastic member, located between the output head body and the tension ring and used to provide a pressure applied on the second clamping surface to the first clamping surface.

Another inventive objective of the present invention is to provide a sanding machine that is used conveniently. The technical solution is implemented as follows. A sanding machine includes a main body including an output shaft; a drive component, including an output head body and a drive installation portion, where the output head body is fitted to the output shaft and the drive installation portion is connected to one side of the output head body close to the main body; a working head, selectively fitted to or disconnected from the drive installation portion; and a release component, where the release component may operably drive the drive installation portion to move relative to the output head body, to be switched between an installation state and a disassembly state, when the drive installation portion is in the installation state, the working head can be fitted to the drive installation portion, and when the drive installation portion is in the disassembly state, the working head can be disconnected from the drive installation portion to be separated.

For the sanding machine, the drive installation portion moves relative to the output head body through the release component, so that the drive installation portion is switched between the installation state and the disassembly state, when the drive installation portion is in the installation state, the working head can be fitted to the drive installation portion, and when the drive installation portion is in the disassembly state, the working head can be disconnected from the drive installation portion to be separated. In this way, rapid state switch of the drive installation portion is implemented, the baseplate may be replaced quickly, and an operator may perform operations conveniently.

Preferably, the sanding machine further includes a maintenance mechanism that can maintain the drive installation portion in the disassembly state.

In one implementation, the maintenance mechanism includes a locking member disposed at the release component and a holding member disposed on the machine body.

In one implementation, the release component includes a transmission member and a control member fitted to the transmission member, and the transmission member is disposed between the control member and the drive installation portion and can be driven by the control member to drive the drive installation portion to move axially.

Preferably, the control member and the transmission member are coordinated through a cam groove, the control member rotates relative to the machine body and can drive the transmission member to axially move from the first position to the second position along an axis of the output shaft and to be kept at the second position, when the control member is at the first position, the drive installation portion is in the installation state, and when the control member is at the second position, the drive installation portion is in a disassembly state.

In one implementation, one end of the control member is hingedly connected to the body and rotates relative to the machine body by taking a hinge point of the body as a rotation center. The transmission member is sleeved on the machine body, one end of the transmission member is rotatably connected to the control member, and the other end may abut against the drive installation portion, the transmission member is driven by the control member to axially move by taking a connection point of the transmission member and the control member as a support point, to drive the drive installation portion to axially move. The control member has a kidney-shaped hole, the transmission member includes an installation column locked in the kidney-shaped hole, the installation column may move in the kidney-shaped hole to enable the transmission member and the control member to be connected rotatably, and at the same time, allow the transmission member to move along an axial direction of the output shaft.

Preferably, the release component further includes an operation member fitted to the control member and the control member operably drives the control member to move.

In one implementation, the operation member is set as an operation portion integrally formed with the control member, and the operation portion drives the control member to rotate around the output shaft to drive the transmission member to move axially.

In one implementation, a transmission rod is further disposed between the operation member and the control member and the transmission rod is disposed in the machine body in an axial direction. The operation member includes a cam portion and a cam wrench, the cam portion is pivotally disposed at the machine body, one end of the transmission rod abuts against the cam portion and the other end abuts against the control member, and the cam wrench operably controls the cam portion to pivot, to drive the transmission rod to move along an axial direction, to drive the control member to move.

In one implementation, the drive installation portion axially moves relative to the output head body.

In another implementation, the drive installation portion axially moves relative to the output head body.

In yet another implementation, the drive installation portion radially moves relative to the output head body.

Another inventive objective of the present invention is to provide a handheld sanding machine that has a stable machine body and can be used very conveniently. The technical solution is implemented as follows. A handheld sanding machine includes a machine body; a working component, located under the machine body; a motor, disposed in the machine body, and configured to drive the working component; where the machine body includes a body for accommodating the motor, an installation portion configured to install a battery pack providing power to the motor, and a holding portion connected between the body and the installation portion, the working component is located at a bottom of the body, the installation portion is located at one side of the body, and one side of the installation portion away from the body has an installation position for installing the battery pack.

For the handheld sanding machine, the working component is located at a bottom of the body, the motor is accommodated in the body, the installation portion is located at one side of the body, and is connected to the body through the holding portion, so that the battery pack and the motor are disposed oppositely, to make holding be more convenient, satisfy ergonomics, and enhance stability when an operator uses the handheld sanding machine.

In an embodiment, the working component is located at one end of an output shaft of the motor and the installation portion is located at one side of the output shaft of the motor.

In an embodiment, one end of the holding portion is connected to one side of the body, and the other end is connected to one side of the installation portion facing the body.

In an embodiment, the battery pack is detachably connected to the installation portion.

In an embodiment, the installation position is an installation groove for installing the battery back.

In an embodiment, an installation direction in which the battery pack is installed at the installation position is parallel to a direction of an axis of the output shaft of the motor.

In an embodiment, the battery pack includes a battery pack main body that extends in a lengthwise direction, and the lengthwise extending direction of the battery pack main body is parallel to the axis of the output shaft of the motor.

In an embodiment, an installation direction in which the battery pack is installed at the installation position forms an included angle with a direction of an axis of the output shaft of the motor.

In an embodiment, after the handheld sanding machine is connected to the battery pack, a center of gravity of the handheld sanding machine is located at the body or the holding portion.

In an embodiment, a strengthening portion is further disposed between the body and the installation portion.

Another objective of the present invention is to provide a sanding machine that is used securely.

The present invention resolves the technical problem by using the following technical solution. A sanding machine includes a machine body;

and a working head, selectively separated from or fitted to the main body. The machine body includes a housing, a motor disposed in the housing, and a switch for controlling the motor. The sanding machine further includes a security device that can control starting of the motor. When the working head is fitted to the machine body, the security device allows the motor to start, and when the working head is separated from the machine body, the security device prevents the motor from starting.

Preferably, the security device includes a controller configured to control rotation of the motor and a detection sensor configured to detect whether the working head is installed. When the working head is in an installation state, the detection sensor outputs a first detection signal; when the working head is in a non-installation state, the detection sensor outputs a second detection signal; and when the detection sensor outputs the second detection signal, the controller controls the motor not to rotate.

To resolve a problem that a motor is started abnormally after a working head is disassembled, the present invention provides a secure and reliable sanding machine that can perform electronic interlock and prevent the motor from being started abnormally after the working head is disassembled.

In an embodiment, the detection sensor includes a detection element, a trigger element is installed on the working head, when the detection element senses the trigger element, the detection sensor outputs a first detection signal, and when the detection element does not sense the trigger element, the detection sensor outputs a second detection signal.

In an embodiment, the detection element is a micro switch and the trigger element is a trigger lever. When the working head is in an installation state, the trigger lever can contact with the micro switch and enable the micro switch to output a first detection signal, and when the working head is in a non-installation state, the trigger lever is separated from the micro switch and enables the micro switch to output a second detection signal.

In an embodiment, the detection element is a Hall sensor and the trigger element is magnetic steel. When the Hall sensor detects the magnetic steel, the Hall sensor outputs a first detection signal, and when the Hall sensor does not detect the magnetic steel, the Hall sensor outputs a second detection signal.

In an embodiment, a grinding element includes a sand board, a sand wheel, a sand belt, or a polishing wheel.

In an embodiment, the sanding machine further includes an identification sensor. The identification sensor is electrically connected to the controller and is configured to identify whether the grinding element is provided with a sensing element. When the sensing element is installed on the working board, the identification sensor outputs a first identification signal, and when the sensing element is not installed on the working board, the identification sensor outputs a second identification signal, and the controller can output a first speed and a second speed of an electric machinery correspondingly according to the first identification signal and the second identification signal.

In an embodiment, the first speed and the second speed are preset in the controller.

In an embodiment, the sanding machine includes a connection column, the connection column has one end extending toward the working head, and the identification sensor is disposed at one end of the connection column close to the working head.

In an embodiment, the sanding machine further includes a drive disc, an output end of the electric machinery is connected to the drive disc, the drive disc is connected to the working head, and the connection column is disposed between the swing pin of the sanding machine and the drive disc.

In an embodiment, the identification sensor is a Hall sensor and the sensing element is magnetic steel.

For the foregoing sanding machine, the sanding machine detects whether the working head is installed through the detection sensor, to control whether to start the motor. When the working head is not installed, the sanding machine controls the electric machinery not to rotate, to prevent the motor from starting and rotating abnormally to drive an exposed output end to rotate, causing a security problem.

Furthermore, the sanding machine performs intelligent control to change a rotation speed of the motor according to whether the identification sensor identifies the working head with the sensing element. After a different type of working head is replaced, manual adjustment is no longer required, through identification of the identification sensor, the controller can be controlled to correctly adjust the speed of the motor to a reasonable speed required by the working head, and the operation is intelligent, convenient, secure, reliable, and high-efficient.

DETAILED DESCRIPTION

Figure 1:
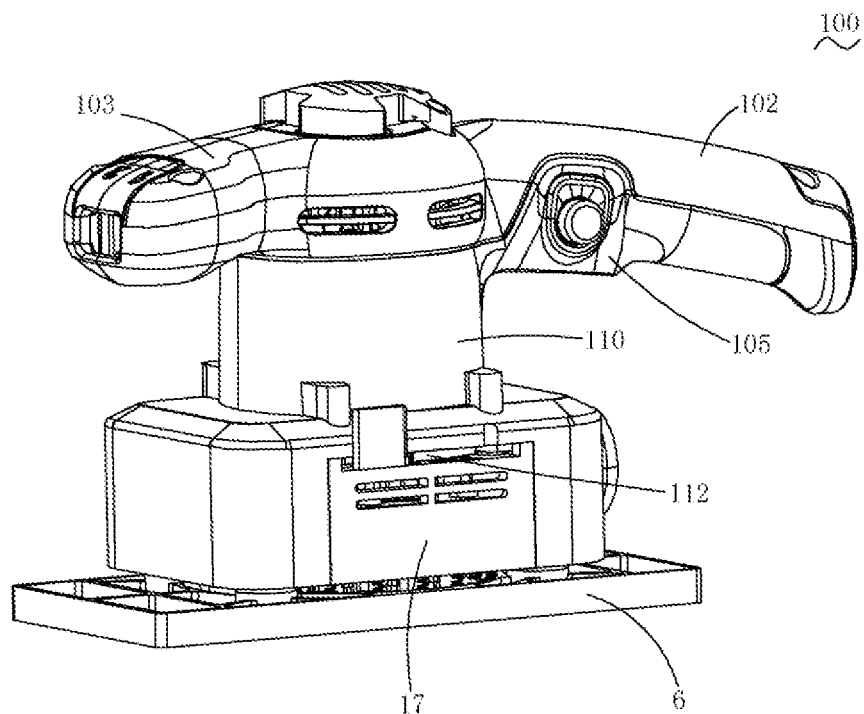
FIG. 1 is a main view of a sanding machine with a flat sanding baseplate according to Embodiment 1 of the present invention.

To make the objectives, features, and advantages of the present invention more obvious and comprehensible, specific embodiments of the present invention are described in detail below with reference to the accompanying drawings.

A lot of specific details are described in the following description, to make the present invention be fully understood.

However, the present invention can be implemented in many other manners that are different from those described herein, and a person skilled in the art may make similar improvements without departing from the meaning of the present invention. Therefore, the present invention is not limited by the specific embodiments described as follows.

It should be noted that, when an element is called "being fixed to" another element, it may be fixed to the another element directly or through an intermediate element. When an element is considered "being connected to" another element, it may be connected to the another element directly or through an intermediate element.

Unless otherwise provided, all scientific and technical terms used herein have the same meaning as that understood by a person skilled in the art. The terms used in the specification of the present invention are only to describe specific embodiments, rather than limiting the present invention. The term "and/or" used herein includes a combination of any or all of one or more related items.

The inventive concept of the present invention is that, a sanding machine may be connected to a working baseplate alternatively, such as a flat sanding board or a round sanding board, so that the sanding machine may perform flat sanding motion when being connected to the flat sanding baseplate and perform round sanding motion when being connected to the round sanding baseplate. The sanding machine includes a drive component that is connected to and drives the round sanding baseplate or the flat sanding baseplate, and the flat sanding baseplate or the round sanding board may be fitted to or separated from the drive component alternatively. A first clamping member is disposed on the drive component and a second clamping member corresponding to the first clamping member is respectively disposed on the flat sanding baseplate or the round sanding baseplate. When the second clamping member is fitted to the first clamping member, the corresponding working baseplate may be prevented from being separated from the drive component, and when the first clamping member is not fitted to the second clamping member, the corresponding working baseplate may be allowed to be separated from an output head. In this way, only through replacing a different working baseplate, the present invention may be switched between different functions or working modes, and switched between different grinding conditions, such as flat sanding and round sanding, and furthermore, a replacement structure is simple, reliable, and may be operated conveniently. It is unnecessary to provide sanding machines with different functions at the same time, to satisfy requirements of different working conditions.

Preferred implementations of the sanding machine are described with reference to the accompanying drawings.

Embodiment 1

Figure 2:
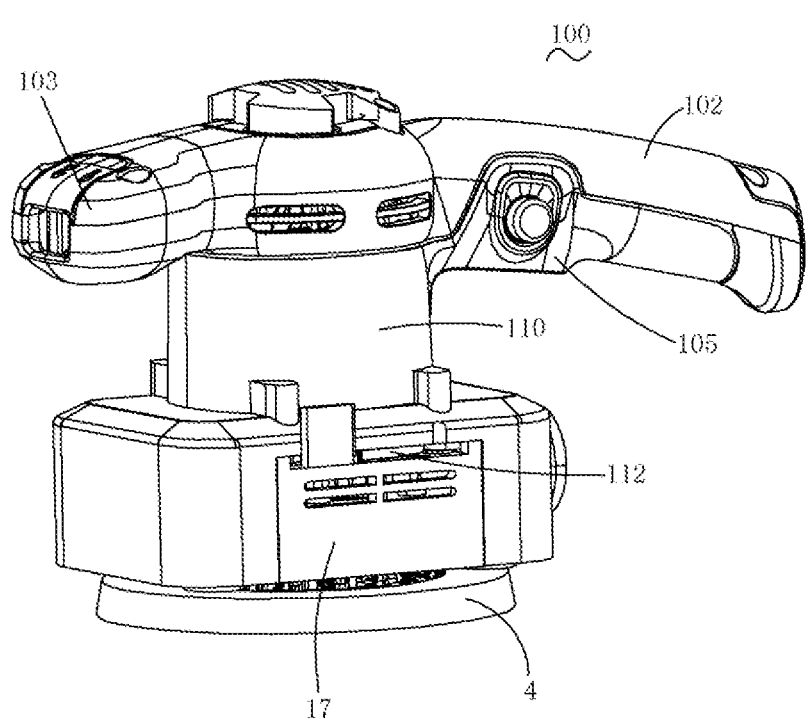
FIG. 2 is a three-dimensional diagram of the sanding machine in FIG. 1 with a round sanding baseplate.

Referring to FIG. 1 and FIG. 2, Embodiment 1 provides a sanding machine 100 with a replaceable working baseplate. FIG. 1 shows that the sanding machine is equipped with a flat sanding baseplate 6 that performs flat sanding motion, and FIG. 2 shows the sanding machine is equipped with a round sanding baseplate 4 that performs round sanding motion. The sanding machine 100 includes a housing 110, a main handle 102 that is connected to the housing 110 and horizontally extends to one side, and an auxiliary handle 103 that horizontally extends to the other side relative to the main handle 102, and the main handle 102 is provided with a switch trigger 105 that controls whether to start or stop a motor.

Figure 3:
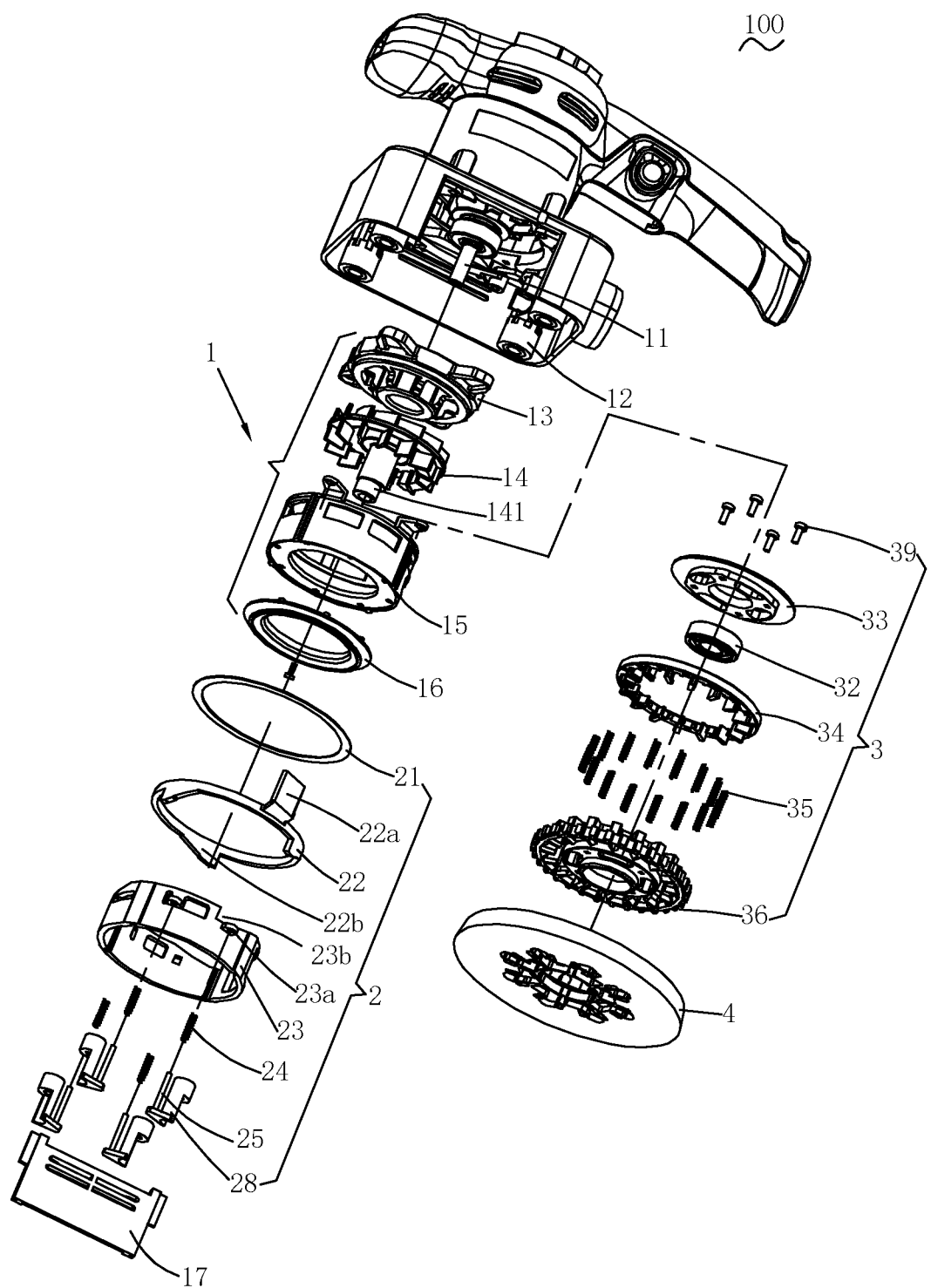
FIG. 3 is a schematic three-dimensional exploded diagram of the sanding machine with the round sanding baseplate in FIG. 2.

Referring to FIG. 2 and FIG. 3, the sanding machine 100 is connected to a round sanding baseplate 4, and the sanding machine 100 includes a machine body 1, a release component 2, and a drive component 3. The machine body 1 includes a motor disposed in the housing 110, the motor has a motor shaft 11 extending in a vertical direction, a positioning seat 13 fixed relative to the housing 110, a fan 14 sleeved over the motor shaft 11, and a fan cover 15 disposed around the fan 14. The fan 14 is fitted to the motor shaft 11 through a fastener, to rotate when the motor shaft 11 rotates. The fan 14 has an eccentric output end 141 for outputting a rotary force. A brake ring 16 is disposed at one end of the fan cover 15 away from the motor. The sanding machine 100 further includes a side cover plate 17 that may be removed from the housing 110. The side cover plate 7 has several air outlets that are used to discharge a cooling air flow driven by the fan 14, a horizontally extending slot 112 is formed between the side cover plate 17 and the housing 110 (referring to FIG. 1 or FIG. 2). Swing pins 12 are respectively disposed on four corners of the housing 110 by taking the motor shaft 11 as a center. The motor shaft 11 in this embodiment is an output shaft for transmitting rotary motion of the motor to the drive component 3, and the drive component 3 can not only perform revolution around an axis of the motor shaft 11, but also perform rotation around an eccentric axis. Therefore, during a working process of round sanding motion of the sanding machine 110, the drive component 3 rotates around the axis of the motor shaft 11 and the eccentric axis.

The drive component 3 includes an output head body 36 and a drive installation portion, the output head body 36 is fitted to the output shaft, and the installation portion is connected to one side of the output head body 36 close to the main body 1.

The release component 2 operably drives the drive installation portion to move relative to the output head body 36, to switch the drive installation portion between an installation state and a disassembly state. When the drive installation portion is in the installation state, the working baseplate may be fitted to the drive installation portion, and when the drive installation portion is in the disassembly state, the working baseplate may be disconnected from and then separated from the drive installation portion. In this embodiment, the drive installation portion axially moves relative to the output head body 36. In other embodiments, the drive installation portion may pivot relative to the output head body 36 or move radially relative to the output head body 36.

Furthermore, the release component 2 includes a transmission member and a control member fitted to the transmission member. The transmission member is disposed between the control member and the installation portion, and is driven by the control member to drive the installation portion to move axially.

In this embodiment, the release component 2 includes an anti-friction piece 21 and several guide members 28 fixedly disposed on the main body portion 1. The control member is an unlocking ring 22 and located below the anti-friction piece 21, the transmission member is a cam member 23 movably disposed relative to the unlocking ring 22, the guide members 28 respectively have a guide column 25, a spring 24 is sleeved over each of the guide columns 25, and free ends of the guide columns 25 are movably connected to fitting portions 23a of the cam member 23 respectively, so that the fitting portions 23a can overcome an acting force of the springs 24 to displace relative to the guide columns 25 along an extending direction of the guide columns. The unlocking ring 22 is substantially an annular member, an operation portion 22a is disposed on a side wall of the unlocking ring 22, the operation portion 22a extends out of the slot 112 to be controlled by an operator manually and conveniently, and the operation portion 22a can move in a length range of the slot 112, to drive the unlocking ring 22 to perform position conversion between an assembly and disassembly mode and a working mode. Several oblique convex portions 22b are disposed on a bottom of the unlocking ring 22. The cam member 23 correspondingly has several chutes 23b fitted to adapted to the oblique convex portions 22b.

When the sanding machine 100 is in a normal working state, the oblique convex portions 22b and the chutes 23b are fitted. When a working baseplate needs to be replaced, the unlocking ring 22 is controlled by the operation portion 22a to rotate by an angle relative to the cam member 23. In this case, the oblique convex portions 22b move upward along slopes of the chutes 23b, so that the cam member 23 overcomes the acting force of the springs 24 to move downward axially along the motor shaft 11 relative to the guide columns 25, to generate displacement, that is, move away from the motor shaft 11. The unlocking ring 22 and the cam member 23 are engaged by using a cam surface, that is, equivalent to a maintenance mechanism, when the cam member 23 moves axially to drive the drive installation portion to move to an unlocking position relative to the output head body 36, the unlocking position can be held automatically, to disassemble and install the baseplates 4 and 6 conveniently.

The drive component 3 includes a bearing 32 fitted to the eccentric output end 141, the output head body 36 tightly fitted to the bearing 32, the drive installation portion disposed axially and movably along the motor shaft 11 relative to the output head body 36, and a cover plate 33 fixedly connected to the output head body 36 through bolts 39. The drive installation portion is located between the cover plate 33 and the output head body 36. The installation portion in this embodiment is set as an annular tension ring 34, several elastic members 35 are distributed between the tension ring 34 and the output head body 36 along a circumferential direction of the tension ring 34, and in this embodiment, the elastic members 35 are pressure springs. The pressure springs may be replaced with other elastic materials by a person skilled in the art. The drive component 3 is fixedly connected to an end portion of the motor shaft 11 through a fastener 48, and the drive component 3 substantially acts as a transmission device to transmits rotation of the motor to the baseplate 4 or 6.

When the sanding machine 100 is in a normal working state, under an elastic acting force of the elastic members 35, the tension ring 34 is supported at an initial position, that is, the first position, and in this case, the oblique convex portions 22b and the chutes 23b are engaged and fitted. When a working baseplate needs to be replaced, the unlocking ring 22 is controlled by the operation portion 22a to drive the cam member 23 to move, during a moving process, the cam member 23 overcomes the acting force of the springs 24 to axially generate movement close to the output head body 36 along the motor shaft 11, so that the tension ring 34 overcomes an action of the elastic members 35 to move to an unlocking position, that is, a second position, the elastic members 35 are in a compression state. In this case, a working baseplate fitted to the output head body 36, such as a round sanding baseplate 4, is allowed to be separated from the output head body 36. Another working baseplate is replaced, for example, the flat sanding baseplate 6 is fitted to the output head body 36. Then, after the unlocking ring 22 is controlled by the operation portion 22a to rotate by an angle in a reverse direction relative to the cam member 23, under a repositioning force of the springs 24, the cam member 23 moves upward to be reset, and making the chutes 23b engaged and fitted with the oblique convex portions 22b again. In this case, under the acting force of the elastic members 35, the tension ring 34 restores to the initial position, to lock the flat sanding baseplate on the output head body 36.

Figure 4:
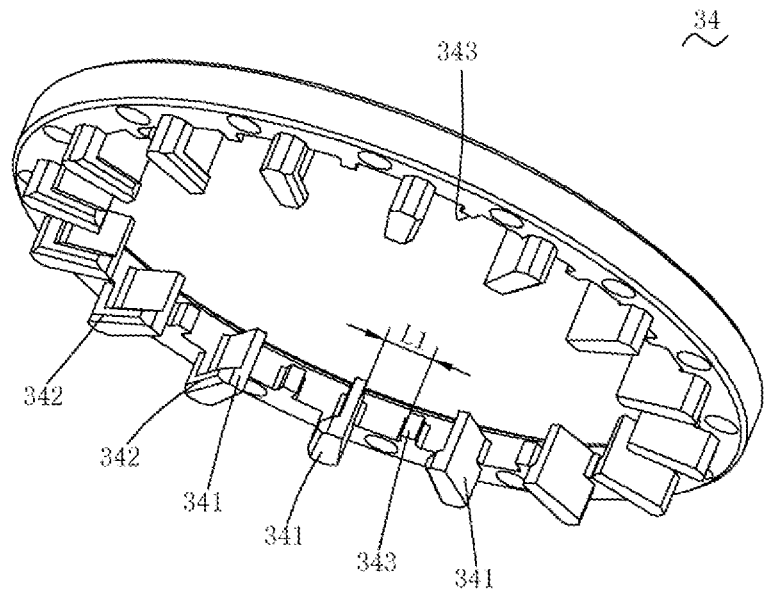
FIG. 4 is a schematic three-dimensional diagram of a tension ring in FIG. 3.

Referring to FIG. 4, the tension ring 34 is substantially an annular body, several first clamping members 341 are distributed on an inner end face of the annular body in a circumferential direction, the first clamping members 341 protrude inward along a radial direction of the tension ring 34, fastening portions 342 with bottoms protruding from a bottom surface of the tension ring 34 are formed in the radial direction, the fastening portions 342 are all located at the same side of the first clamping members 341. A limiting portion 343 is respectively disposed on the tension ring 34 between two neighboring first clamping members 341, a gap L1 is formed between each of the limiting portions 343 and each of the first clamping members 341, and the fastening portions 342 are respectively located at side of the first clamping members 341 away from the gap L1. Each of the fastening portions 342 has a first clamping surface 342a.

Figure 5:
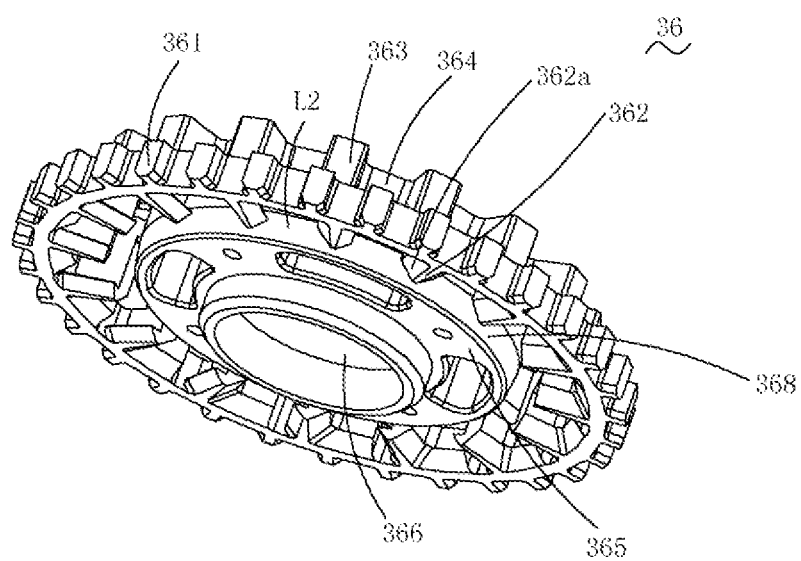
FIG. 5 is a schematic three-dimensional diagram of an output head body in FIG. 3.

Referring to FIG. 5, the output head body 36 is substantially an annular body of which an outer diameter is slightly greater than that of the tension ring 34. Several torque transmission portions 361 are uniformly distributed on an outer side of a surrounding surface of the annular body, several radially extending protrusion members 362 are uniformly distributed on an inner side of the surrounding surface in a circumferential direction, and a guide portion 362a is disposed on each of the protrusion members 362. A gap L2 through which one of the first clamping members 341 may pass is disposed between every two neighboring protrusion members 362. The protrusion members 362 respectively extend in a vertical direction to form boss portions 363 higher than the annular body of the output head body 36, and two neighboring boss portions 363 are connected through an annular wall 364. An extension width of the boss portions 363 is slightly less than the gap L1, so that when the tension ring 34 is fitted to the output head body 36, the boss portions 363 may pass through the gaps L1 of the tension ring 34, to allow the tension ring 34 to be nested within the output head body 36, and the tension ring 34 is guided by the boss portions 363 to overcome the acting force of the elastic members 35 to generate movement along a direction of the motor shaft 11 relative to the output head body 36, that is, the tension ring 34 may move between the first position and the second position in a vertical direction relative to the output head body 36. An annular boss 365 is disposed on the output head body 36 located at an inner side of the protrusion members 362, and an outer surrounding surface of the annular boss 365 is configured to have a boss cone surface 368 having a taper.

Figure 6:
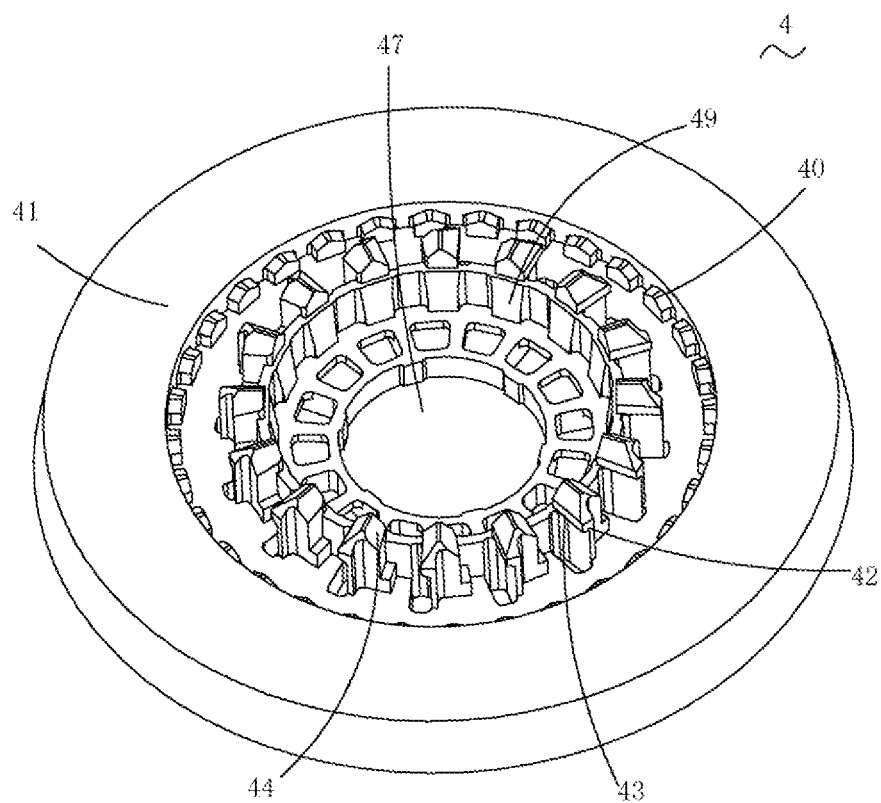
FIG. 6 is a schematic three-dimensional diagram of a round sanding baseplate in FIG. 3.

Referring to FIG. 6, the round sanding baseplate 4 has a center circular groove 47, a circular disc surface 41 is disposed around the center circular groove 47, and a fitting area is disposed between the circular disc surface 41 and the center circular groove 47 and includes torque transmission portions 40 distributed on an inner side wall of the circular disc surface 41 in a circumferential direction, and the torque transmission portions 40 are corresponding to the torque transmission portions 361 of the output head body 36. When the round sanding baseplate 4 is installed to the drive component 3, the torque transmission portions 40 and the torque transmission portions 361 of the output head body 36 are engaged and fitted, and through such a fitting relationship, the output body head 36 transmits a torque to the round sanding baseplate 4 during rotation of the motor. Inside the torque transmission portions 40, second clamping members 42 protruding from the circular disc surface 41 are disposed on the round sanding machine 4 in a circumferential direction, the second clamping members 42 are disposed corresponding to the gaps L2 and pass through the gaps L2 to be clamped with the first clamping members 341 when the round sanding baseplate 4 is fitted to the output head body 36, and each of the second clamping members 42 has a clamping portion 43 and a guide portion 44. Axial cone surfaces 49 axially extending along the motor shaft 11 are uniformly distributed on an inner side of the second clamping members 42 in a circumferential direction. When the round sanding baseplate 4 is fitted to the output head body 36, the axial cone surfaces 49 are seamlessly wedged with the boss cone surface 368, and furthermore, the axial cone surfaces 49 are located at the outer side of the boss cone surface 368. The round sanding baseplate 4 and the output head body 36 are seamlessly fitted so that either axial or radial fitness between the round sanding baseplate 4 and the output head body 36 is very high. The clamping portions 43 have second clamping surfaces 43a that are disposed in parallel to the first clamping surfaces 342a.

Figure 7:
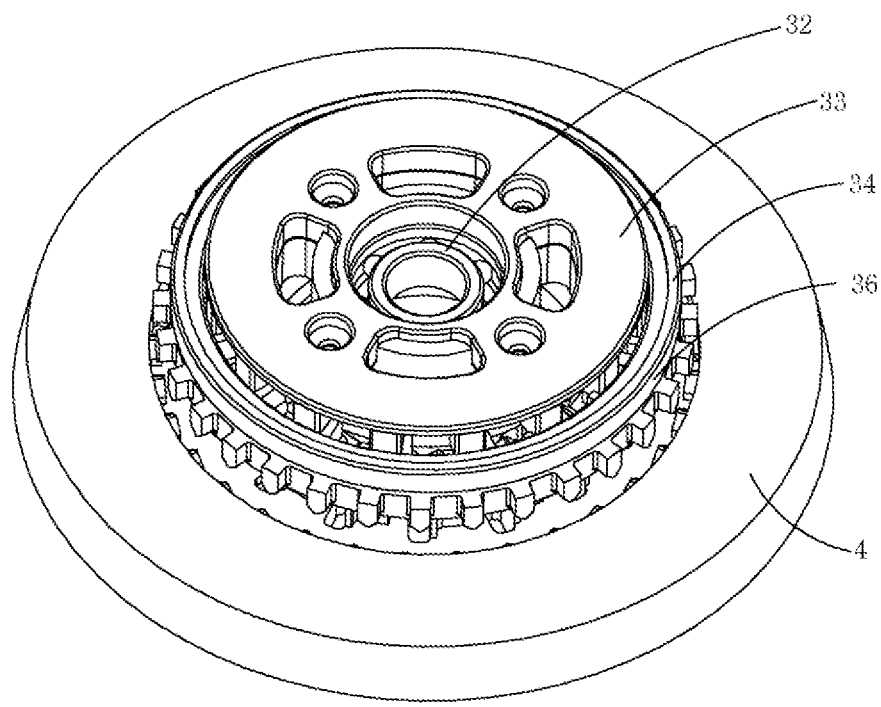
FIG. 7 is a schematic three-dimensional diagram of a state in which the round sanding baseplate and a drive component are to be connected in FIG. 3.
Figure 8:
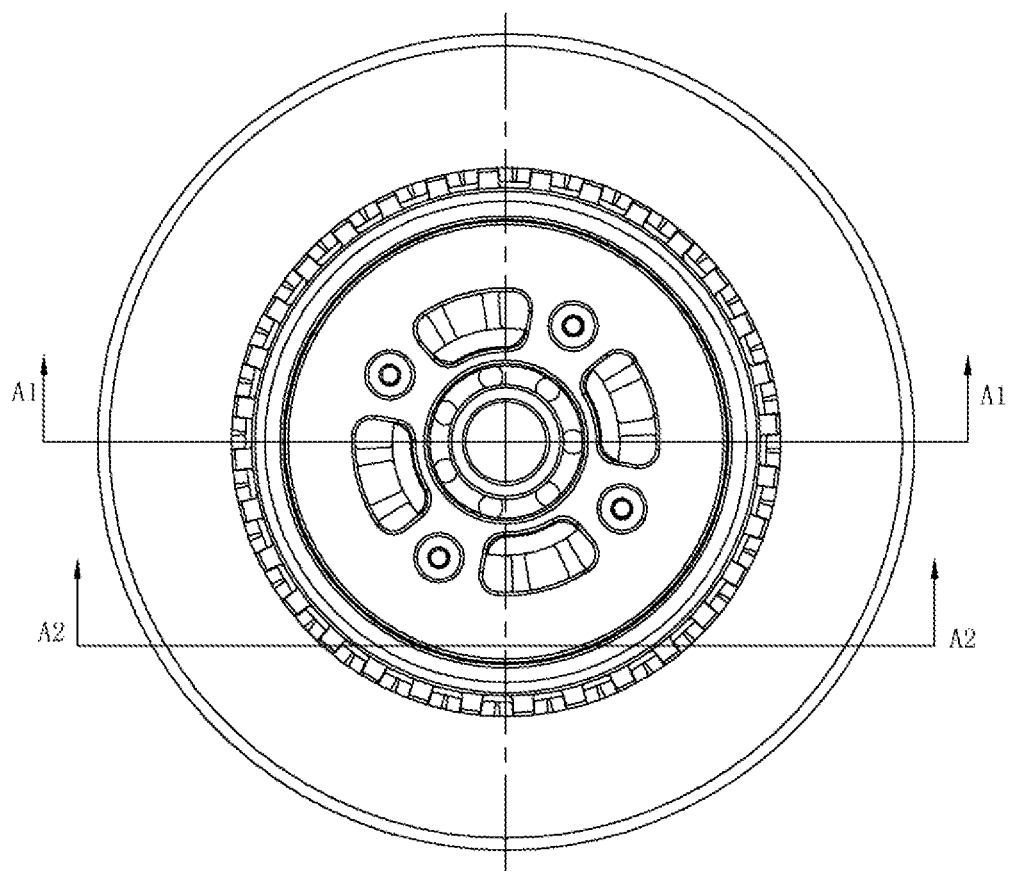
FIG. 8 is a top view of a state in which the round sanding baseplate and the drive component are to be connected in FIG. 7.
Figure 9:
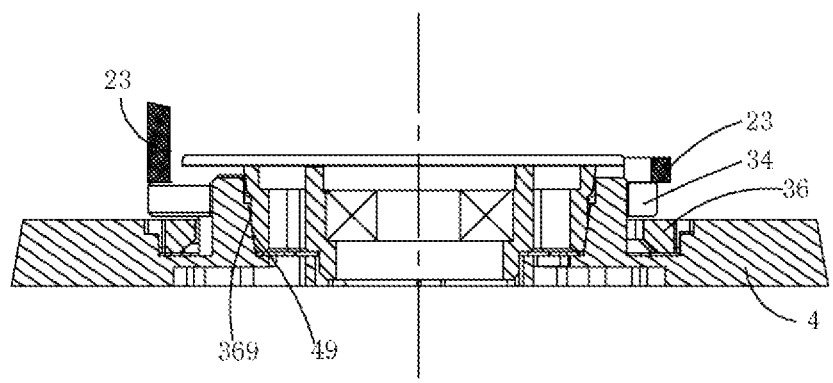
FIG. 9 is a schematic cross-sectional view diagram of a direction A1-A1 in FIG. 8.

Further referring to FIG. 7 to FIG. 9, when the round sanding baseplate 4 is fitted to the output head body 36, the axial cone surfaces 49 and the boss cone surfaces 368 are at least partially fully attached. Therefore, under an action of an axial hanging force of the first clamping members 341, axial and radial gaps between the round sanding baseplate 4 and the output head body 36 can be removed in a better way. Therefore, the round sanding baseplate 4 and the output head body 36 can substantially be kept coaxial and synchronous during rotation, to reduce additional energy consumption generated by asynchronism between the round sanding baseplate 4 and the output head body 36 caused by gaps and obviously enhance working efficiency.

Figure 10:
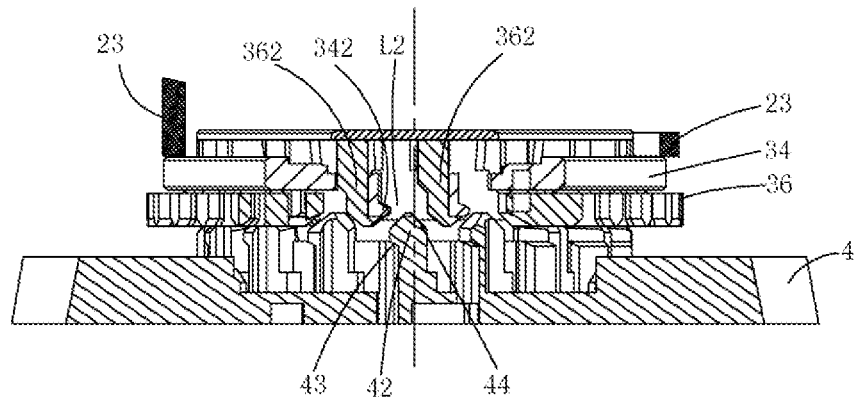
FIG. 10 to FIG. 14 are schematic cross-sectional view diagrams of a direction A2-A2 in FIG. 8 respectively, representing state changes when the round sanding baseplate is connected to the output head body.

Furthermore, in FIG. 10, when the unlocking ring 22 moves to be in an assembly and disassembly mode, the cam member 23 presses down the tension ring 34, the first clamping members 341 of the tension ring 34 slide into the gaps L2 of the protrusion members 362 under the guide of the boss portions 363, till the fastening portions 342 abut against the protrusion members 362 and the tension ring 34 being located at the second position.

Figure 11:
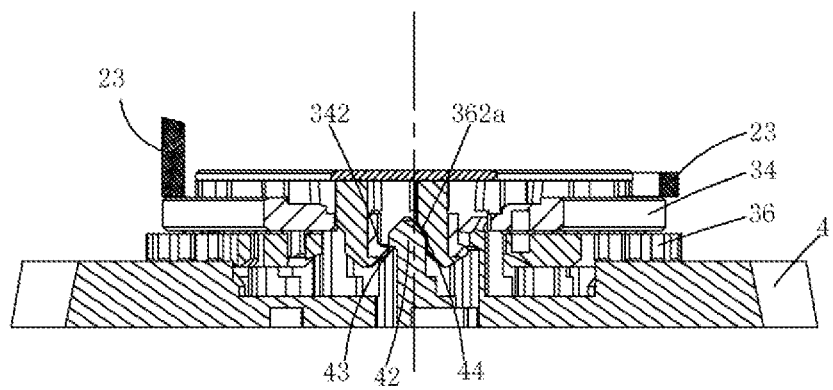

Referring to FIG. 11, after the tension ring 34 moves to the second position, the round sanding baseplate 4 may be held, and the second clamping members 42 of the round sanding baseplate 4 are aligned with the gaps L2 and then inserted into the gaps L2.

Figure 12:
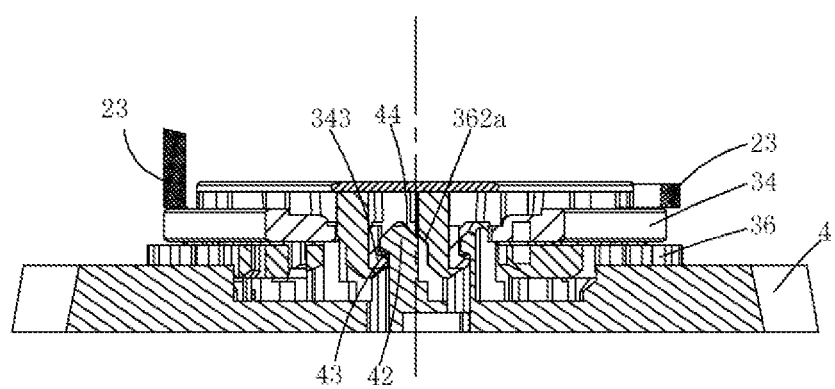

Referring to FIG. 12, during a process that the second clamping members 42 are inserted into the gaps L2, the guide portions 44 of the second clamping members 42 move upward along the guide portions 362a of the protrusion members 362, to enter into the gaps formed between the fastening portions 342 and the protrusion members 362. When the second clamping members 42 enter into the gaps between the first clamping surfaces 342a of the fastening portions 342 and the protrusion members 362, the second clamping surfaces 43a of the clamping portions 43 of the second clamping members 42 and the fastening portions 342 of the first clamping members 341 face toward each other.

Figure 13:
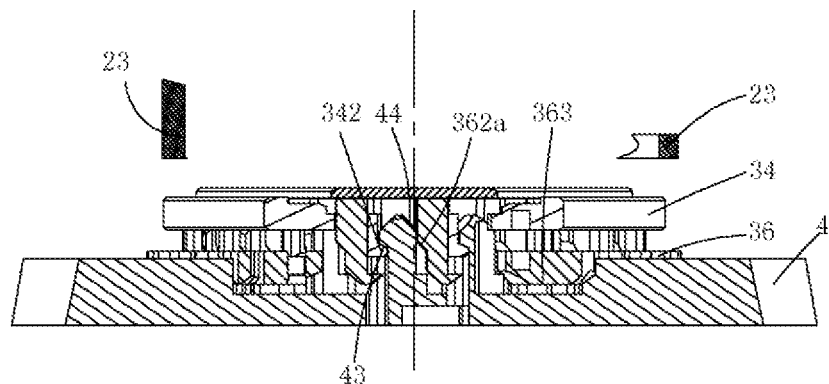
Figure 14:
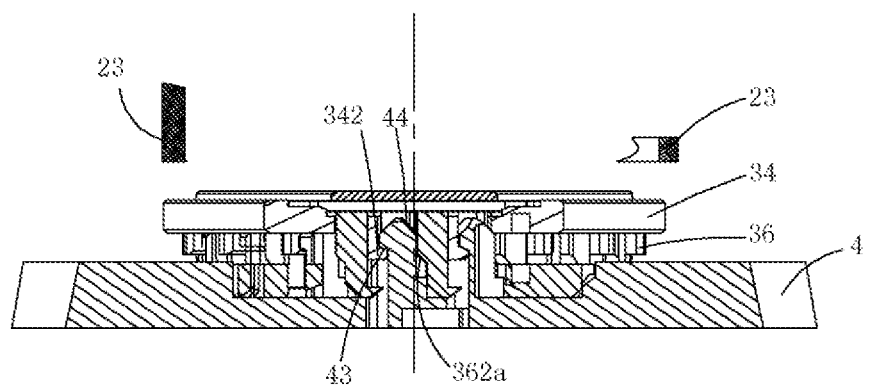

Referring to FIG. 13 and FIG. 14, the operation portion 22a is controlled to move the unlocking ring 22 to move to be in the working mode, the cam member 23 is reset under an acting force of the springs 24, and correspondingly, under an acting force of the elastic members 35, the tension ring 34 moves from the second position to the first position, that is, the tension ring 34 drives the first clamping members 341 to move upward. In this case, the first clamping surfaces 342a of the first clamping members 341 hook up the second clamping surfaces 43a of the second clamping members 42 to implement clamping there-between, to prevent the round sanding baseplate 4 from being disassembled from the drive component 3. When the first clamping surfaces 342a of the first clamping members 341 move upward along the tension ring 34 to generate movement, the second clamping surfaces 43a are driven by the first clamping surfaces 342a of the tension ring 34 to enter smaller gap portions of the gaps L2. The second clamping surfaces 43a are stopped by an upward acting force of the first clamping surfaces 342a and cannot drop off from the smaller gap portions, so that the tension ring 34 locks the round sanding baseplate 4 on the drive component 3.

The second clamping members 42 may move relative to the first clamping members 341 to clamp with or separate from the first clamping members 341. When the drive component and the working baseplate are in a fitting state, orthographic projections of the first clamping members 341 and the second clamping members 42 on a plane perpendicular to a relative motion direction of the first clamping members 341 and the second clamping members 42 at least partially overlap, to prevent the first clamping members 341 and the second clamping members 42 from moving in opposite directions. When the working baseplate and the drive component are in a fitting state, the first clamping surfaces 342a and the second clamping surfaces 43a at least partially overlap under a pressure applied to each other. The elastic members 35 provide a pressure applied on the second clamping surfaces 43a by the first clamping surfaces 342a. Certainly, a person skilled in the art could deduce that, on the contrary, if only the unlocking ring 22 moves to be in the replacing mode along the slot 112, the cam member 23 presses down the tension ring 34 so that the tension ring 34 moves from the first position to the second position, that is, the tension ring 34 generates downward movement, and in this case, the round sanding baseplate 4 can be operated to move downward. That is, the guide portion 44 of the second clamping members 42 slide from the smaller gap portions to enter the larger gaps L2 along the guide portions 362a of the protrusion members 362, so that the second clamping members 42 may drop off from the gaps L2, that is, the working baseplate is allowed to be separated from the output head body 36.

Figure 15:
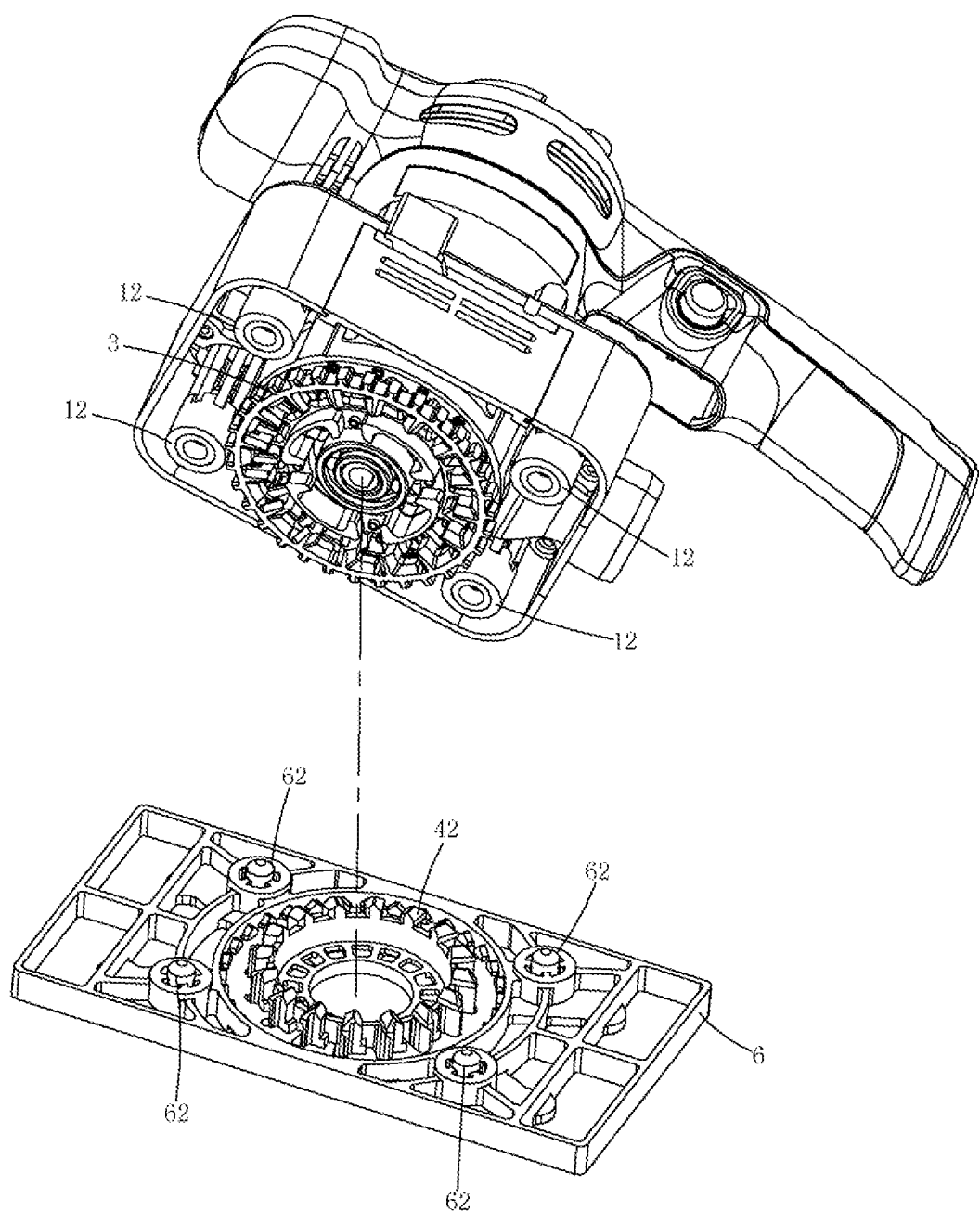
FIG. 15 is a schematic three-dimensional exploded diagram of a main body of the sanding machine and the flat sanding baseplate in FIG. 1.

Referring to FIG. 15, the flat sanding baseplate 6 has a fitting area with a structure similar to that of the round sanding baseplate is disposed on the flat sanding baseplate 6. When the flat sanding baseplate 6 needs to be installed, it may be installed with reference to the installation manner of the round sanding baseplate 4, and the difference lies in that flat sanding connection portions 62 corresponding to the swing pins 12 on the main body portion 1 are disposed at the outer side of the second clamping members 42 of the flat sanding board 6. Therefore, when the flat sanding baseplate 6 is fitted to the output head body 36, the flat sanding connection portions 62 and the swing pins 12 are engaged and fitted, so that the sanding machine is in a flat sanding working mode, and the swing pins 12 limit the flat sanding baseplate 6. In this embodiment, the flat sanding connection portions 62 are substantially set as columnar bodies, a cylinder having a spherical surface and a smaller diameter protrudes from the center of each of the columnar bodies and is set as fitted to the center circular groove of the swing pings 12 disposed on the main body portion 1. Furthermore, the spherical surfaces of the center cylinders may be replaced with cone surfaces. A person skilled in the art may deduce that, the flat sanding connection portions 62 and the swing pins 12 are not limited to be columnar and may be configured as other shapes to implement stable transmission during fitting. Therefore, the sanding machine 100 may have two different functions, that is, round sanding and flat sanding, without providing two tools, and the working baseboard can be installed and disassembled conveniently. In view of the above, when the working baseplate is installed, the first clamping members 341 move from the first position to the second position, the working baseplate 4 or 6 axially moves to a fitting position along the motor shaft 11 relative to the drive component 3, and the first clamping members return to the first position from the second position. The moving of the first clamping members from the first position to the second position is controlled and driven by the unlocking ring 22 at least partially disposed outside the housing 110. When the working baseplate 4 or 6 is disassembled, the first clamping members 341 move from the first position to the second position, the working baseplate 4 or 6 is axially separated relative to the drive component 3, and the moving the first clamping members 341 from the second position to the first position is driven and controlled by the unlocking ring 22.

Due to such a structural configuration manner of the working baseplate 4 or 6 and the drive component 3, the working baseplate and the drive component have a member having a connection function, and an additional third member, for example, a fastener such as a bolt, is not required to fix or tightly fit the working baseplate and the drive component, so that an operation interface is simple and the working baseplate may be assembled, disassembled, and replaced more conveniently and quickly.

Embodiment 2

Figure 16:
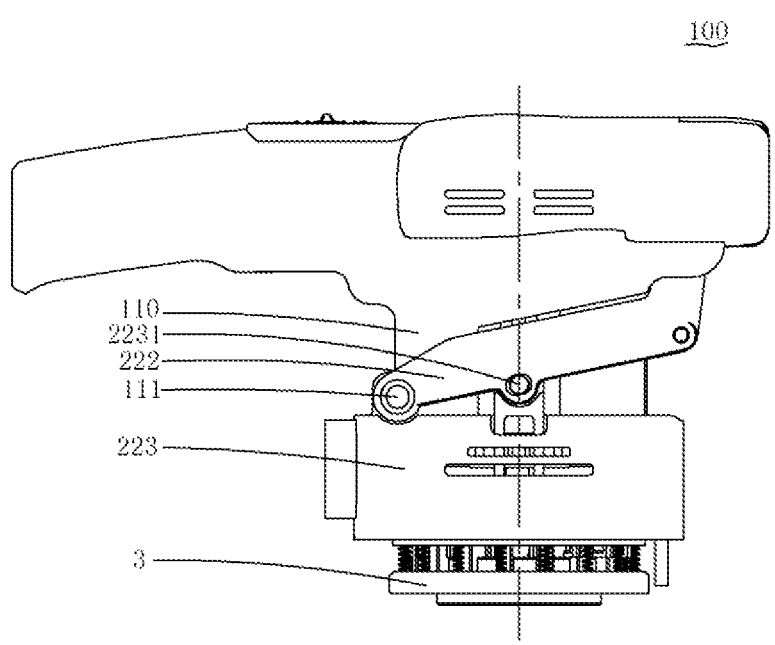
FIG. 16 is a schematic diagram of a sanding machine according to Embodiment 2.
Figure 17:
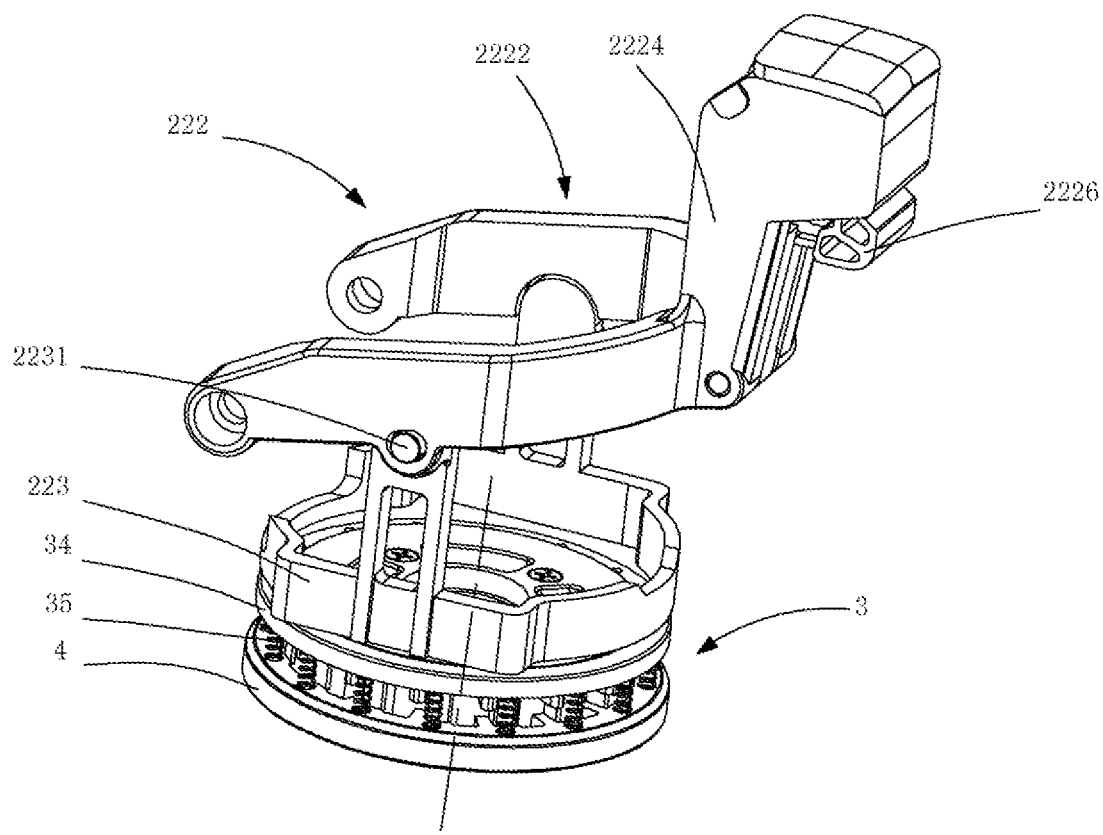
FIG. 17 is a schematic structural diagram of a release component in the sanding machine in FIG. 16.
Figure 18:
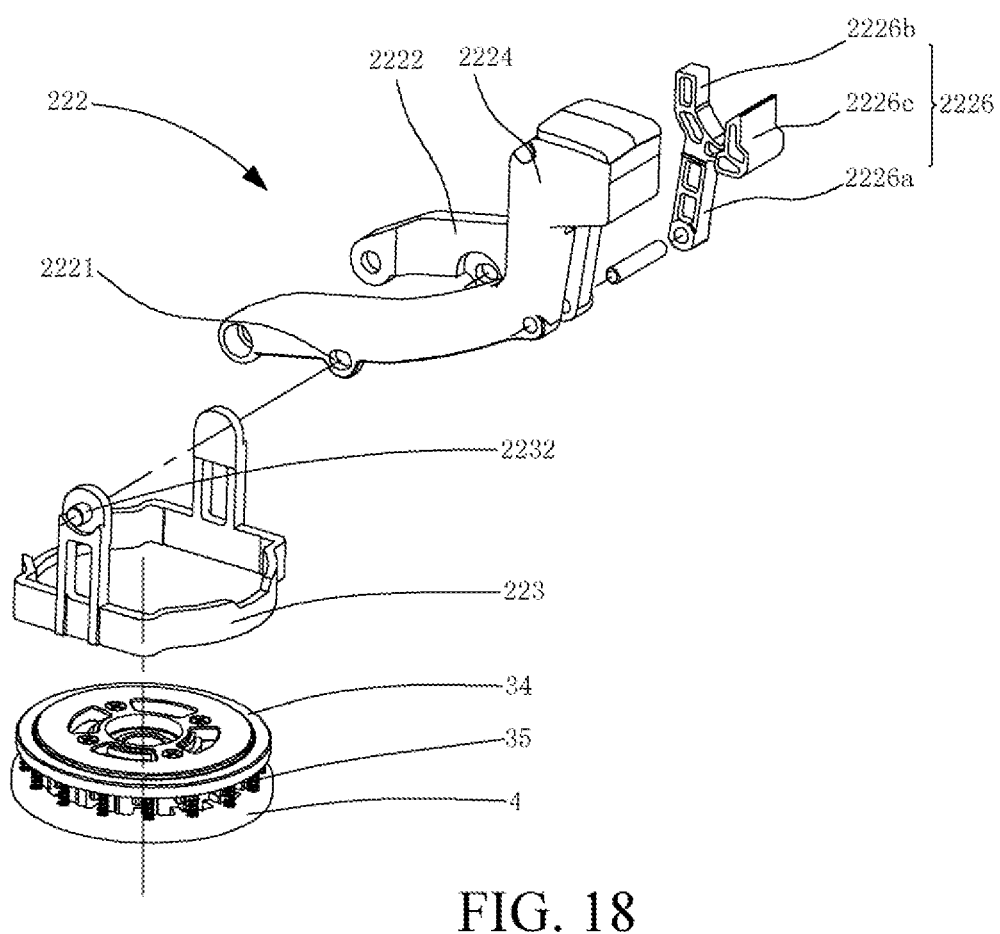
FIG. 18 is a schematic exploded diagram of the release component in the sanding machine in FIG. 17.

Referring to FIG. 16, FIG. 17, and FIG. 18, this embodiment has a structure similar to the sanding machine 100 in Embodiment 1, and the same structures are represented by the same reference numerals and will not be repeated. In this embodiment, one end of the control member of the release component is hingedly connected to the housing 110 of the machine body 1 and rotates relative to the housing 110 by taking a hinge point 111 of the end and the housing 110 as a rotation center, the control member is an unlocking wrench 222, the transmission member is a lower pressure ring 223, and the installation portion is a tension ring 34.

Specifically, the annular lower pressure ring 223 is sleeved over the housing 110, and one end of the lower pressure ring 223 is rotatably connected to the unlocking wrench 222 through a pin shaft, and the other end may bear against the tension ring 34 of the drive component 3. The lower pressure ring 223 is driven by the unlocking wrench 222 to move along an axial direction of an output shaft by taking a connection point 2231 of the lower pressure ring 223 and the unlocking wrench 222 as a support point, to drive the tension ring 34 of the drive component 3 to move axially along the output shaft.

The unlocking wrench 222 has kidney-shaped holes 2221, the low pressure ring 223 includes an installation column 2232 locked in the kidney-shaped holes 2221, the installation column 2232 may move in the kidney-shaped holes 2221, to make the lower pressure ring 223 be rotatably connected to the unlocking wrench 222 and allow the lower pressure ring 223 to axially move along the output shaft.

Specifically, the unlocking wrench 222 includes an installation portion 2222 and a locking portion 2224 disposed at one end of the installation portion 2222 and connected to the installation portion 2222 by a certain angle. One end of the installation portion 2222 away from the locking portion 2224 is hingedly connected to the housing 110 and the locking wrench 222 rotates by taking a hinge point 111 of the installation portion 2222 and the housing 110 as a center. The kidney-shaped hole 2221 are disposed in the installation portion 2222, and the kidney-shaped holes 2221 are disposed on the installation portion 2222 along the extension of the installation portion 2222 relative to the locking portion 2224.

In this embodiment, the installation portion 2222 includes two rotating arms (not numbered) disposed alternately, and the housing 110 passes through the two rotating arms. One end of each of the two rotating arms is fixedly connected to the locking portion 2224, and the other end has an installation hole, so that the rotating arms may be rotatably connected to the housing 110 through a pin shaft. The kidney-shaped hole 2221 is disposed in the middle of each of the rotating arms. Furthermore, a lug is disposed in the middle of each of the rotating arms and the kidney-shaped hole 2221 is formed in the lug.

The lower pressure ring 223 substantially has an annular structure and has two connection arms that are disposed opposite to each other. The two connection arms extend toward the locking wrench 222, and an installation column 2232 is disposed at one end of each of the two connection arms that is connected to the locking wrench 222. The installation columns 2232 are locked in the kidney-shaped hoes 2221 and may move in the kidney-shaped hoes 2221, so that the lower pressure ring 223 may be rotatably connected with the unlocking wrench 222, and when the unlocking wrench 222 is rotating, the lower pressure ring 223 can move up and down along an axial direction of the output shaft under restriction of the kidney-shaped holes 2221 without interfering the rotation of the unlocking wrench 222.

The sanding machine further includes a maintenance mechanism that can keep the installation portion in a disassembly state, and through the maintenance mechanism, the tension ring 34 may be kept at an unlocking position, that is, the second position. The maintenance mechanism includes a locking member 2226 connected to the locking portion 2224 and a holding member 123 disposed in the housing 110. The locking member 2226 may be driven by the unlocking wrench 222 to rotate in a direction close to the drive component 3 and hold in the holding member 123 in the housing 110, to prevent the unlocking wrench 222 from returning toward the housing 110. In this way, when the unlocking wrench 222 rotates in a direction close to the drive component 3 till the working baseplate may be separated from the drive component 3, the unlocking wrench 222 is blocked by the locking member 2226 to be locked, so that an operator may replace the working baseplate conveniently without worrying about the unlocking wrench 222 returning toward the housing 110.

Figure 19:
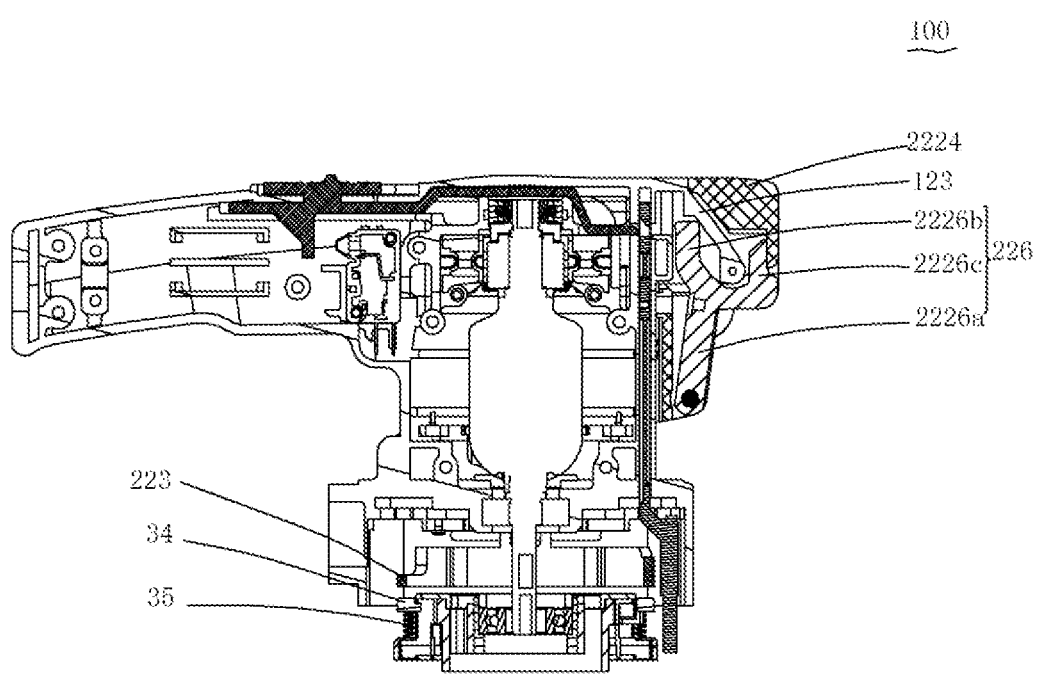
FIG. 19 is a cross-sectional view of the sanding machine in FIG. 16 when a working baseplate is in a normal working state.

As shown in FIG. 18 and FIG. 19, specifically, the holding member 123 is disposed in the housing 110 of the sanding machine 100 at a position close to the locking member 2226, and the locking member 2226 includes a locking member body 2226a and a first locking portion 2226b disposed on the locking member body 2226a. One end of the locking member body 2226a away from the first locking portion 2226b is connected to the locking portion 2224 of the unlocking wrench 222 through a pin shaft, to rotate with the unlocking wrench 222. One end of the first locking portion 2226b away from the locking member body 2226a may bear against the holding member 123, to lock the unlocking wrench 222.

Furthermore, the locking member 2226 further includes a second locking portion 2226c that is disposed at one end of the locking member body 2226a having the first locking portion 2226b and disposed alternately with the first locking portion 2226b. The holding member 123 may be inserted between the first locking portion 2226b and the second locking portion 2226c, when the locking member 2226 rotates with the unlocking wrench 222, the holding member 123 may move in an accommodation space formed by the first locking portion 2226b and the second locking portion 2226c, that is, the holding member 123 moves from a bottom of the first locking portion 2226b close to one side of the second locking portion 2226c to a top of the first locking portion 2226b, to bear against the first locking portion 2226b. One side of the second locking portion 2226c away from the first locking portion 2226b bears against an inner wall of the unlocking wrench 222, to prevent the unlocking wrench 222 from rotating in a direction away from the drive component 3. When the unlocking wrench 222 needs to rotate to move the lower pressure ring 223 away from the drive component 3, an operator may press the locking member 2226 manually to separate the locking member 2226 from the holding member 123, to release a locking state of the unlocking wrench 222. When no external force is applied on the unlocking wrench 222, the unlocking wrench 222 is kept at a predetermined position because the locking member 2226 bear against the holding member 123.

Figure 20:
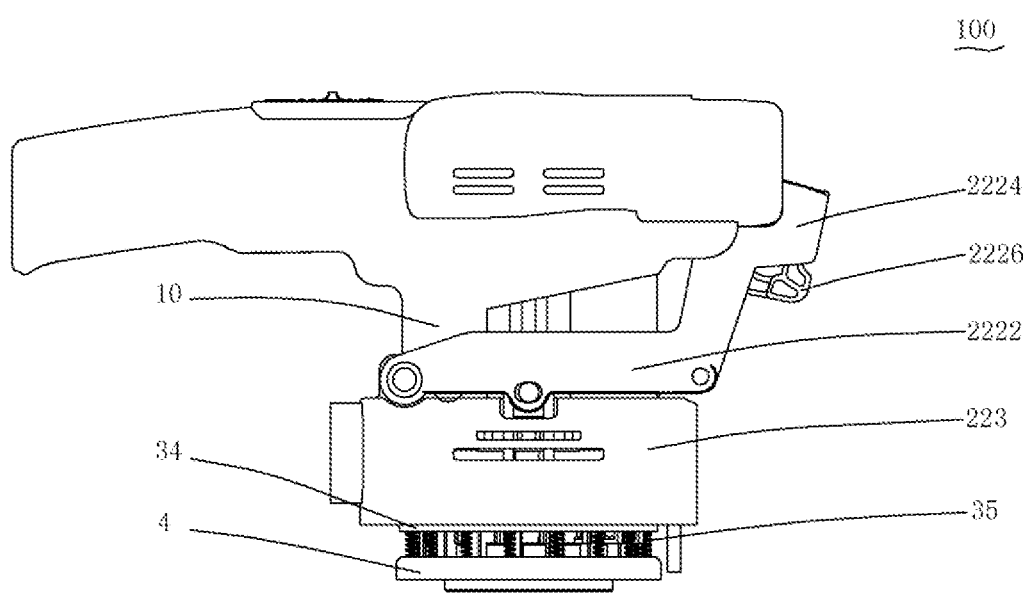
FIG. 20 is a schematic diagram of the sanding machine in FIG. 16 when the working baseplate is in a disassembly state.
Figure 21:
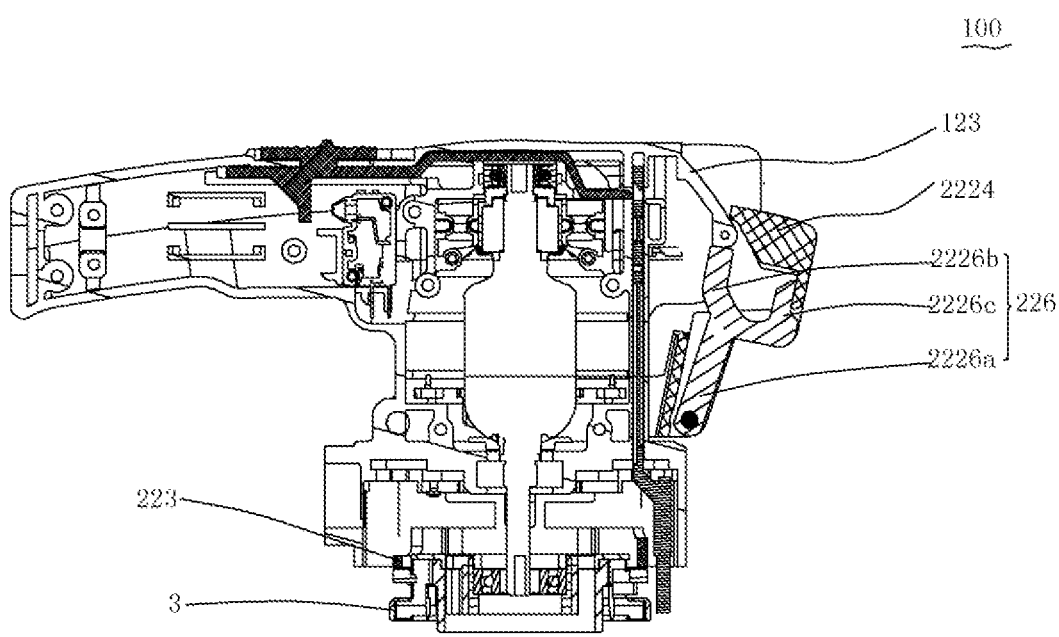
FIG. 21 is a cross-sectional view of the sanding machine in FIG. 16 when the working baseplate is in a disassembly state.

As shown in FIG. 19 to FIG. 21, when the working baseplate needs to be replaced, the unlocking wrench 222 is pressed downward to rotate in a direction close to the drive component 3 by taking the hinge point 111 of the unlocking wrench 222 and the housing 110 as a rotation center, to drive the lower pressure ring 223 to move toward the first clamping members 341 of the drive component 3, the lower pressure ring 223 further pushes the first clamping members 341 of the tension ring 34 to move toward the second clamping members 42, so that the tension ring 34 overcomes an action of the elastic members 35 to move to an unlocking position, that is, the second position, and the elastic members 35 are in a compression state. At this time, a working baseplate fitted to the output head body 36, such as a round sanding baseplate 4, is allowed to be separated from the output head body 36. In this case, the locking member 2226 is driven by the unlocking wrench 222 to rotate to bear against the holding member 123, to prevent the unlocking wrench 222 from returning during a replacement process of the working baseplate.

After the operator replaces the working baseplate, the locking member 2226 may be pressed to separate from the holding member 123, to rotate the unlocking wrench 222 in a direction away from the drive component 3, so that the first clamping members 341 move away from the second clamping members 42. In this case, under an acting force of the elastic members 35, the tension ring 34 restores to an initial position, to lock the working baseplate on the output head body 36.

For the sanding machine 100 in this embodiment, the operator may rotate the unlocking wrench 222 to sequentially drive the lower pressure ring 223 and the drive component 3 to move in an axial direction of the housing 110, so that the drive component 3 is switched between an installation state and a disassembly state, and finally, the working baseplate may be separated from the drive component 3, to finish replacement of the working baseplate. Furthermore, the maintenance mechanism can prevent the unlocking wrench 222 from returning to the housing 110 during a replacement process of the working baseplate, so that the operator can finish replacement of the working baseplate conveniently and leisurely.

Embodiment 3

Figure 22:
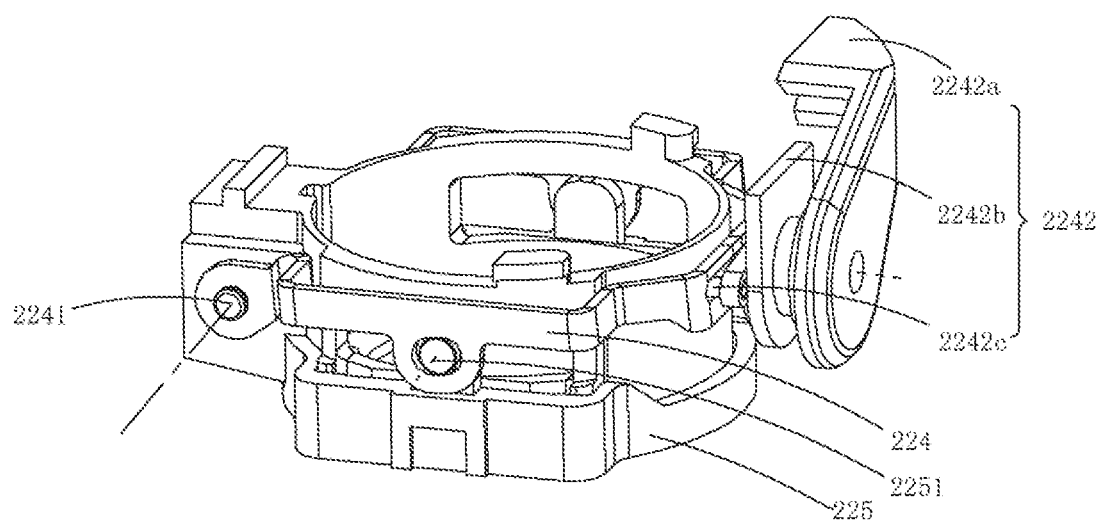
FIG. 22 is a schematic structural diagram of a release component in a sanding machine according to Embodiment 3.
Figure 23:
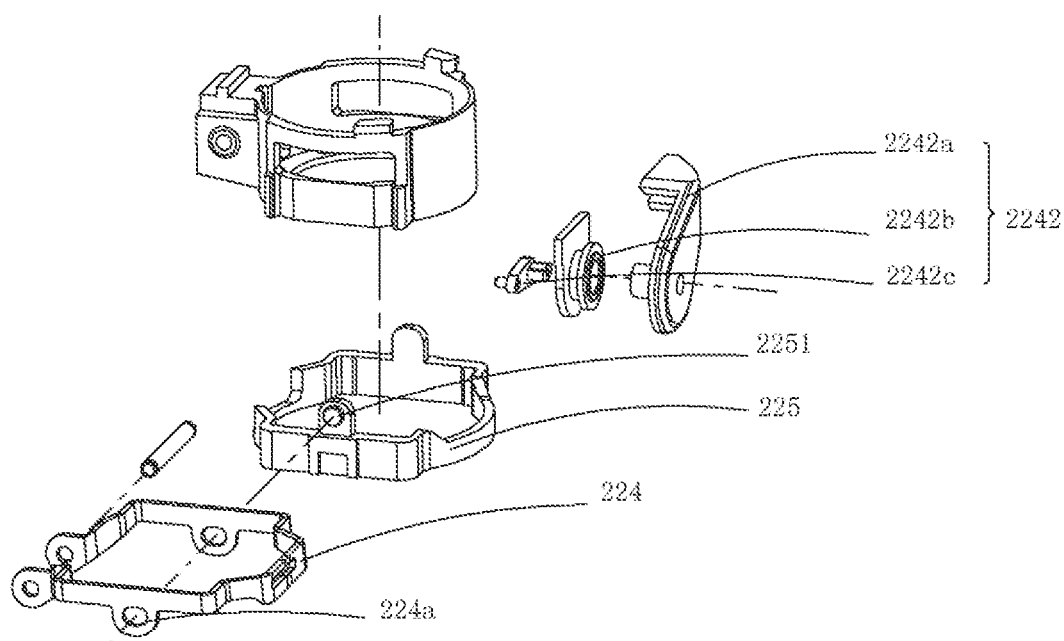
FIG. 23 is a schematic exploded diagram of the release component in the sanding machine in FIG. 22.

Referring to FIG. 3, FIG. 22, and FIG. 23, this embodiment has a structure similar to that in Embodiment 1, and the same structures are represented by the same reference numerals and will not be repeated. In this embodiment, one end of the control member is hingedly connected to the housing 110, and the control member rotates by taking the hinge point 2241 of the control member and the housing 110 as a rotation center.

Specifically, the control member of the release component is an unlocking pressure rod 224, and the transmission member is a lower pressure ring 225. The annular lower pressure ring 225 is sleeved over the housing 110, and one end of the lower pressure ring 224 is rotatably connected to the unlocking pressure rod 224 through a pin shaft, and the other end may bear against the drive component 3. The lower pressure ring 225 is driven by the unlocking pressure rod 224 to move along an axial direction by taking a connection point of the lower pressure ring 225 and the unlocking pressure rod 224 as a support point, to drive the tension ring 34 to move.

The unlocking pressure rod 224 has a kidney-shaped hole 224a, the low pressure ring 225 includes an installation column 2251 locked in the kidney-shaped hole 224a, the installation column 2251 may move in the kidney-shaped hole 224a, to make the lower pressure ring 225 be rotatably connected to the unlocking pressure rod 224 and allow the lower pressure ring 225 to move in an axial direction.

The sanding machine 100 further includes an operation member configured to drive the tension ring 34 to an unlocking position, that is, the second position, and a maintenance mechanism configured to maintain the tension ring 34 at the second position. The operation member is fitted to the unlocking pressure rod 224, and operably drives the unlocking pressure rod 224 to move. Specifically, the operation member includes a button component 2242 installed on the unlocking pressure rod 224, and the unlocking pressure rod 224 is driven by the button component 2242 to rotate relative to the housing 110 and is positioned under restriction of the maintenance mechanism. In this way, when the unlocking wrench 224 rotates in a direction close to the drive component 3 till the working baseplate may be separated from the drive component 3, the unlocking wrench 224 is blocked by the locking member 2242 to be locked, so that an operator may replace the working baseplate conveniently without worrying about the unlocking wrench 224 returning toward the housing 110.

Specifically, the button component 2242 includes a button 2242a, a button support shaft 2242b, and a button pin 2242c disposed on the button 2242a. One end of the button 2242a passes through the button support shaft 2242b and rotates around a center axis of the button support shaft 2242b, to drive the button pin 2242c located at one side of the center axis to rotate around the center axis. The unlocking pressure rod 224 has a runner, and the button pin 2242c is inserted in the runner and slides along the runner during a rotation process. Since the button pin 2242c is located at one side of the center axis, rotation of the button pin 2242c may drive the unlocking pressure rod 224 to rotate by taking the hinge point 2241 as a rotation center. The maintenance mechanism in this embodiment includes a blocking member (not shown) disposed in the housing 110, and when the button 2242a rotates to a position bearing against the blocking member, the tension ring 34 is kept at the second position.

Figure 24:
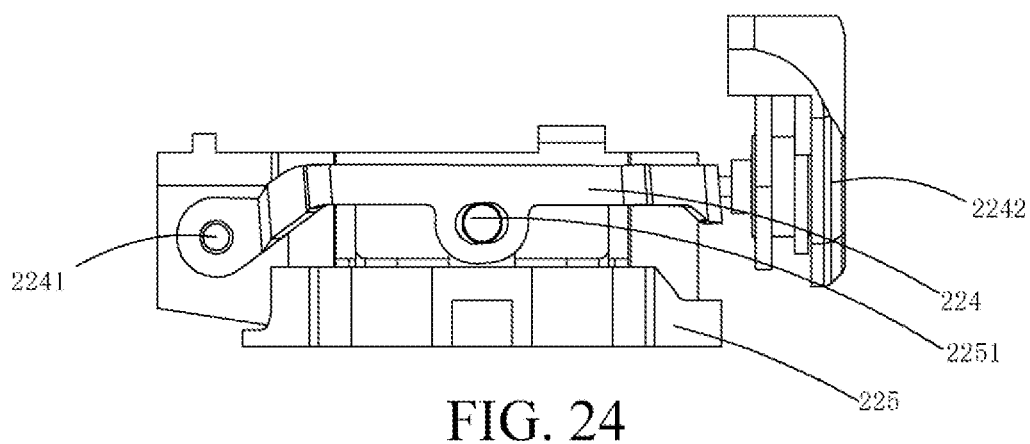
FIG. 24 is a schematic diagram of the release component in FIG. 22 when a working baseplate is in an installation state.
Figure 25:
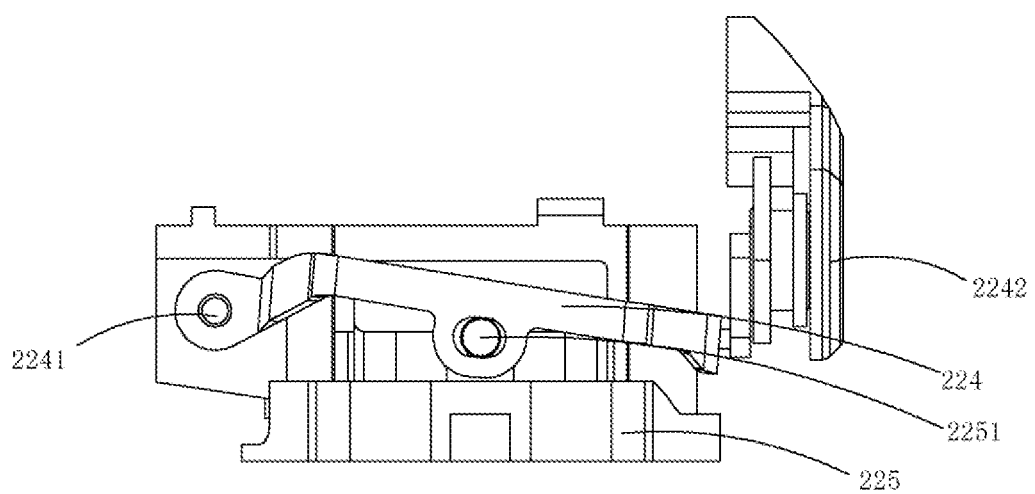
FIG. 25 is a schematic diagram of the release component in FIG. 22 when the working baseplate is in a disassembly state.

As shown in FIG. 3, FIG. 24, and FIG. 25, when the button 2242a is controlled to rotate in one direction, the button 2242a can drive the unlocking pressure rod 224 to rotate by taking the hinge point 2241 of the button 2242 and the housing 110 as a rotation center, to drive the lower pressure ring 225 to move in a direction close to the drive component 3. The lower pressure ring 225 then pushes the first clamping members 341 of the tension ring 34 to move toward the second clamping members 42, so that the tension ring 34 overcomes an action of the elastic members 35 to move to the unlocking position, that is, the second position, and in this case, the elastic members 35 are in a compression state, and a working baseplate, for example, the round sanding baseplate 4, fitted to the output head body 36, is allowed to be separated from the output head body 36. After the operator replaces the working baseplate, the button component 2242 is controlled to rotate and return in another direction, to move the lower pressure ring 224 away from the drive component 3, so that the first clamping members 341 move away from the second clamping members 42. In this case, under an acting force of the elastic members 35, the tension ring 34 restores to the initial position, to lock the working baseplate on the output head body 36.

For the electric tool in Embodiment 3, the operator may manually rotate the button 2242a to drive the unlocking pressure rod 224 to rotate, to drive the lower pressure ring 225 and the drive disc installation structure 30 to move in an axial direction of the housing 110, to switch the drive component 3 between an installation state and a disassembly state, and finally, the working baseplate may be separated from the drive component 3, to finish replacement of the working baseplate.

Embodiment 4

Figure 26:
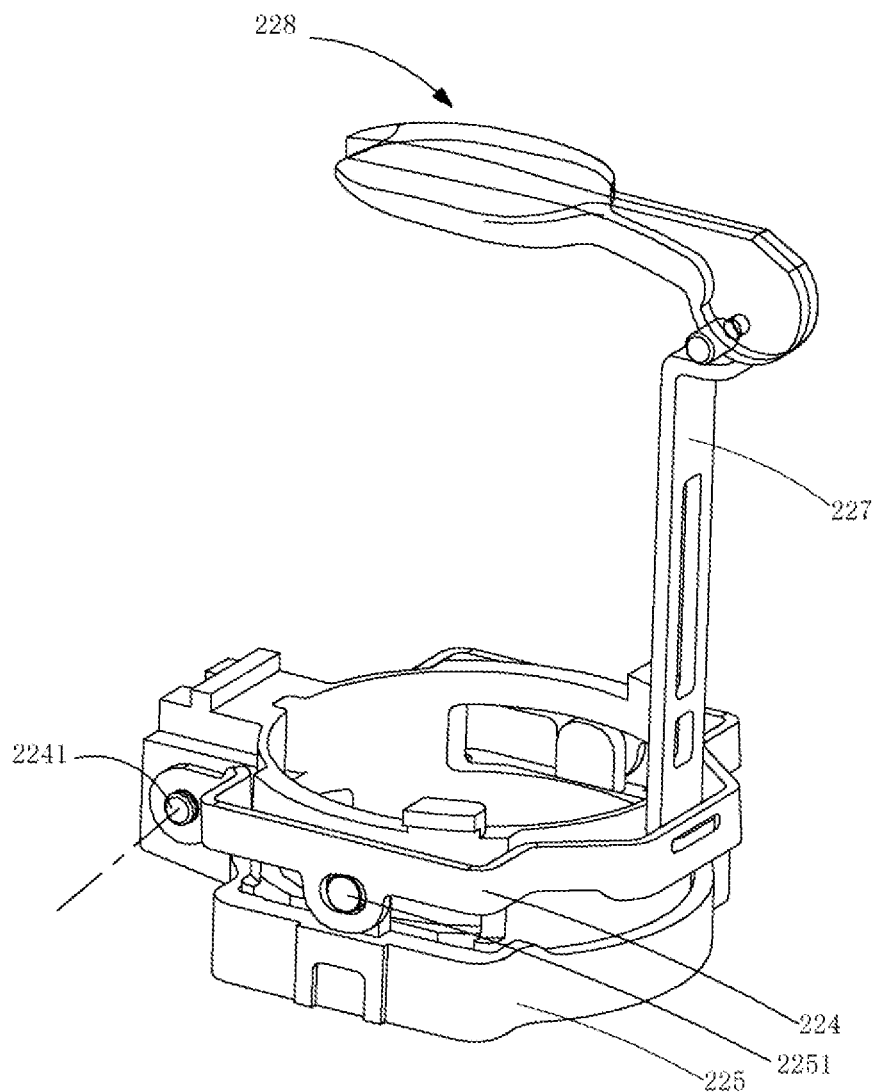
FIG. 26 is a schematic structural diagram of a release component in a sanding machine according to Embodiment 4.
Figure 27:
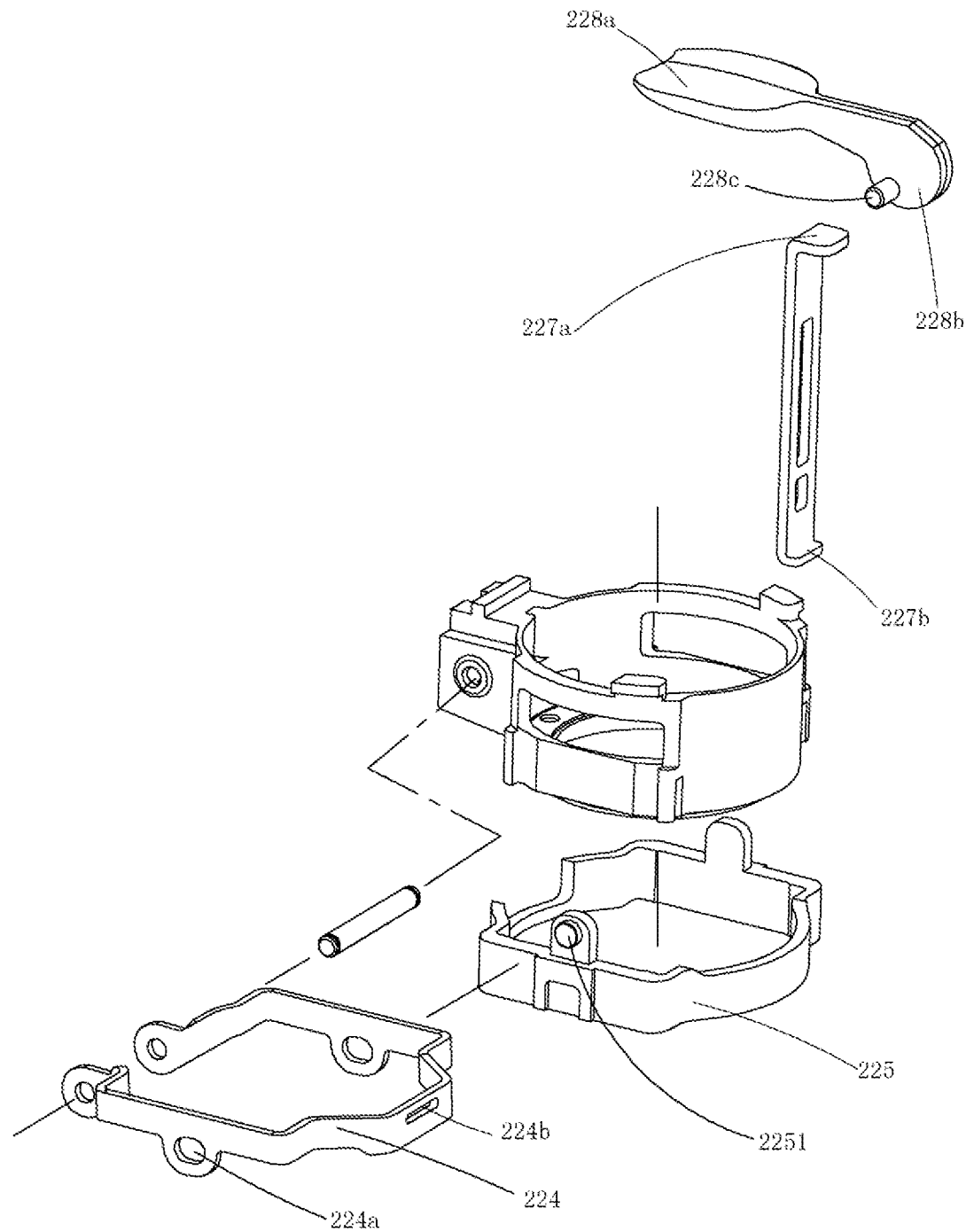
FIG. 27 is a schematic exploded diagram of the release component in the sanding machine in FIG. 26.

Referring to FIG. 26 and FIG. 27, this embodiment is a deformation of Embodiment 3, and the same structures are represented by the same reference numerals and will not be repeated. In this embodiment, the operation member drives the unlocking pressure rod 224 to rotate around the hinge point 2241, the operation member is a cam wrench 228, and a connection rod 227 connected to the cam wrench 228 converts rotation of the cam wrench 228 to axial motion of the connection rod 227. The cam wrench 228 may be connected to the housing (not shown) rotatably and relatively through a pivot 228c, and the cam wrench 228 includes an operation portion 228a and a cam portion 228b. The connection rod 227 has a first fitting end 227a fitted to the cam portion 228b and a second fitting end 227b fitted to the unlocking pressure rod 224. The connection rod 227 is vertically disposed in the housing, the first fitting portion 227a of the connection rod 227 abuts against the cam wrench 228 disposed outside the housing, and the second fitting end 227b and a slot 224b of the unlocking pressure rod 224 are engaged and fitted. The connection rod 227 is disposed between the cam wrench 228 and the unlocking pressure rod 224, so that rotation of the cam wrench 228 is converted to rotation of the unlocking pressure rod 224 through the connection rod 227.

Figure 28:
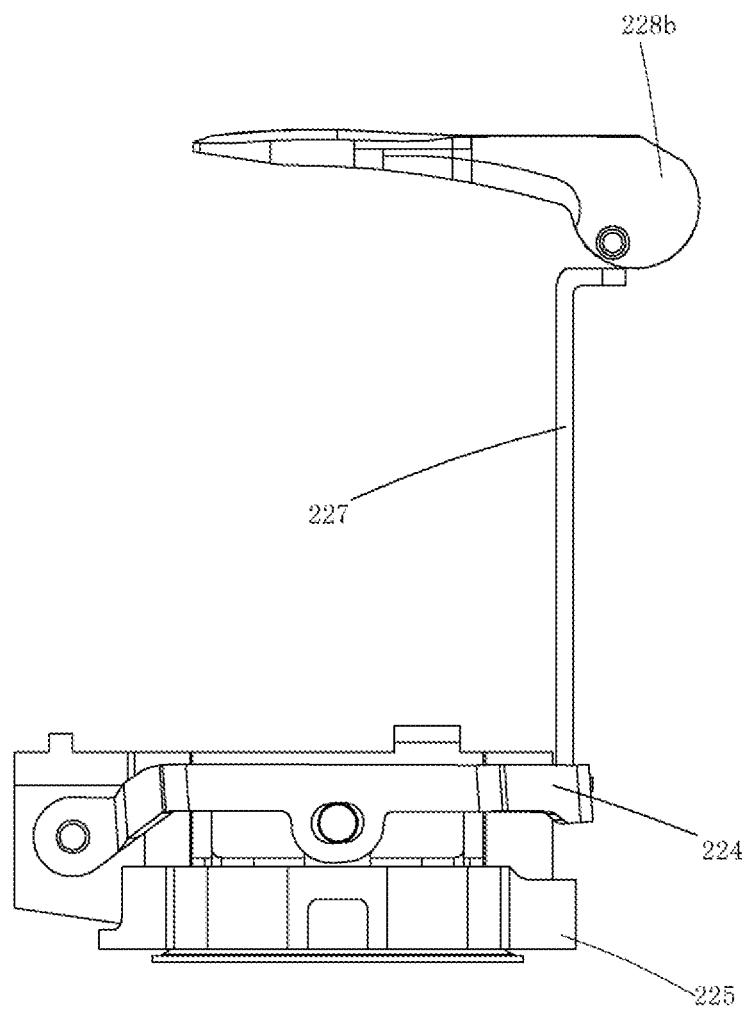
FIG. 28 is a schematic diagram of the release component of the sanding machine in FIG. 26 when a working baseplate is in an installation state.

As shown in FIG. 28, if only the operation portion 228a controls the cam wrench 228 to rotate around the pivot 228c relative to the housing, the unlocking pressure rod 224 is driven by the connection rod 227 to rotate around the hinge point 2241, to drive the lower pressure ring 225 to move axially, and the lower pressure ring 225 drives the tension ring 34 to overcome an action of the elastic members 35 to axially move between the initial position and the unlocking position.

Since the kidney-shaped hole 224a of the unlocking pressure rod 224 is disposed at a substantially middle position between the hinge point 2241 and the slot 224b, when the unlocking pressure rod 224 fitted to the connection rod 227 through the slot 224b is pivotally rotating, the connection point 2251 engaged with the kidney-shaped hole 224a drives the lower pressure ring 225 to move in an axial direction stably relatively.

Figure 29:
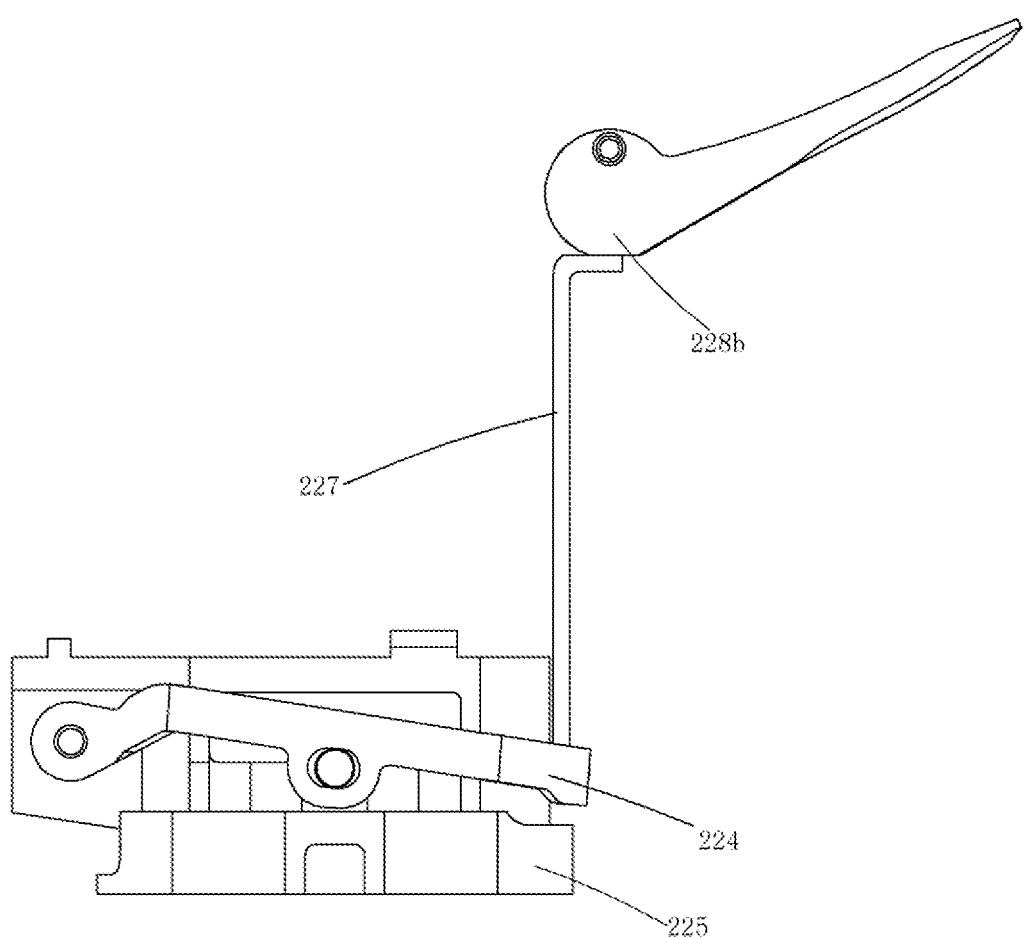
FIG. 29 is a schematic diagram of the release component of the sanding machine in FIG. 26 when the working baseplate is in a disassembly state.

When the operation portion 228a of the cam wrench 228 is located at the first position, a cam surface of the cam portion 228b is closest to the pivot 228c, the connection rod 227 is located at a high position under an action of the elastic members (not shown), and in this case, the unlocking pressure rod 224, the lower pressure ring 225, and the tension ring 34 are all located at the initial positions. As shown in FIG. 29, when the operation portion 228a of the cam wrench 228 pivotally rotates around the pivot 228c to reach the second position, the cam surface of the cam portion 228b is farthest from the pivot 228c, the connection rod 227 overcomes an action of the elastic members (not shown) to be pressed to reach a low position, axial movement of the connection rod 227 drives the unlocking pressure rod 224 to rotate relative to the housing, to push the lower pressure ring 225 to move in an axial direction, to move the tension ring to the unlocking position, that is, the second position.

Embodiment 5

Figure 30:
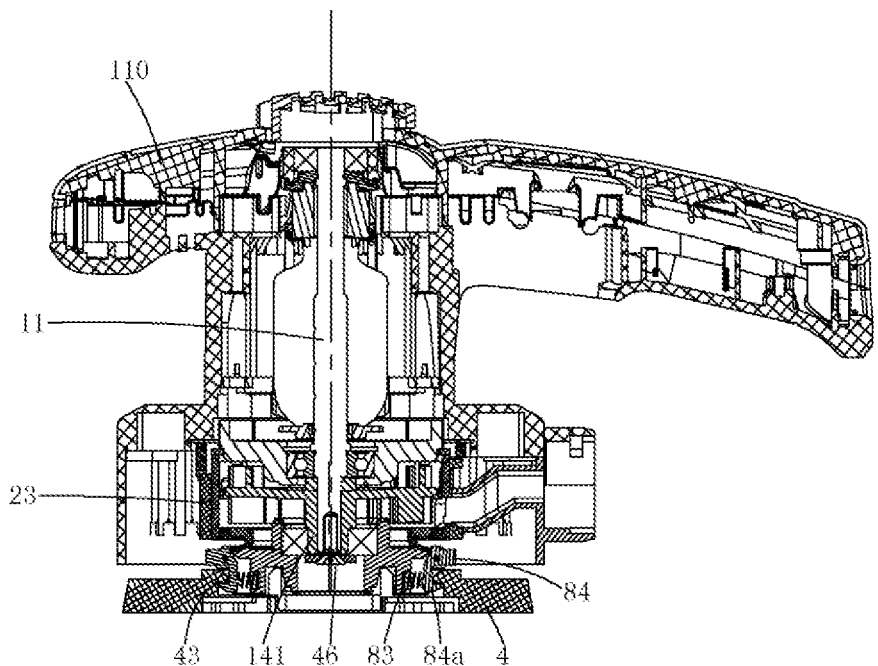
FIG. 30 is a cross-sectional view of a sanding machine in a working mode in a main view direction according to Embodiment 5 of the present invention.
Figure 31:
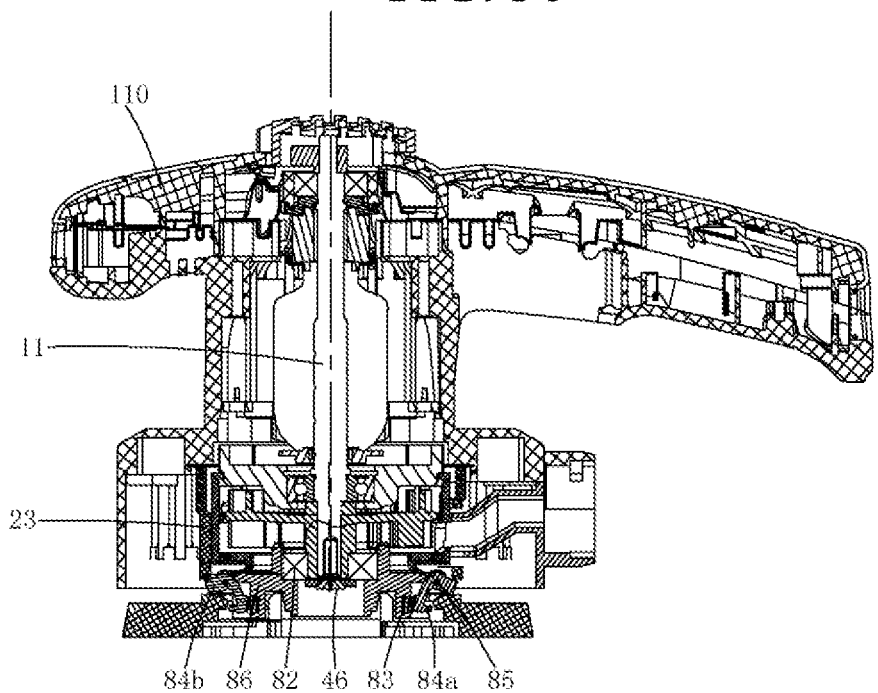
FIG. 31 is a cross-sectional view of the sanding machine in FIG. 30 in a disassembly mode in the main view direction.
Figure 32:
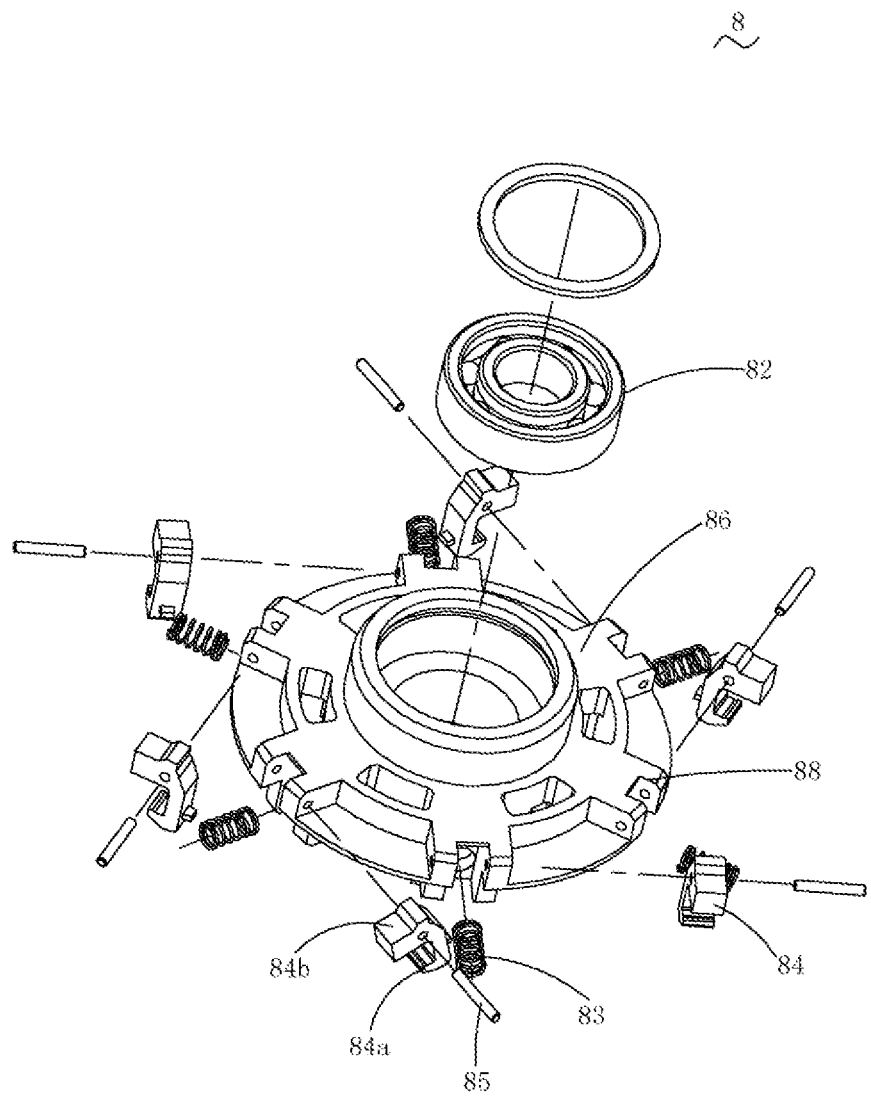
FIG. 32 is a schematic three-dimensional exploded diagram of a drive component in FIG. 30.

Referring to FIG. 30 to FIG. 32, this embodiment has a structure similar to that in Embodiment 1, and the same structures are represented by the same reference numerals and will not be repeated. The drive component 8 in this embodiment is fitted to the round sanding baseplate and the flat sanding baseplate alternately, to perform a round sanding operation mode or a flat sanding operation mode respectively, and to describe conveniently, this embodiment is described by using the round sanding baseplate 4'.

The drive component 8 includes an output head body 86 and a tension ring, that is, first clamping members 84, movably disposed on the output head body 86. Specifically, there are several first clamping members 84 that are respectively distributed along the output head body 86 in a circumferential direction. The difference lies in that, installation bases 88 are disposed on the output head body 86 at positions corresponding to the first clamping members 84. The first clamping members 84 are pivotally connected to the installation bases 88 through rotation pins 85. In addition, resetting units, that is, springs 83, are disposed between the first clamping members 84 and the installation bases 88, one end of each of the springs 83 abuts against one of the installation bases 88, and the other end abuts against one of the first clamping member 84, so that the first clamping members 84 are held at the initial positions under an action of the springs 83. Each of the first clamping members 84 has a hook portion 84*a* and an action portion 84*b* that may selectively abut against the cam member 23. When the first clamping members 84 are at the initial positions, the hook portions 84*a* are at the first positions. In this case, the hook portions 84*a* and a second clamping surface 43' of the working baseplate, such as the round sanding baseplate 4', are locked cooperatively, to prevent the round sanding baseplate 4' from being separated from or disassembled from the drive component 8. The drive component 8 is connected to the motor shaft 11 through the fastener 48, and the output head body 86 may be rotatably connected to an eccentric output end 141 through a bearing 82 The action portions 84*b* of the first clamping members 84 are pivoted around the rotation pins 85 under a downward pressure action of the cam member 23, so that the hook portions 84*a* and the second clamping member of the round sanding baseplate 4' are disconnected and unlocked, to allow the round sanding baseplate 4' to be separated from or disassembled from the drive component 8.

Figure 33:
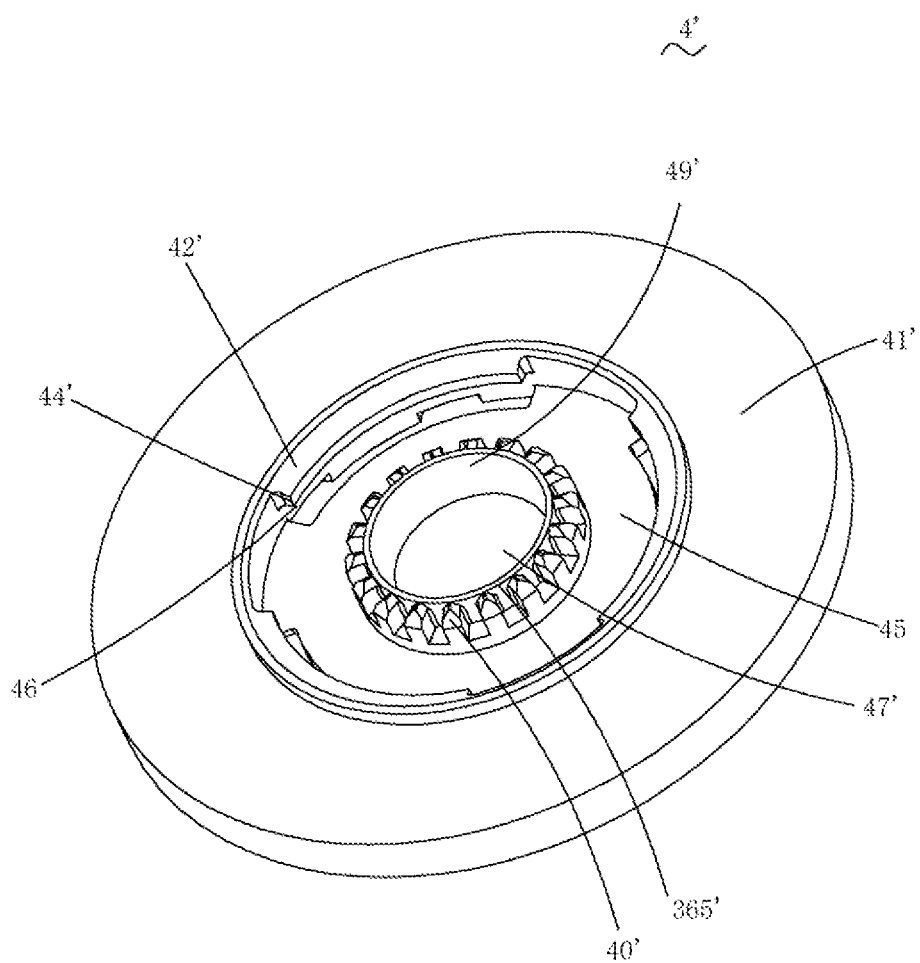
FIG. 33 is a schematic three-dimensional diagram of a round sanding baseplate in FIG. 30.

Referring to FIG. 33, the round sanding baseplate 4' has a center circular groove 47', and a torque transmission portion 40' is disposed around the center circular groove 47' and fitted to a torque transmission portion (not shown) on the output head body 86, to transmit motion of the drive component 8 to the round sanding baseplate 4'. An annular boss is disposed between the torque transmission portion 40' and the center circular groove 47' and an inner side surface of the annular boss is set as an axial cone surface 49'. A circular disc surface 41' is an annular surface provided around the center circular groove and away from the torque transmission portion 40', a groove 45 is formed between the circular disc surface 41' and the torque transmission portion 40', several second clamping members 42' are disposed on one side surface of the circular disc surface 41' close to the center circular groove 47' in a circumferential direction, each of the second clamping members 42' has a guide member 44' set as a slope and a second clamping surface 43', a slot 46 is formed between each of the second clamping surfaces 43' and the groove 45, so that the hook portions 84*a* of the first clamping members 84 enter the slots 46 along the guide portions 44' to be clamped with the second clamping surfaces 43', to lock the round sanding baseplate 4' on the output head body 86.

Figure 34:
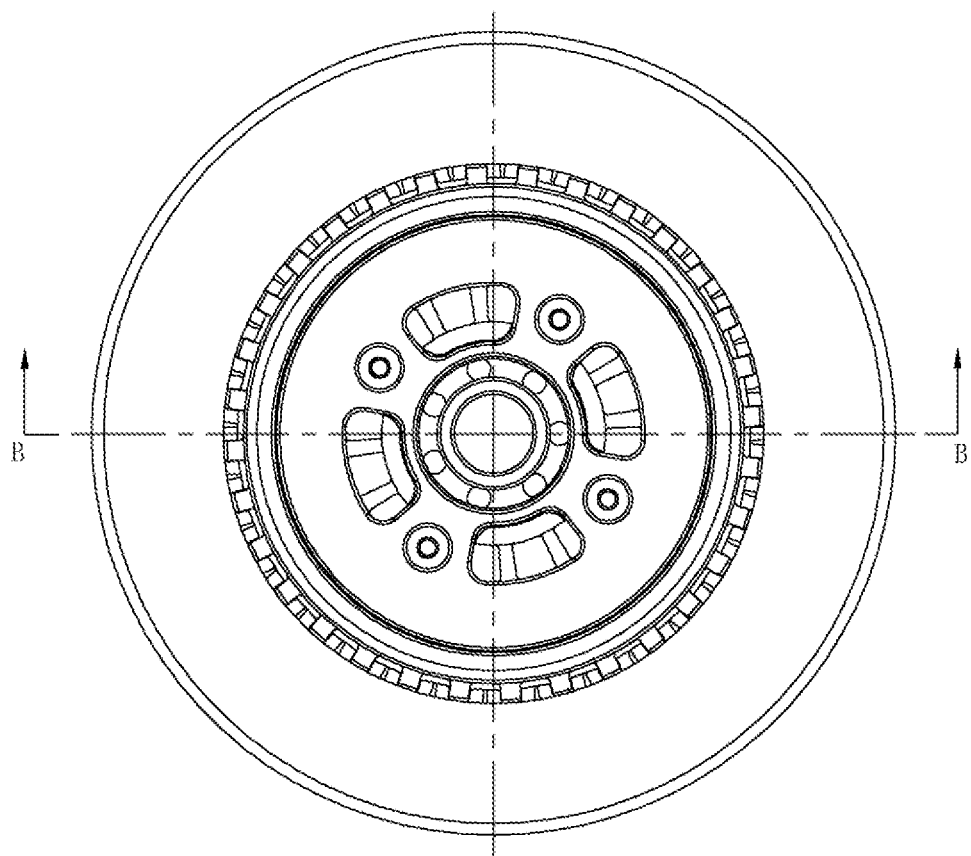
FIG. 34 is a top view of a state in which the round sanding baseplate and the drive component are connected in FIG. 30.
Figure 35:
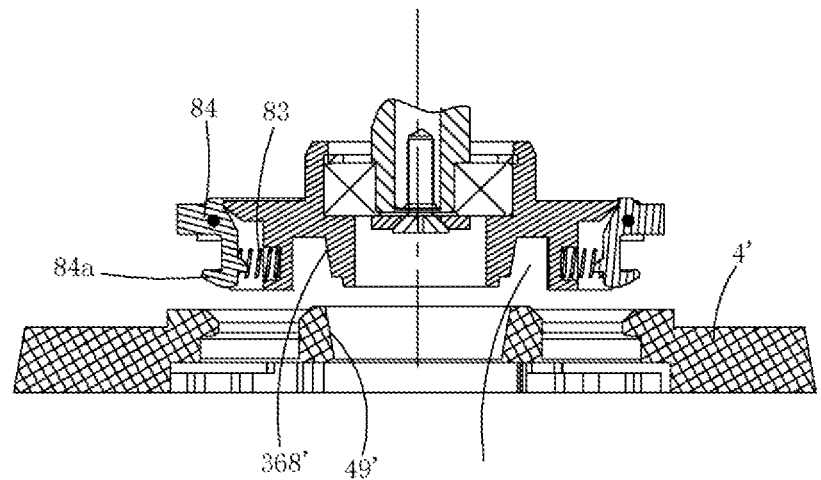
FIG. 35 to FIG. 39 are schematic cross-sectional view diagrams of a direction B-B in FIG. 34 respectively, representing state changes when the round sanding baseplate is connected to an output head body.
Figure 36:
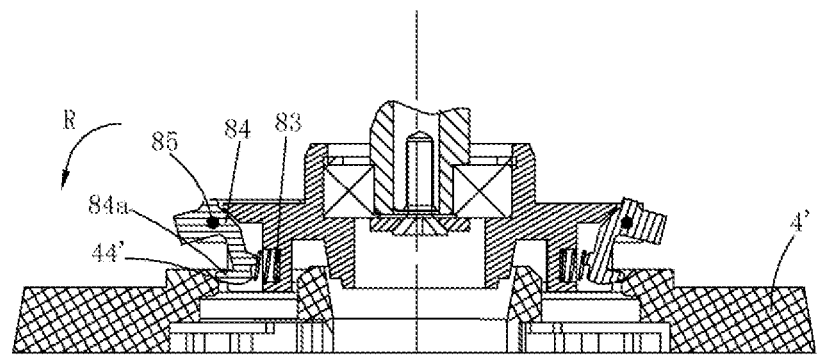
Figure 37:
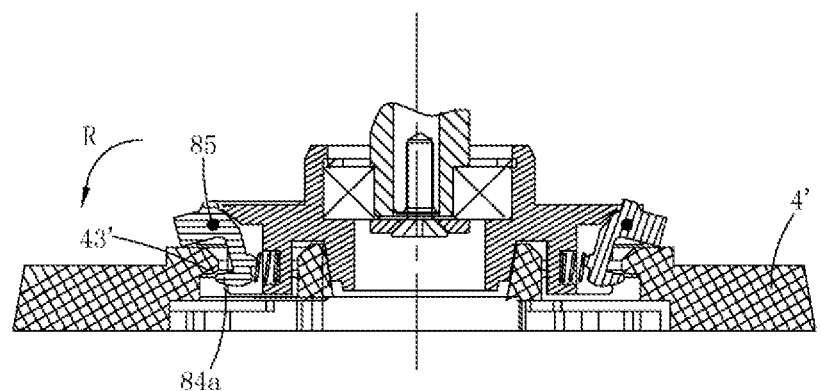
Figure 38:
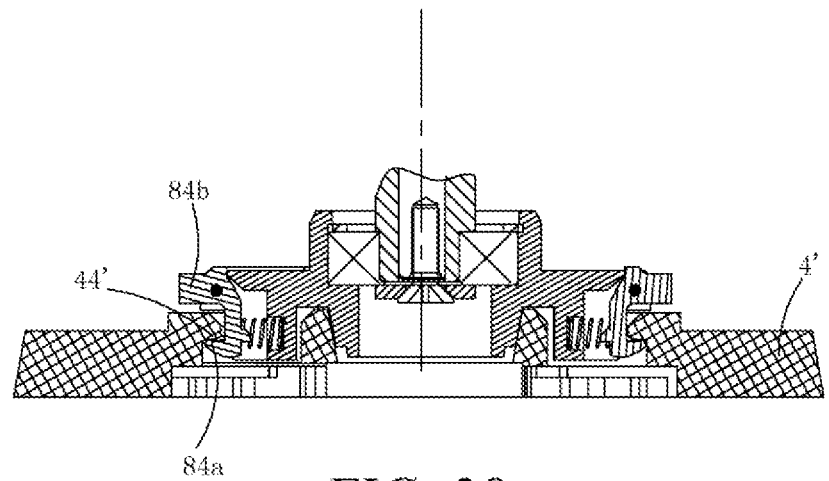

Referring to FIG. 34 and FIG. 35, a groove 89 is disposed on the bottom of the output head body 86, an inner side wall of the groove 89 is set as a cone surface 368', so that when the working baseplate, including the round sanding baseplate 4' or the flat sanding baseplate, is fitted to the output head body 86, the axial cone surface 49' of the annular boss 365 and the cone surface 368' are fitted seamlessly to achieve high fitness there-between in an axial or radial direction.

Referring to FIG. 34 to FIG. 38, when the round sanding baseplate 4' needs to be installed on the drive component 8 of the main body portion 1 of the sanding machine, the center circular groove of the round sanding baseplate 4' is aligned preliminarily with the bearing 82 of the output head body 86, and then the round sanding baseplate 4' is made to be close to the output head body 86. Under an action force applied by the operator in a direction of the motor shaft, the action portions 84*b* of the first clamping members 84 abut against the guide portions 44' of the second clamping members 42'. In this case, the first clamping members 84 compress the springs 83 and pivot around the rotation pins 85 along a direction shown by an arrow R, and at the same time, the hook portions 84*a* slide into the groove 45 along the guide portion 44'. The hook portions 84*a* finally enter the slots 46 to be clamped with the second clamping surfaces 43', to fit or lock the round sanding baseplate 4' and the drive component 8. In this case, the springs 83 are recovered to be in the initial state from the compression state and under an elastic action force of the springs 83, the round sanding baseplate 4' and the drive component 8 are kept fitted or locked.

Figure 39:
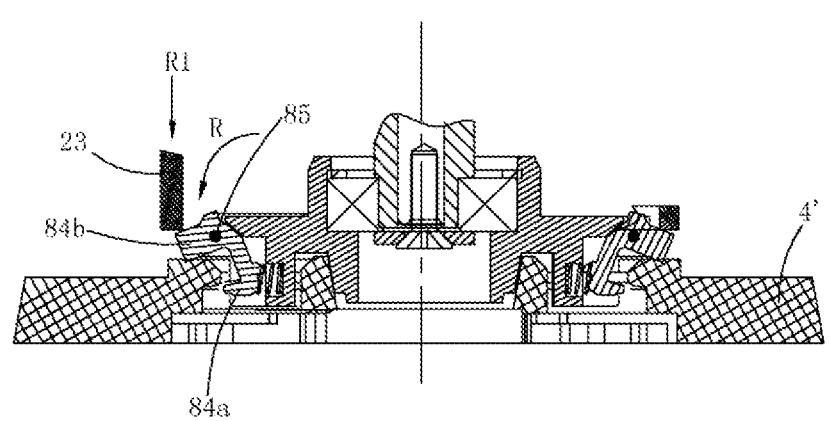

As shown in FIG. 39, when the round sanding baseplate 4' needs to be separated or disassembled from the drive component 8, the operation portion (not shown) of the control member is controlled so that the cam member 23 generates displacement along a direction R1 of the motor shaft to press the first clamping members 84 downward. In this case, the springs 83 are compressed, the action portions 84*b* pivot around the rotation pins 85 along the direction shown by the arrow R1 to stop being clamped with the second clamping surfaces 43' of the round sanding baseplate 4', to allow the round sanding baseplate 4' to be separated or disassembled from the drive component 8.

In view of the above, when the working baseplate, including the round sanding baseplate 4' and the flat sanding baseplate, is installed, the working baseplate axially moves to a fitting position relative to the drive component 8 along the motor shaft 11, so that the first clamping members 84 overcome the acting force of the springs 83 under an axial action of the working baseplate to move from the first position to the second position. When the second clamping members and the first clamping members 84 are axially clamped, under an acting force of the springs 83, the first clamping members 84 automatically return to the first position from the second position, so that the working baseplate is locked relative to the drive component 8. In this embodiment, the first clamping members 84 perform pivotal motion around the rotation pins 85. When the working baseplate is disassembled, the first clamping members 84 move from the first position to the second position, the working baseplate is axially separated from the drive component 8, and the moving the first clamping members from the first position to the second position is driven and controlled by the control member 22.

Embodiment 6

Figure 40:
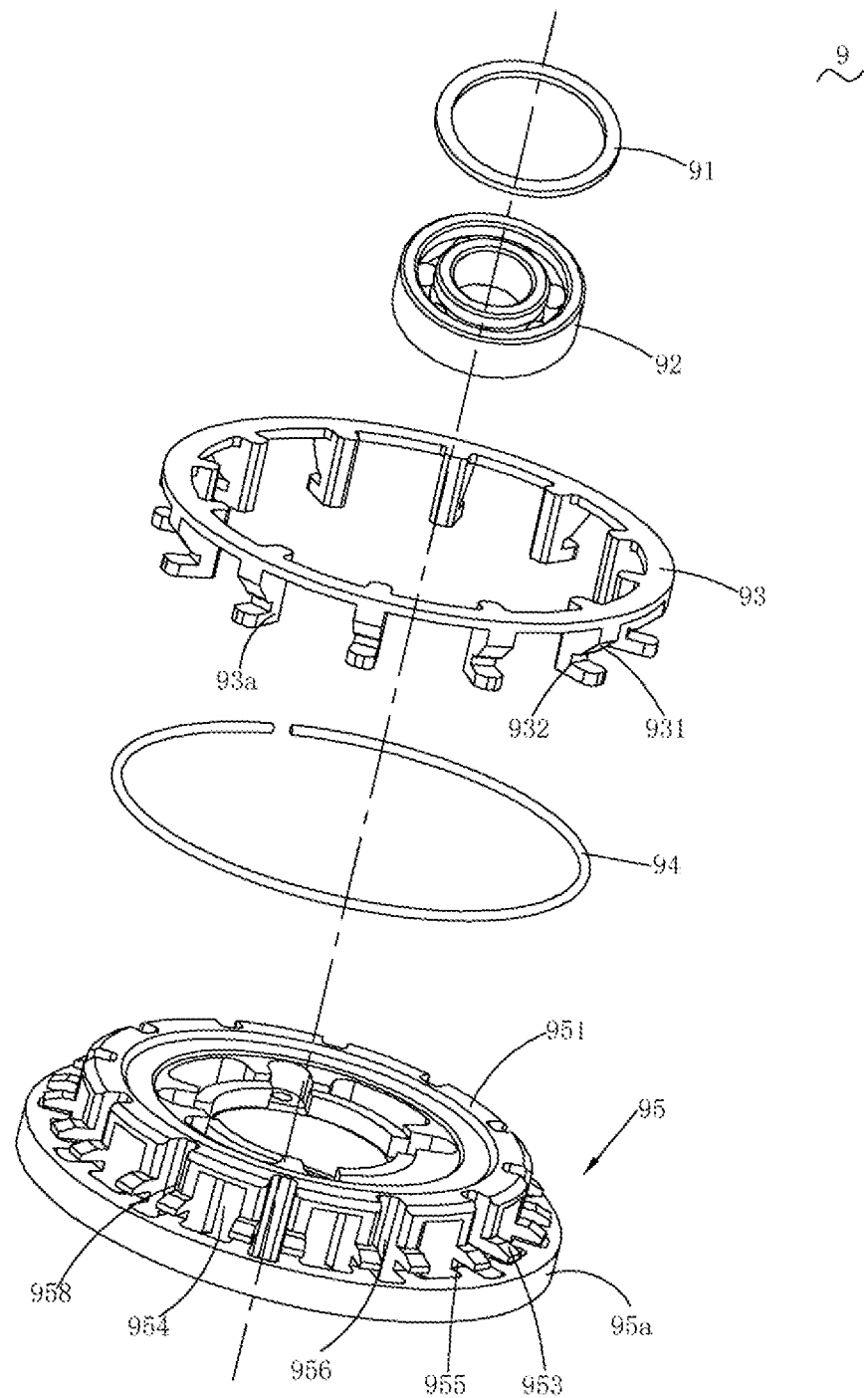
FIG. 40 is a schematic three-dimensional exploded diagram of a drive component of a sanding machine according to Embodiment 6 of the present invention.

Referring to FIG. 40, this embodiment has a structure similar to that in Embodiment 1, and the same structures are represented by the same reference numerals and will not be repeated. The drive component 9 in this embodiment is fitted to the round sanding baseplate and the flat sanding baseplate alternately, to perform a round sanding operation mode or a flat sanding operation mode respectively, and to describe conveniently, this embodiment is described by using the round sanding baseplate. The drive component 9 includes an output head body 95, an unlocking ring 93 movably disposed relative to the output head body 95, a retaining ring 94 sleeved over the unlocking ring 93, a bearing 93 fastened to the output head body 95, and a bearing retaining ring 91 located at one side of the bearing 92. The retaining ring 94 is set as an elastic annular member, and the unlocking ring 93 can generate axial displacement relative to the output head body 95 along the motor shaft 11. The unlocking ring 93 includes several arms 93*a* extending toward the output head body 95, the arms 93*a* are uniformly distributed along the unlocking ring 93 in a circumferential direction, each of the arms 93*a* has a slope 931 and a groove 932 connected to the slope 931, and in a normal situation, the retaining ring 94 is engaged into the grooves 932 of the arms 93*a*. When the unlocking ring 93 is pressed downward by the cam member 23 to generate axial displacement in a direction close to the output head body 95, a diameter of the retaining ring 94 is deformed to generate radial displacement when the retaining ring 94 slides along the slopes 931 of the arms 93*a*. The output head body 95 is substantially annular, and includes an annular surface 95*a* and a boss 951 protruding from the annular surface, the boss 951 includes several bearing members 953 distributed in a circumferential direction, the bearing members 953 extend outward in a radial direction and form grooves 955 with the annular surface 95*a*, and in a normal situation, the retaining ring 94 is engaged in the grooves 955, and the bearing members 953 provide axial limitation for the retaining ring 94. A first channel 954 and a second channel 956 are disposed on the boss 951 alternately, and the second channel 956 is used to accommodate the arms 93*a* of the unlocking ring. The second channel 956 has a bearing wall 958.

Figure 41:
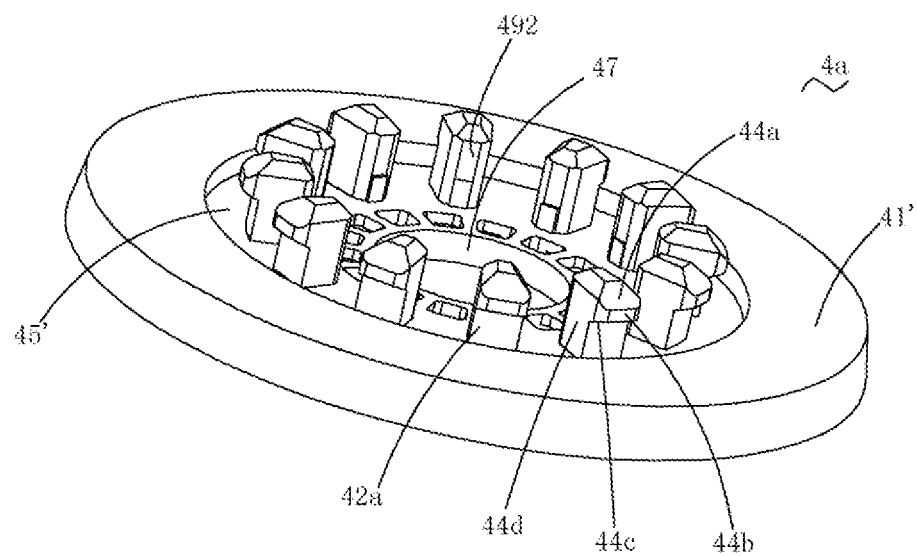
FIG. 41 is a schematic three-dimensional diagram of a round sanding baseplate of a sanding machine according to Embodiment 6 of the present invention.

Referring to FIG. 41, the round sanding baseplate 4*a* has a circular disc surface 41' and a center circular groove 47, a groove 45' lower than the circular disc surface 41' is formed in an area between the circular disc surface 41' and the center circular groove 47, several second clamping members 42*a* distributed in a circumferential direction are disposed in the groove 45', and each of the second clamping members 42*a* has a free end extending in a vertical direction, and an extension height is higher than the circular disc surface 41'. Each of the free ends of the second clamping members 42*a* has an oblique guide portion 44*a*, a transition portion 44*b* connected to the guide portion 44*a*, and a clamping portion 44*c* connected to the transition portion 44*b* and inclined in a direction opposite to the guide portion 44*a*, and an upright transmission portion 44*d* (only one shown in the figure) is respectively disposed at two sides of each of the guide portions 44*a*. The back of each of the second clamping members 42*a* has a fitting surface 492 abutting the channel wall of the first channel 954.

Figure 42:
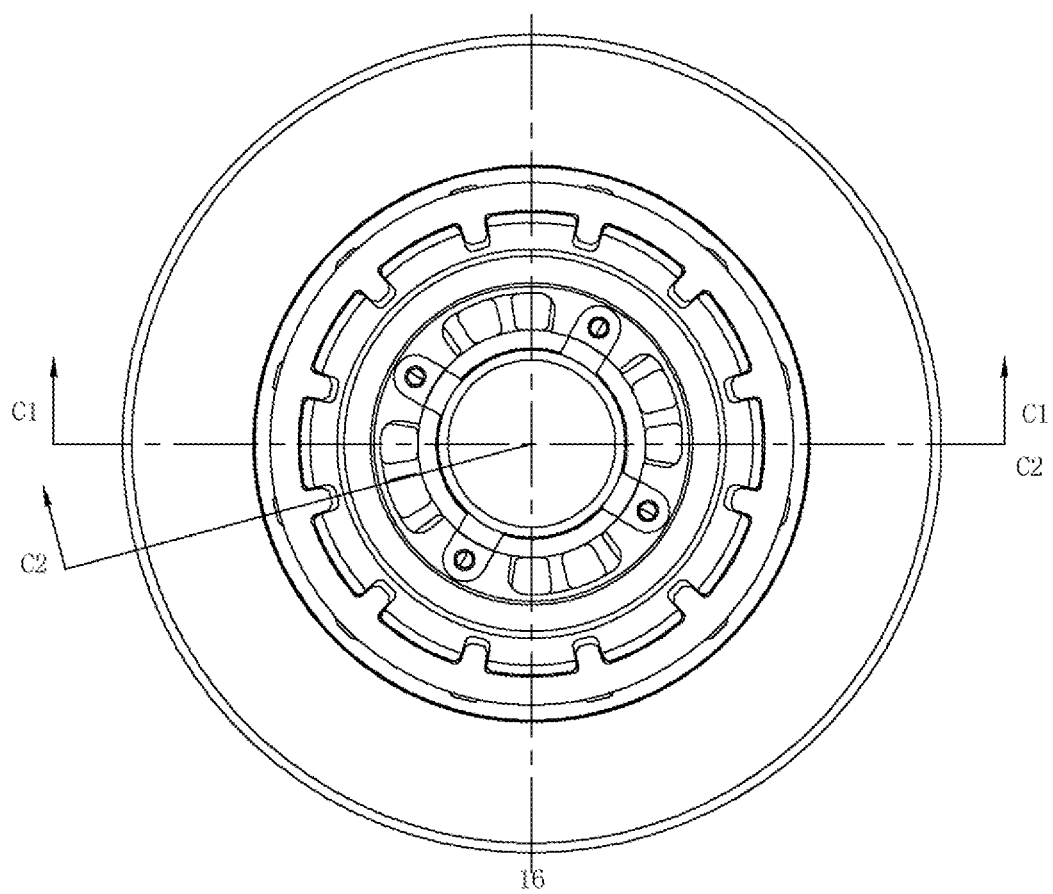
FIG. 42 is a top view of a state in which the drive component and the round sanding baseplate are connected in FIG. 40.
Figure 43:
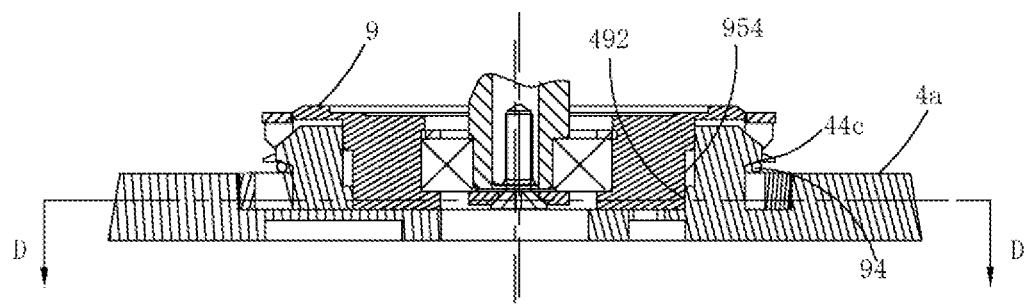
FIG. 43 is a schematic cross-sectional view diagram of a direction C1-C1 in FIG. 42.
Figure 44:
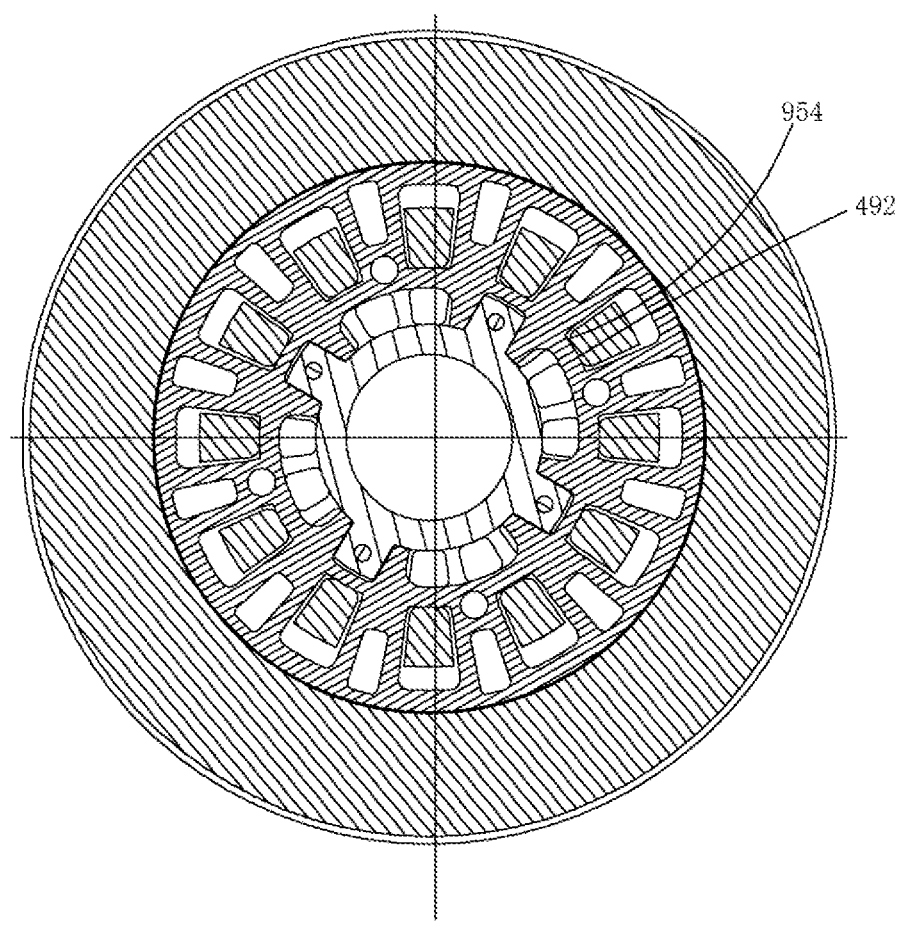
FIG. 44 is a schematic cross-sectional view diagram of a direction D-D in FIG. 43.
Figure 45:
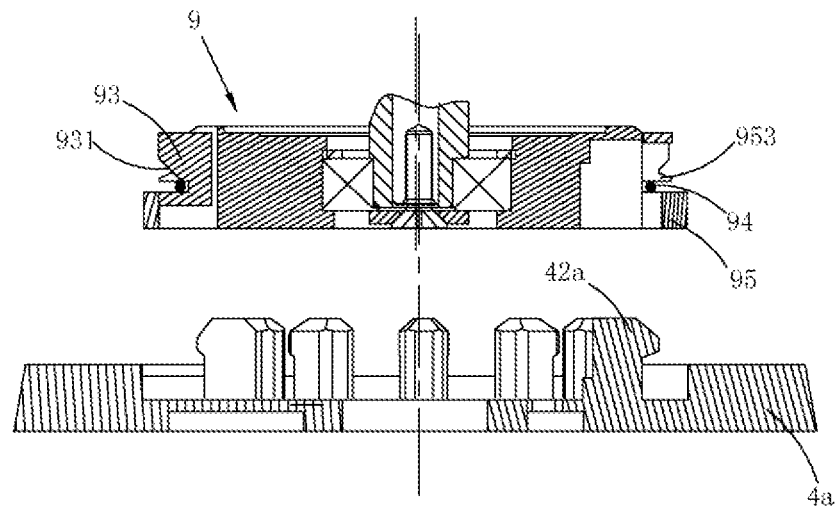
FIG. 45 to FIG. 50 are schematic cross-sectional view diagrams of a direction C2-C2 in FIG. 42 respectively, representing state changes when the round sanding baseplate is connected to an output head body.
Figure 46:
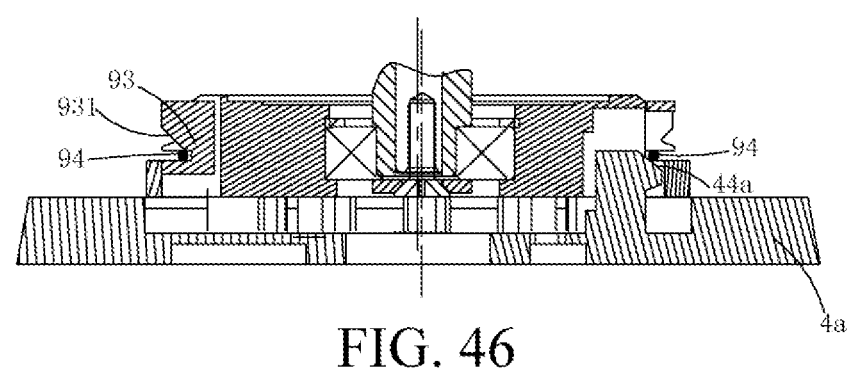
Figure 47:
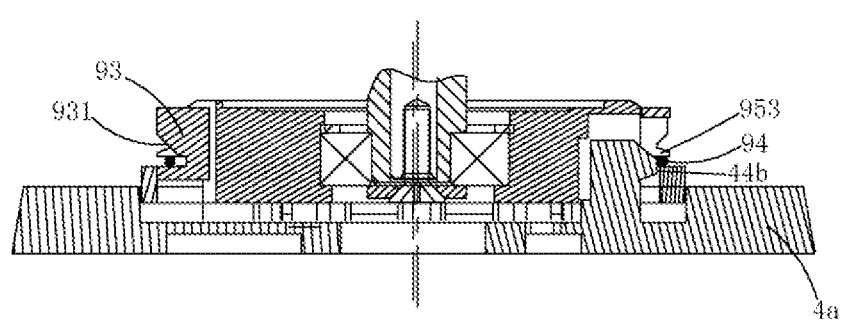
Figure 48:
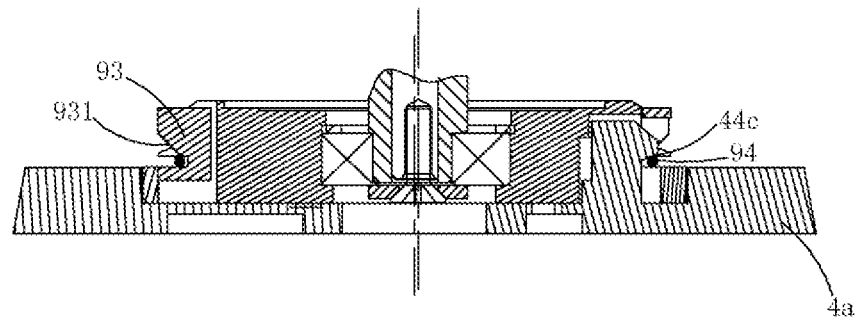

Referring to FIG. 42 to FIG. 44, when the round sanding baseplate 4*a* and the drive component 9 are in a fitting state, the retaining ring 94 engaged with the groove 955 of the output head body 95 abuts against the clamping portions 44*c* of the second clamping members 42*a* of the round sanding baseplate 4*a*. In this case, under an elastic action of the retaining ring 94, the round sanding baseplate 4*a* can remove an axial gap between the round sanding baseplate 4*a* and the output head body 95. The fitting surfaces 492 of the second clamping members 42*a* and the bearing wall 958 of the channel 956 are under an urging fit, to eliminate a radial gap between the round sanding baseplate 4*a* and the drive component 9. Meanwhile, the top surface of the groove 45' of the round sanding baseplate 4*a* abuts against the bottom surface of the output head body 95, to eliminate an axial gap between the round sanding baseplate 4*a* and the output head body 95. Therefore, the round sanding baseplate 4*a* and the output head body 95 can substantially be kept coaxial and synchronous during rotation, to reduce additional energy consumption generated by asynchronism between the round sanding baseplate 4*a* and the output head body 95 caused by gaps and obviously enhance working efficiency.

Referring to FIG. 45 to FIG. 48, when the round sanding baseplate 4*a* needs to be installed on the drive component 9 of the main body portion 1 of the sanding machine, the center circular groove 47 of the round sanding baseplate 4*a* is aligned preliminarily with the bearing 92 of the output head body 95, and then the round sanding baseplate 4*a* is made to be close to the output head body 95. Under a pushing force of the operator along a direction of the motor shaft 11, the second clamping members 42*a* enter the channel 954 from a bottom entry of the channel 954. When the guide portion 44*a* abut against the retaining ring 94, and along with further advancement of the second clamping members 42*a*, the retaining ring 94 abuts against the guide portions 44*a* and slides on the guide portions 44*a*, and at the same time, the retaining ring 94 generates a radial deformation, to allow the second clamping members 42*a* to further enter the channel 954. When the second clamping members 42*a* all enter the channel 956, the retaining ring 94 slides to the transition portion 44*b* along the guide portions 44*a* and then slides to the clamping portions 44*c* from the transition portion 44*b*. In this case, the retaining ring 94 is recovered to the initial state from the deformation state and finally is elastically clamped with the clamping portions 44*c*, so that the round sanding baseplate 4*a* is fitted to or locked on the drive component 9. In this case, the transmission portions 44*d* of the second clamping members 42*a* respectively cooperate with the side wall of the channel 954, to transmit a torque when the drive component 9 rotates.

Figure 49:
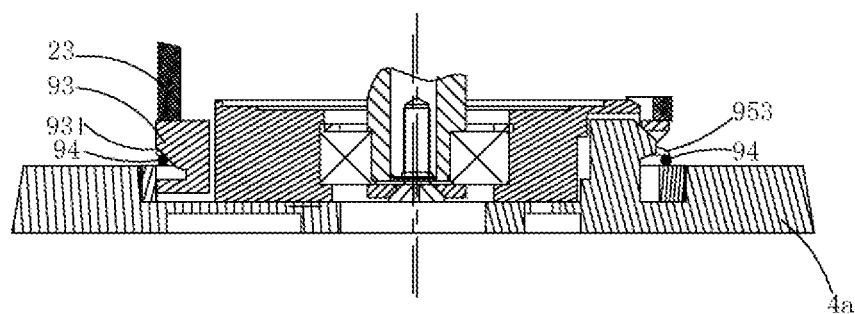
Figure 50:
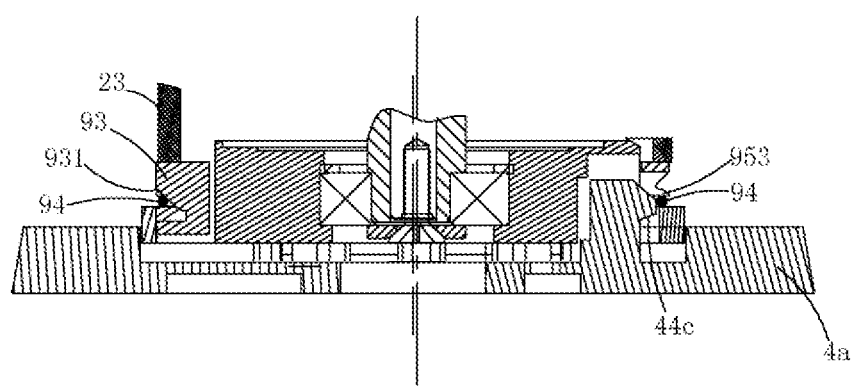

Further referring to FIG. 49 and FIG. 50, when the round sanding baseplate 4*a* needs to be separated from or disassembled from the drive component 9, the operation portion (not shown) of the control member makes the cam member 23 generate displacement along a direction of the motor shaft, to press downward the control member 93. In this case, the slope 931 of the control member 93 starts to abut against the retaining ring 94 and slide along the slope 931, and at the same time, the retaining ring 94 generates a radial deformation. When the retaining ring 94 slides along the slope 931 to an extreme position, the clamping portions 44*c* of the second clamping members 42*a* stops being clamped with the retaining ring 94, to allow the round sanding baseplate 4*a* to be separated from or disassembled from the drive component 9.

In view of the above, the retaining ring 94 in this embodiment is the first clamping members. When the working baseplate, including the round sanding baseplate 4*a* and the flat sanding baseplate, is installed, the working baseplate axially moves along the motor shaft 11 relative to the drive component 9, so that the retaining ring 94 generates a radial elastic deformation under an axial acting force of the working baseplate, to move from the first position to the second position, to allow the second clamping members 42*a* to further axially move to a fitting position, the first clamping members 94 are recovered from deformation and returned from the second position to the first position, to be clamped with the second clamping members 42*a*, so that the working baseplate is locked relative to the drive component 9. When the working baseplate is disassembled, the first clamping members 94 move from the first position to the second position, the working baseplate is axially separated from the drive component 9, and the moving the first clamping members from the first position to the second position is driven and controlled by the control member 22.

Embodiment 7

Figure 51:
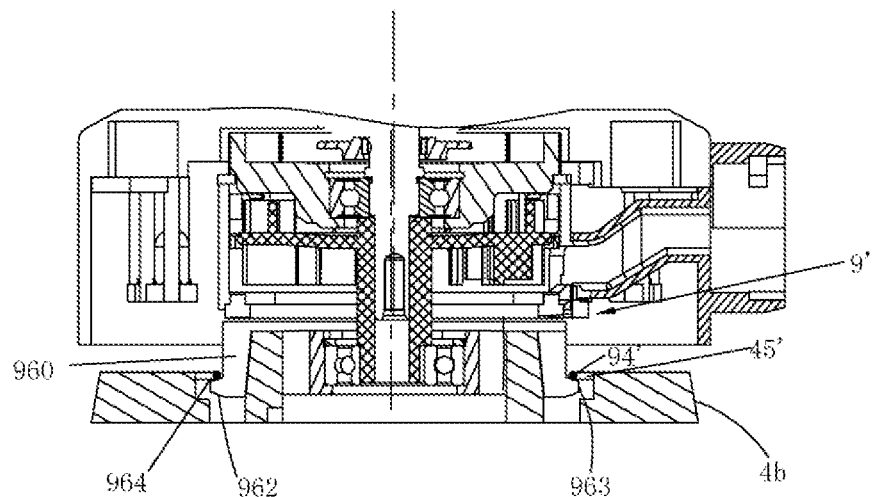
FIG. 51 is a cross-sectional view of a sanding machine in a main view direction according to Embodiment 7 of the present invention.

Referring to FIG. 51, this embodiment is a deformation of Embodiment 6, and the same structures are represented by the same reference numerals and will not be repeated. The working baseplate includes a baseplate main body and second clamping members disposed on the baseplate main body. A person skilled in the art may deduce that, the retaining ring 94' is disposed on the working baseplate, for example, the round sanding baseplate or the flat sanding baseplate, as a second clamping member, and in this embodiment, the retaining ring 94' is accommodated in a receiving portion of the round sanding baseplate 4b and may generate radial motion. A first clamping member 960 is correspondingly disposed on the drive component 9', and the first clamping member 960 has a guide portion 962, a clamping portion 964, and a transition portion 963 connecting the guide portion 962 and the clamping portion 964. The guide portion 962 and the clamping portion 964 are slopes inclined in opposite directions. A groove 45' is disposed on the round sanding baseplate 4b.

When the round sanding baseplate 4b is fitted to the drive component 9', the groove 45' of the round sanding baseplate 4b is aligned with and then abuts against the first clamping member 960. In this case, under an action of a pushing force, the retaining ring 94' slides along the guide portion 962 and generates a radial outward displacement, that is, generates an elastic deformation. At the same time, the first clamping member 960 partially enters the groove 45'. Furthermore, the retaining ring 94' passes through the transition portion 963 along the guide portion 962, and then slides toward the clamping portion 964. In this case, the retaining ring 94' is recovered from deformation, that is, generates radial displacement. In this case, the first clamping member 960 fully enters the groove 45', the retaining ring 94 is fastened with and fitted to the clamping portion 964, and furthermore, under an elastic acting force of the retaining ring 94', the round sanding baseplate 4b and the drive component 9' are kept fitted or locked.

A person skilled in the art may deduce that, the release component is disposed on the working baseplate, the control member disposed on the working baseplate drives the retaining ring 94' to generate radial displacement, so that the clamping portion 964 and the retaining ring 94' stop fitting, to allow the working baseplate to be separated from the main body portion of the sanding machine.

In view of the above, the retaining ring 94' in this embodiment is the second clamping members. When the working baseplate is installed, the working baseplate axially moves along the motor shaft 11 relative to the drive component 9', so that the retaining ring 94' generates a radial elastic deformation under an axial acting force of the working baseplate, to move from the first position to the second position, to allow the first clamping member 960 to further axially move to a fitting position, the second clamping member 94' is recovered from deformation and returned from the second position to the first position, to be clamped with the first clamping member 960, so that the working baseplate is locked relative to the drive component 9'. When the working baseplate is disassembled, the second clamping members 94' moves from the first position to the second position, the working baseplate is axially separated from the drive component 9', and the moving the second clamping member 94' from the first position to the second position is driven and controlled by the control member 22.

Embodiment 8

Figure 52:
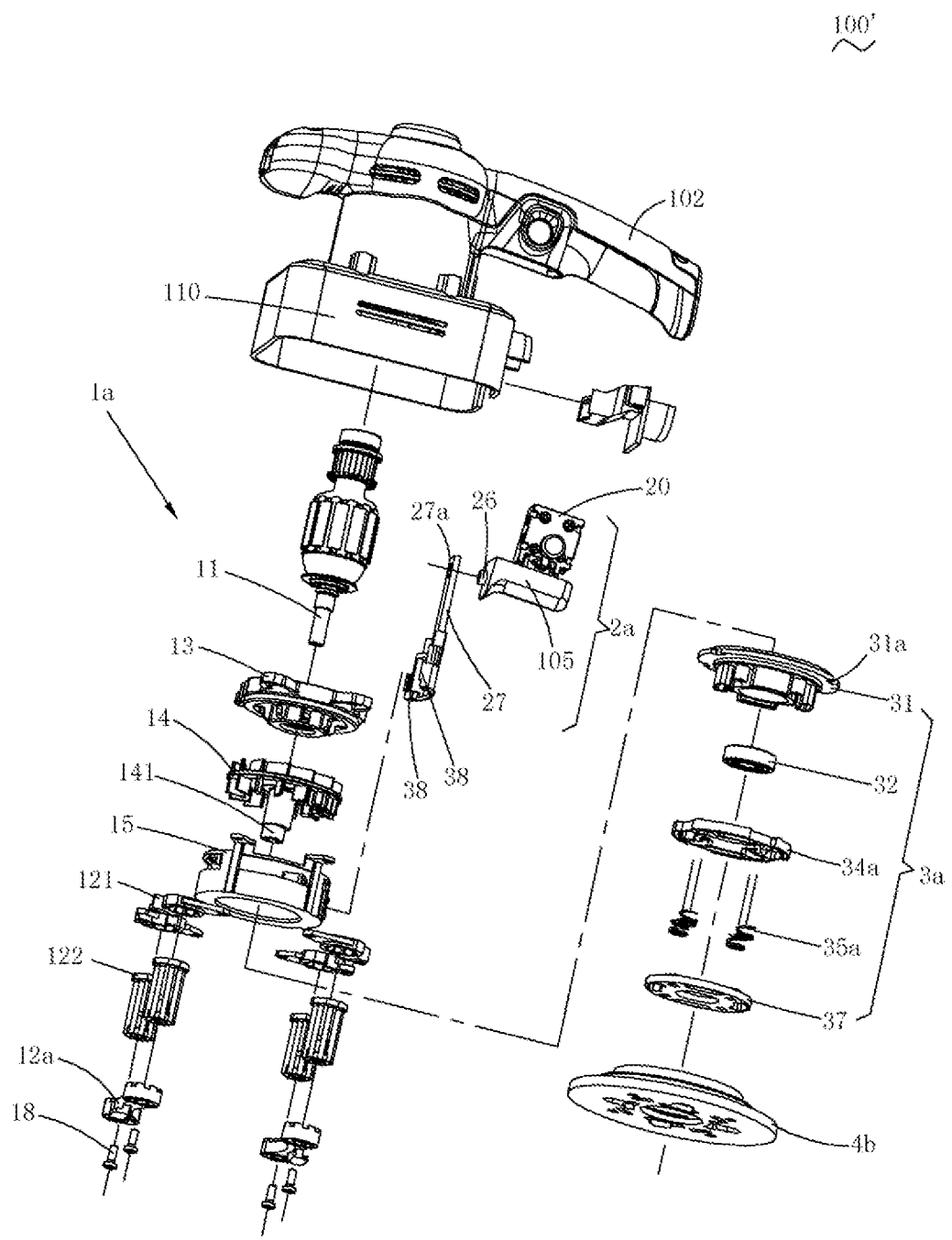
FIG. 52 is a schematic three-dimensional exploded diagram of a sanding machine according to Embodiment 8 of the present invention.

Referring to FIG. 52, this embodiment has a structure similar to that in Embodiment 1, and the same structures are represented by the same reference numerals and will not be repeated. The sanding machine 100' includes a main body portion 1a, a release component 2a, and a drive component 3a. Swing pin fixing members 121 that are fixed relative to the housing 110 are respectively disposed on four corners of the main body portion 1a by taking the motor shaft 11 as a center, one end of each of swing pins 12 is connected to one of the swing pin fixing members 121, the other end of each of the swing pins 12 has a swing pin jointing portion 12a, and the swing pin jointing portions 12a are fixed with the swing pins 12 through fasteners 18.

The release component 2a includes a switch 20 disposed in a housing of a main handle 102, a switch trigger 105 movably connected relative to the switch 20, and a locking member 27 disposed at one side of the housing 110 close to the main handle 102. One end of the locking member 27 close to the switch trigger 105 has a hole 27a, and a cylinder 26 fitted to the hole 27a is disposed on the switch trigger 105, and in this way, the switch trigger 105 and the locking member 27 are linked and fitted. The other end of the locking member 27 away from the hole 27a has a locking portion 38.

The drive component 3a includes an output head body 31, a bearing 32 tightly fitted to the output head body 31, a tension ring 34a sleeved over the output head body 31 and generating displacement relative to the output head body 31 along a direction of the motor shaft 11, and a support member 37 fixedly fitted to the output head body 31. Several elastic members 35a are disposed between the support member 37 and the tension ring 34a. In a normal state, under a support action of the elastic members 35, the tension ring 34a moves away from the support member 37. The output head body 31 has clamping grooves 31a that may be selectively fitted to the locking portion 38. When the switch trigger 105 is triggered, the locking member 27 drives the locking portion 38 to move in a direction close to the main handle 102, so that the locking portion 38 stops being fitted to the clamping grooves 31a, the locking member 27 is at the first position, and the drive component 3a may rotate freely. When the switch trigger 105 is released, the switch trigger 105 is reset under an action of its own elastic members, the locking member 27 drives the locking portion 38 to move in a direction away from the main handle 102, and at the same time, the drive component 3a keep rotating due to inertia, till the locking portion 38 is aligned with the clamping grooves 31a, the locking member 27 is clamped with the clamping grooves 31a, the locking member 27 is at the second position to drive the drive component 3a, and the drive component 3a and the locking portion 38 are connected fixedly relative to each other, that is, the drive component 3a is in an anti-rotation state, to replace the working baseplate conveniently, for example, the flat sanding baseplate is disassembled, and the round sanding baseplate is installed, or the round sanding baseplate is disassembled and the flat sanding baseplate is installed.

Figure 53:
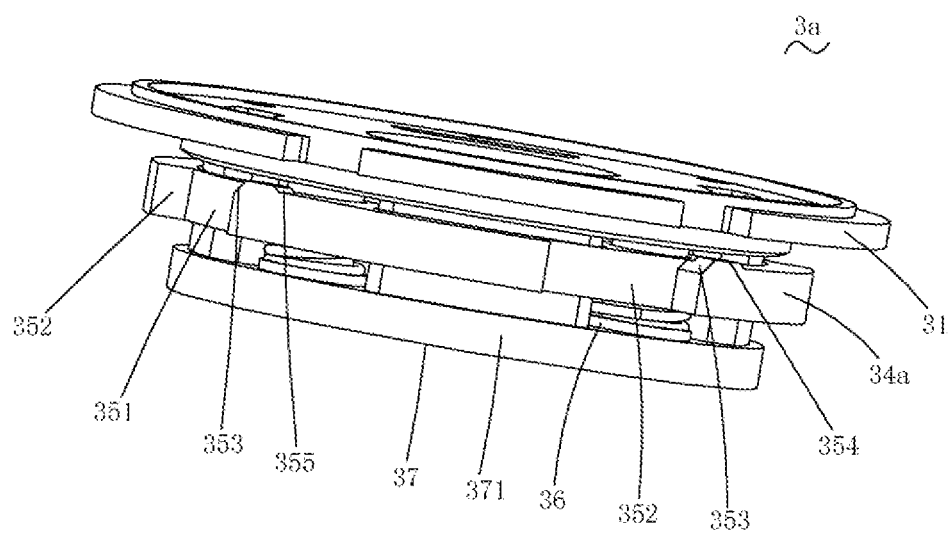
FIG. 53 is a schematic three-dimensional diagram of FIG. 52 after a drive component is assembled.

Furthermore, referring to FIG. 53, several notches 351 are distributed on a peripheral surface of the tension ring 34a, and two sides of each of the notches 351 are respectively notch walls 352. A guide surface 353 is respectively disposed on the notch walls 352 of all the notches 351 at the same side, a top end face of the tension ring 34a has connection surfaces 354 connected to the guide surfaces 353 and clamping surfaces 355, the guide surfaces 353 and the clamping surfaces 355 are slopes inclined in opposite directions. The support member 37 is set as an annular member, and the peripheral surface of the support member 37 is set as a cone surface 371.

Figure 54:
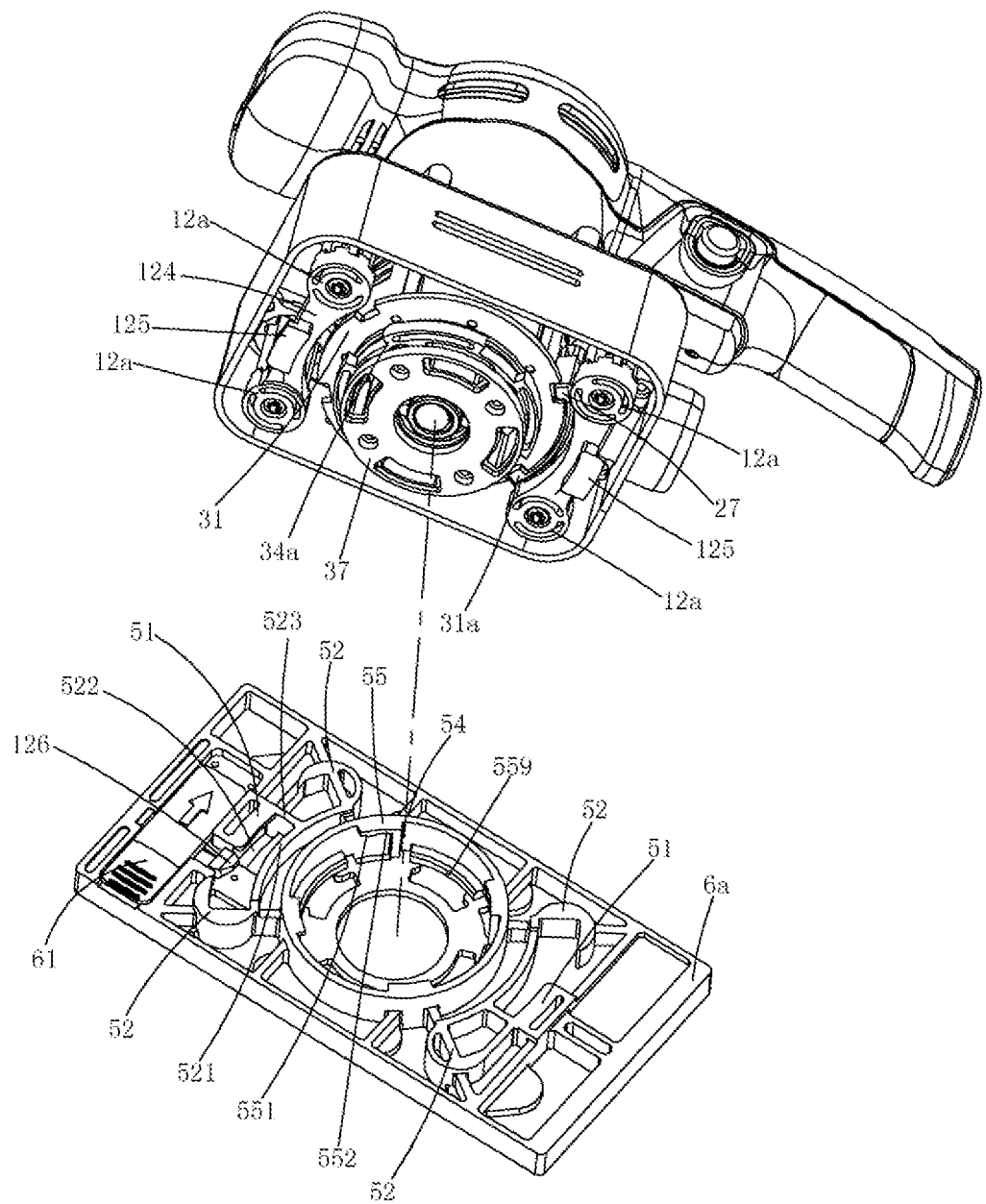
FIG. 54 is a schematic three-dimensional diagram of an assembly relationship of a main body of the sanding machine and a flat sanding baseplate in FIG. 52.

Referring to FIG. 54, a fitting structure connecting the swing pins 12a is respectively disposed on the flat sanding baseplate 6a at positions close to the two ends, the fitting structure includes a first fitting portion 51 and a second fitting portion 52, the second fitting portion 52 includes a pair of abutting areas matching the swing pin 12a and an arc wall 521 connecting the two abutting areas, an arc groove 522 is formed between the arc wall 521 and the two abutting areas, and a limiting wall 523 is disposed at one end of the arc groove 522. The first fitting portion 51 is substantially a bearing wall disposed above the arc groove 522.

The sanding machine 100' includes a locking apparatus, and the position of the flat sanding baseplate 6a relative to the main body portion 1a may be locked or released through the locking apparatus. The locking apparatus includes an operation portion 61 disposed on the flat sanding baseplate 6a and a positioning member 126 located at one side of the arc groove 522 away from the center of the baseplate. In a normal state, the positioning member 126 is kept at a locking position protruding from the arc groove 522 under an acting force of the elastic members (not shown), and the flat sanding baseplate 6a may be locked relative to the main body portion 1a. The operation member 61 operably controls the positioning member 126 to move from a locking position to a release position. In this case, the positioning member 126 is at a position to be released from the arc groove 522, and the flat sanding baseplate 6a may be released from the main body portion 1a, to be disassembled from or separated from the main body portion 1a.

Every two swing pins 12a on the four corners of the main body portion 1a of the sanding machine 100' are connected and respectively corresponding to the position of the second fitting portion 52 of the flat sanding baseplate 6a. An arc connection portion 124 is disposed between two close swing pins 12a, and a bump 125 slidably fitted to the arc groove 522 is disposed at a middle position of the arc connection portion 124.

Figure 55:
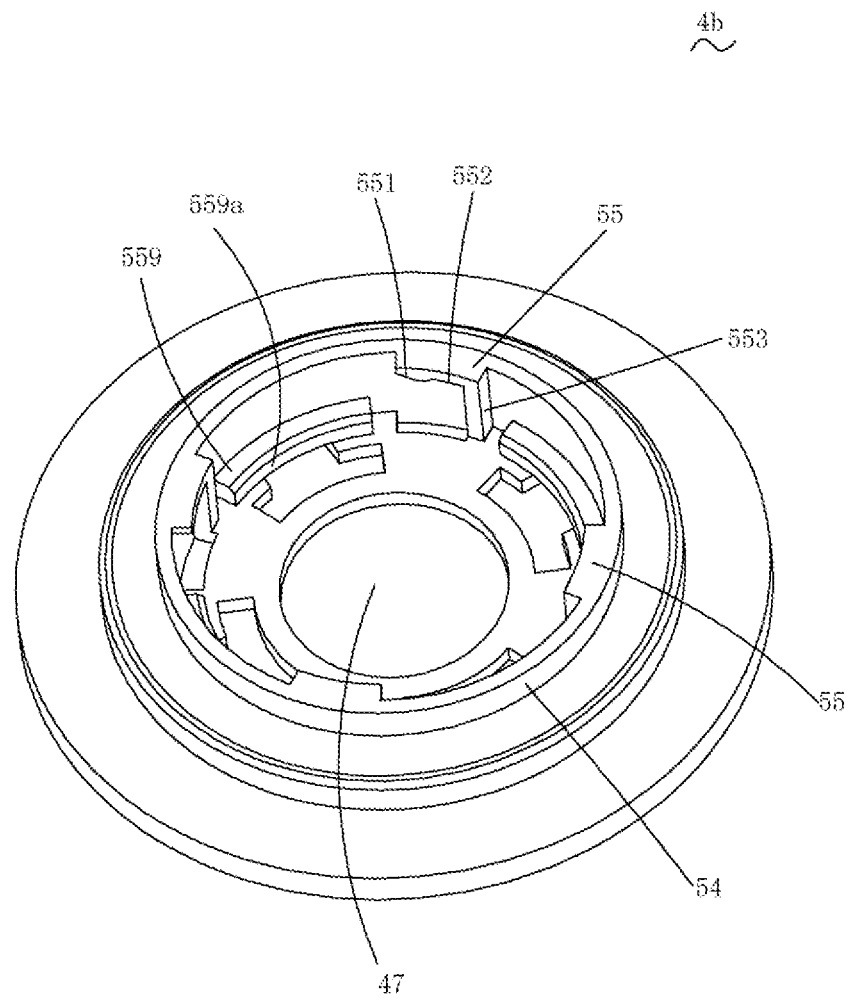
FIG. 55 is a schematic three-dimensional diagram of a round sanding baseplate in FIG. 52.

Furthermore, referring to FIG. 55, the area of the round sanding baseplate 4b or the flat sanding baseplate 6a around the center circular groove 47 has a same fitting portion to be fitted to the drive component 3a. The fitting portion includes a convex ring 54, several second clamping portions 55 fitted to the drive component 3a are distributed on the convex ring 54 in a circumferential direction, the second clamping portions 55 are formed by radially extending top end walls of the convex rings 54 inward by a certain distance, a quantity of the second clamping members 55 corresponds to a quantity of the notches 351 on the tension ring 34a in the drive component 3a, so that the flat sanding baseplate 6a or the round sanding baseplate 4b is fitted to the drive component 3a conveniently. One end of each of the second clamping portions 55 is set as a guide surface 551 having a slope, the clamping surfaces 552 are connected to the guide surfaces 551, and the clamping surfaces 552 are formed by the inner side walls of the second clamping portions 55. Several limiting portions 553 extending in a vertical direction are disposed on the inner side wall of the convex ring 54 and one end of each of the limiting portions 553 is connected to one of the clamping surfaces 552. Several bosses 559 extending radially are distributed on the inner side wall of the convex ring 54 located under the second clamping portions 55 in a circumferential direction, and one side of each of the bosses 559 toward the center circular groove 47 is a boss side wall 559a.

Figure 56:
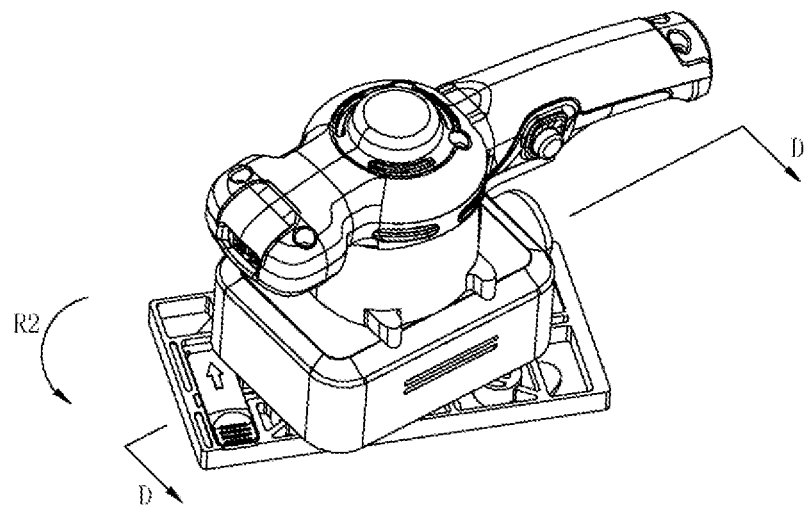
FIG. 56 is a schematic diagram of an assembly process of the main body of the sanding machine and the flat sanding baseplate in FIG. 52.
Figure 57:
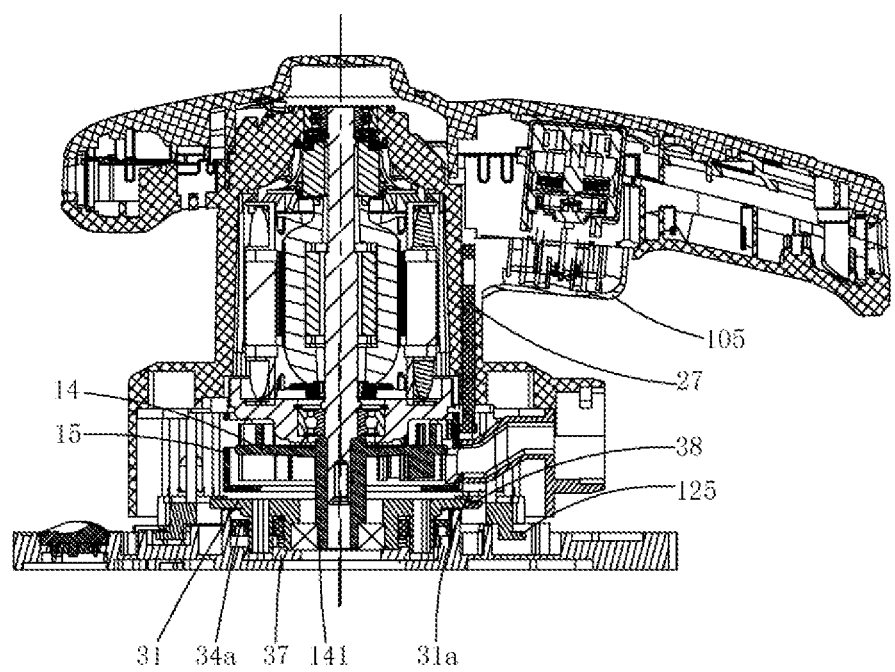
FIG. 57 is a schematic cross-sectional view diagram of the sanding machine in FIG. 56 in a direction D-D.

Referring to FIG. 56 and FIG. 57, when the flat sanding baseplate 6a is installed on the main body portion 1a of the sanding machine 100', the release component 2a is in a releasing state, and the locking portion 38 is fitted to the clamping grooves 31a of the output head body 31, so that a working head component 3a is in a non-rotation state. In this case, the bump 125 between the swing pin jointing portions 12a is aligned with the arc groove 522 of the flat sanding baseplate 6a and then inserted into one end of the arc groove 522 away from the limiting wall 523, and then, the flat sanding baseplate 6a rotates in a direction shown by an arrow R2, and the bump 125 slides in the arc groove 522. In this embodiment, the rotation direction shown by the arrow R2 is a counter-clockwise direction. However, the rotation direction is not a limited manner in the present invention, and a person skilled in the art may make a change according to design demand.

Figure 58:
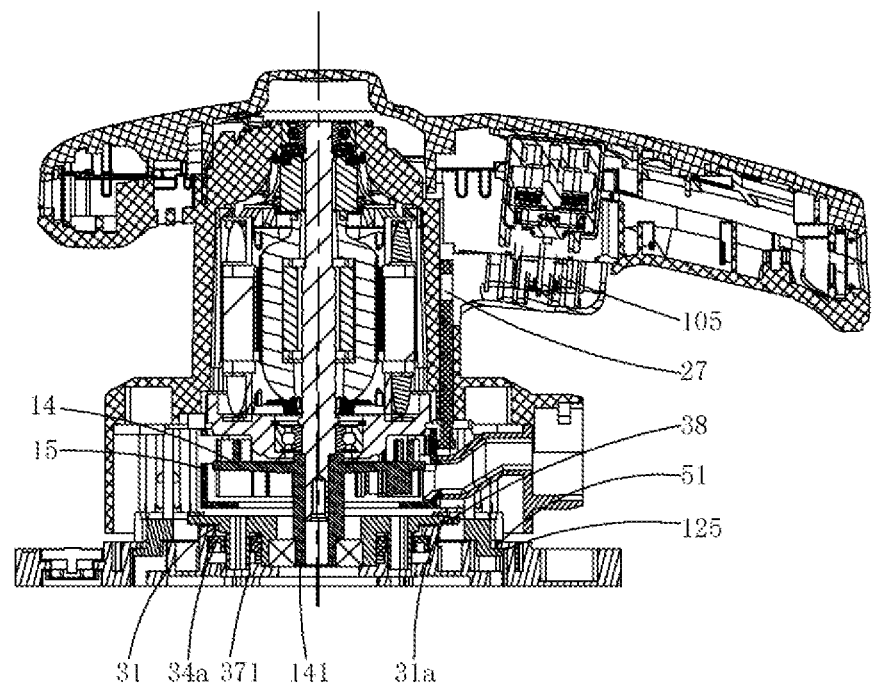
FIG. 58 is a schematic cross-sectional view diagram of the sanding machine in FIG. 56 that is installed in place in a direction D-D.

Referring to FIG. 58, when the flat sanding baseplate 6a rotates to make the second clamping portion 55 on the convex ring 54 directly face the notch 351 of the tension ring 34a, the guide surface 551 of the second clamping portion 55 climbs up along the guide surface 353 of the tension ring 34a to pass through the connection surface 354, till the clamping surface 552 at the inner side of the second clamping portion 55 climbs to abut against to be engaged with the clamping surface 355 of the tension ring 34a, to prevent the flat sanding baseplate 6a from being axially separated from the drive component 3a. The clamping surface 552 and the clamping surface 355 of the tension ring 34a abut to be engaged to eliminate an axial gap between the drive component 3a and the working baseplate. In this case, the bump 125 slides in the arc groove 522 to reach a position abutting the limiting wall 523, and a side end face of the bump 125 abuts against an inner side end face of the first fitting portion 51. In this case, the swing pins 12a abut against the second fitting portion 52 one by one. In addition, the position of the bump 125 in the arc groove 522 is limited by the positioning member 126 under an action of the elastic members, to prevent the swing pins 122 from sliding along the arc groove 522 relative to the flat sanding baseplate 6a to shake during an operation process of the sanding machine 100', so that the swing pins 122 can only drive the flat sanding baseplate 6a to swing, rather than performing any other motion. During the installation process of the whole working baseplate, the tension ring 34a of the drive component 3a is supported by the elastic members 35a, and moves from an initial position away from the working baseplate to be axially close to the working baseplate along the motor shaft 11, to reach a second position, and in this case, the elastic members 35a are compressed. Once the working baseplate is installed in place, the operator releases the flat sanding baseplate 6a, and under an action of the elastic members 35a, the tension ring 34a drives the flat sanding baseplate 6a to return to the initial position from the second position. In this case, the peripheral cone surface 371 of the support member 37 abuts against the boss side wall 559a of the working baseplate, to eliminate a radial gap between the drive component 3a and the working baseplate. During the operation process of the sanding machine 100', the drive component 3a drives the flat sanding baseplate 6a to rotate, and the limiting portion 553 and the notch wall 352 of the tension ring 34a are engaged and fitted to transmit a torque.

Figure 59:
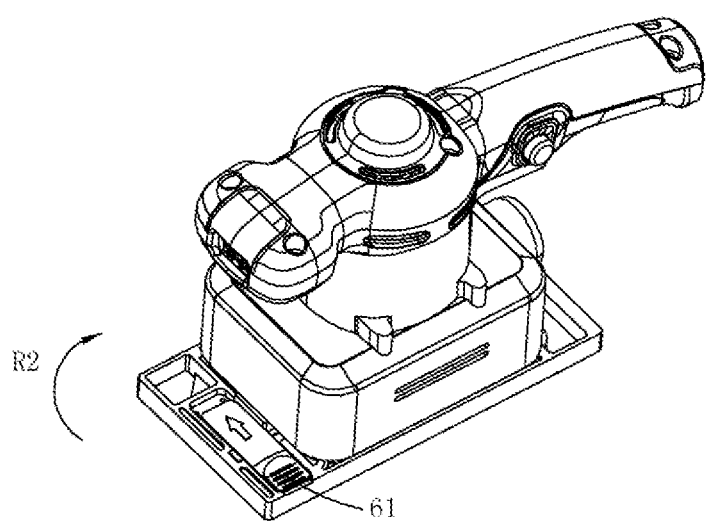
FIG. 59 is a schematic three-dimensional diagram of a flat sanding baseplate of the sanding machine in FIG. 56 that is installed in place.

Referring to FIG. 59, when the flat sanding baseplate 6a is disassembled from the main body portion 1a of the sanding machine 100', the operation portion 61 needs to be slid according to a direction indicated in the figure, to release limiting of the positioning member 126 on the sliding of the bump 125 in the arc groove 522. Then, the flat sanding baseplate 6a rotates by a certain angle in a direction shown by an arrow R2', when the bump 125 slides to a start end of the arc groove 522, the clamping surfaces 552 of the second clamping members 55 are disconnected from the clamping surfaces 355 of the tension ring 34a, to allow the flat sanding baseplate 6a to be axially separated from and disassembled from the drive component 3a along the motor shaft. In this embodiment, the rotation direction of the arrow R2' is a clockwise direction. However, the rotation direction is not a limited manner in the present invention, and a person skilled in the art may make a design and a change.

In view of the above, when the working baseplate is installed, the working baseplate 4b or 6a moves to a fitting position relative to the drive component 3a in an axial direction along the motor shaft 11, and then the working baseplate rotates relative to the drive component 3a to reach a locking position. When the flat sanding baseplate 6a is disassembled, the operation portion 61 movably disposed on the flat sanding baseplate 6a releases position locking of the flat sanding baseplate 6a, so that the flat sanding baseplate 6a rotates reversely around the center line of the baseplate, and is axially separated relative to the drive component 3a along the motor shaft 11. When the round sanding baseplate 4b is disassembled, the round sanding baseplate 4b rotates reversely around the center line of the baseplate and is axially separated relative to the drive component 3a along the motor shaft 11

Embodiment 9

Figure 60:
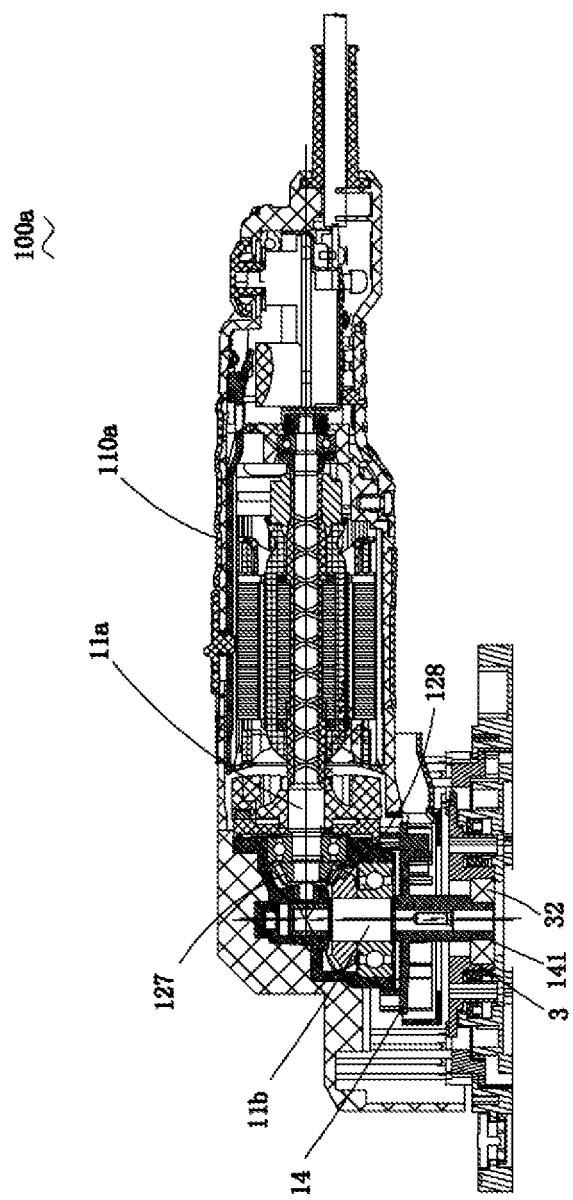
FIG. 60 is a cross-sectional view of a sanding machine in a main view direction according to Embodiment 9 of the present invention.

Referring to FIG. 60, this embodiment has a structure similar to that in Embodiment 1, and the same structures are represented by the same reference numerals and will not be repeated. The difference lies in that a motor is horizontally disposed in a housing 110a of a sanding machine 100a, and an output shaft 11b and a motor shaft 11a are disposed to form an angle. In this embodiment, the output shaft 11b and the motor shaft 11a form a right angle. Certainly, a person skilled in the art may dispose the output shaft 11b and the motor shaft 11a to form an acute angle or an obtuse angle according to actual demand. A first bevel gear 127 is disposed on the motor shaft 11a, a second bevel gear 128 engaged with the first bevel gear 127 is disposed on the output shaft 11b, and rotation motion of the motor is transmitted to the output shaft 11b through the pair of the bevel gears 127 and 128. A person skilled in the art may learn that, the bevel gears in this embodiment may be replaced by other transmission device or gear forms.

The fan 14 is tightly fitted to the output shaft 11b and has an eccentric output end 141 providing rotation. The drive component 3 is eccentrically connected to the eccentric output end 141 through the bearing 32. The working baseplate, including a round sanding baseplate and a flat sanding baseplate, is detachably connected to a main body portion of the sanding machine 100a.

Embodiment 10

Figure 61:
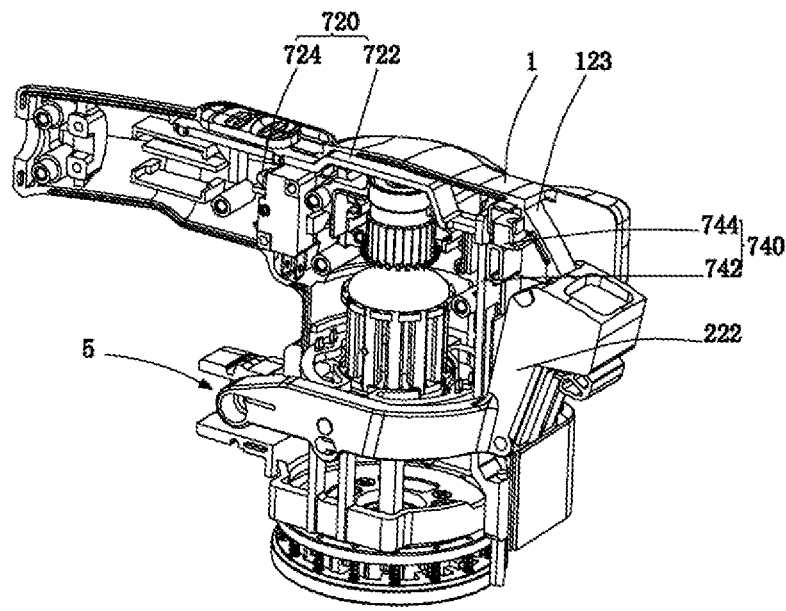
FIG. 61 is a schematic structural diagram of a sanding machine according to Embodiment 10.
Figure 62:
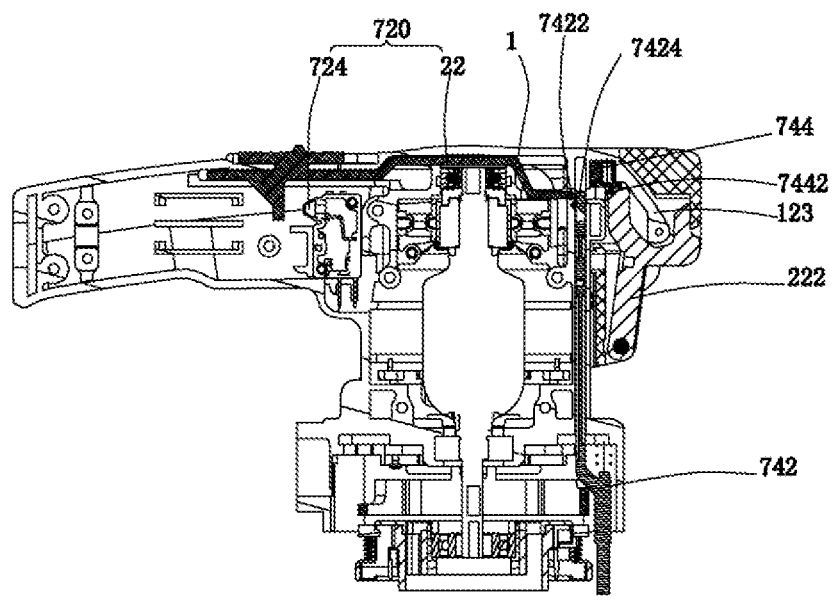
FIG. 62 is a cross-sectional view of the sanding machine in FIG. 61 with a working head not installed.
Figure 63:
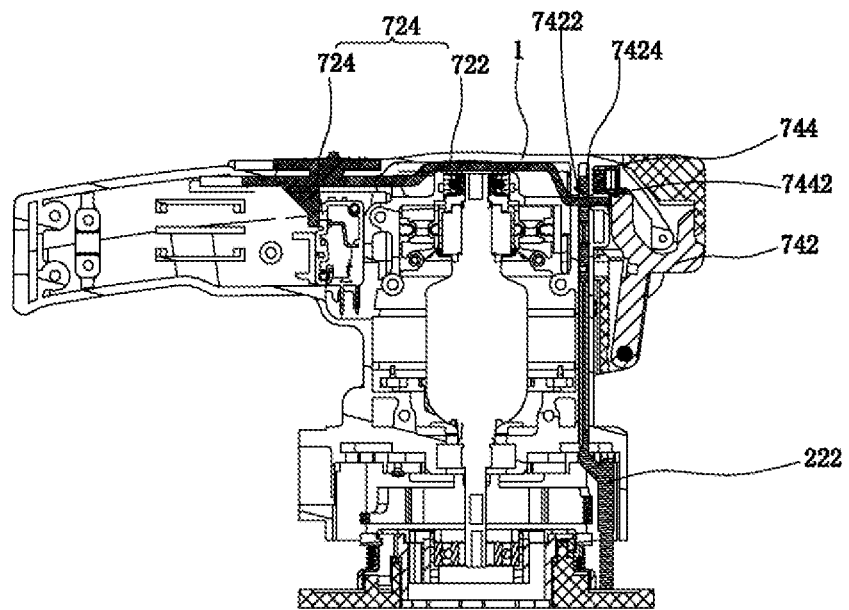
FIG. 63 is a cross-sectional view of the sanding machine in FIG. 61, in which a working baseplate is in a fixed connected state and a trigger member triggers a switch.

Referring to FIG. 61, FIG. 62, and FIG. 63, this embodiment has a structure similar to that in Embodiment 2, and the same structures are represented by the same reference numerals and will not be repeated. In this embodiment, the sanding machine further includes a control switch 720 and a switch locking structure 740.

Specifically, the control switch 720 includes a trigger member 722 and a switch 724, and the trigger member 722 may be disposed in the machine body 1 slidably in a first direction, to bear against or be separated from the switch 724. The switch locking structure 740 is disposed on the machine body 1 and may selectively limit the trigger member 722, so that the trigger member 722 is separated from or bears against the switch 724, and the switch 724 is switched between a startable state in which the switch 724 bears against the trigger member 722 and a non-startable state in which the switch 724 is separated from the trigger member 724. When the switch 724 is in the startable state, the trigger member 722 may be operated to trigger the switch 724 to start the sanding machine. When the switch 724 is in the non-startable state, the trigger member 722 cannot be operated to trigger the switch 724 to start the sanding machine.

Thus, the trigger member 722 may slide relative to the machine body 1 to start or disconnect the switch 724. When the trigger member 722 starts the switch 724, the operator may trigger the switch 724 through the trigger member 722, and when the trigger member 722 is separated from the switch 724, the operator cannot trigger the switch 724 through the trigger member 722. Thus, when the trigger member 722 is separated from the switch 724, a hidden danger that the switch 724 is touched mistakenly may be avoided, to ensure personal security of a user.

Figure 64:
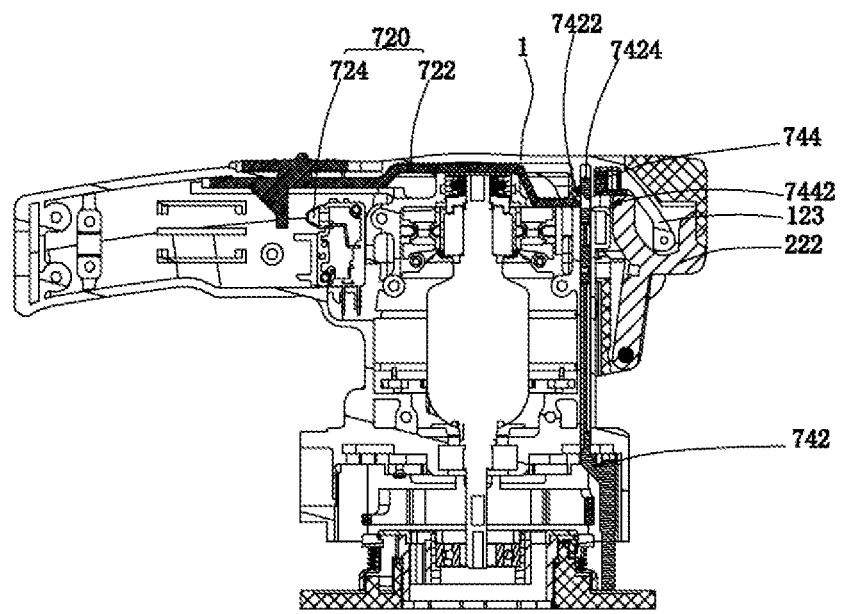
FIG. 64 is a cross-sectional view of the sanding machine in FIG. 61, in which working baseplate is in a fixed connected state and the trigger member does not trigger a switch.

As shown in FIG. 62, FIG. 63, and FIG. 64, the switch locking structure 740 includes a first switch locking structure 742 that may slide in a second direction.

As shown in FIG. 62 and FIG. 63, when the working baseplate is not fitted to the installation portion, the first switch locking structure 742 bears against the trigger member 722, so that the trigger member 722 is separated from the switch 724, and then, the switch 724 is in a non-startable state and the sanding machine cannot be started. In this embodiment, the second direction is perpendicular to the first direction, the first direction is perpendicular to an axis of the working baseplate, and the second direction is parallel to the axis of the working baseplate.

Figure 65:
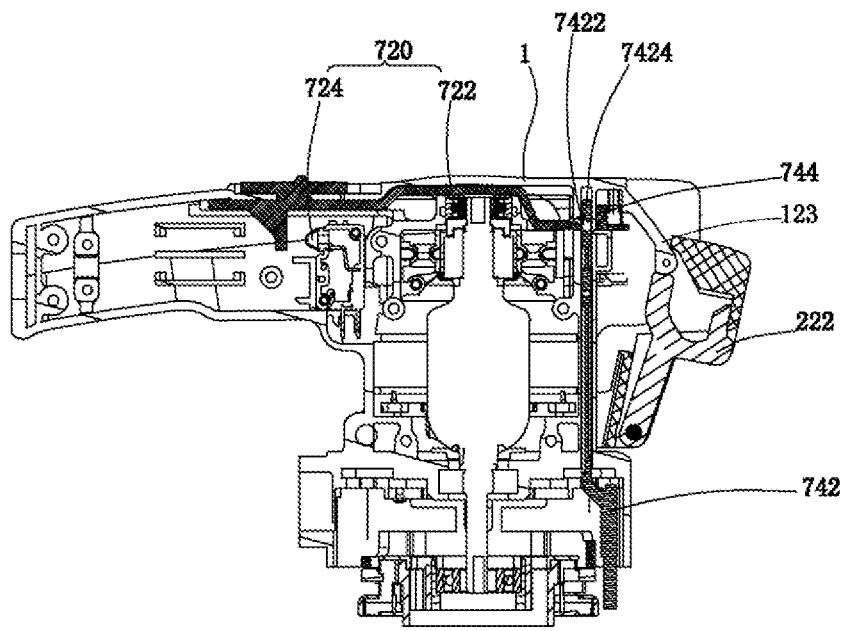
FIG. 65 is a cross-sectional view of an unlocking structure of the sanding machine in FIG. 61 that is at a locking position.

As shown in FIG. 63, FIG. 64, and FIG. 65, when the working baseplate is fitted to the drive installation portion, the first switch locking structure 742 is given up along the second direction, so that the trigger member 722 may slide toward one side that bears against the switch 724.

The switch locking structure 740 further includes a second switch locking structure 744 that is slidably disposed in the machine body 1 along the second direction, and the second switch locking structure 744 is located at one side of the first switch locking structure 742 away from the trigger member 722. The release component 2 may be alternately located at the first position where the working baseplate is fitted to the drive installation portion and the second position where the working baseplate is separated from the drive installation portion. When the release component 2 is released from the second position to the first position, the second switch locking structure 744 is driven to slide to get separate to the trigger member 722 from the position where the second switch locking structure 744 is abutted against the trigger member 722.

Specifically, when the working baseplate is fixedly connected to the drive installation portion, that is the release component 2 is located at the first position, the second switch locking structure 744 is separated from the trigger member 722, so that the trigger member 722 can bear against the switch 724, and the switch 724 is in a startable state. When the working baseplate is fitted to but not fixedly connected to the drive installation portion, that is the working baseplate is on the machine body 1 and to be disassembled, the second switch locking structure 744 still bears against the trigger member 722, so that the trigger member 722 is separated from the switch 724, and the switch 724 is in a non-startable state, to prevent an electric operation from being started by a mistaken operation during an disassembly process.

Thus, when the working baseplate is fixedly connected to the drive installation portion, the trigger member 722 bears against the switch 724, so that the switch 724 is in the startable state. When the working baseplate is not connected to the drive installation portion or is not fixedly connected to the machine body 1 but is still on or fitted to the machine body 1 to be disassembled, the trigger 722 is separated from the switch 724, so that the switch 724 is in a non-startable state.

Referring to FIG. 61, FIG. 62, and FIG. 63, specifically, one end of the first switch locking structure 742 that may bear against the trigger member 722 has a first opening 7422 and a first bearing portion 7424 that are adjacent to each other, the first opening 7422 is located at one side of the first bearing portion 7424 close to the working baseplate, and the first switch locking structure moves upward in the second direction relative to the machine body 1, so that the first opening 7422 or the first bearing portion 7424 corresponds to the first locking structure 742 alternately.

When the working baseplate is not connected to the drive installation portion, the first switch locking structure 742 falls down along the second direction, the first bearing portion 7424 moves in a direction close to the working baseplate to bear against the trigger member 722, so that the trigger member 722 cannot continue to slide and is in a disconnected position. When the working baseplate is connected to the drive installation portion, the first switch locking structure 742 moves upward (that is, in a direction away from the working baseplate) under bearing of the working baseplate, so that the trigger member 722 passes through the first opening 7422 along the first direction.

Thus, when no working baseplate is connected to the drive installation portion, the first switch locking structure 742 can prevent the trigger member 722 from sliding in the first direction to be separated from the switch 724, not to start the sanding machine in a situation that no working baseplate is connected. When the working baseplate is connected to the drive installation portion, the control switch 720 may pass through the first opening 7422 of the first locking structure.

As shown in FIG. 61, FIG. 63, FIG. 64, and FIG. 65, specifically, one end of the unlocking wrench 222 is hingedly connected to the machine body 1, and the unlocking wrench 222 rotates by taking a hinge point of the unlocking wrench 222 and the machine body 1 as a rotation center. When the unlocking wrench 222 rotates to the first position, the second switch locking structure 744 bears against the unlocking wrench 222, and is driven by the unlocking wrench 222 to move in a direction away from the working baseplate, to form a second opening 7442 corresponding to the first opening 7422, and the first opening 7422 and the second opening 7442 are in communication to form a movement channel. The control switch 720 passes through the movement channel to be at a connection position, to be in a connected state to start the sanding machine.

When the unlocking wrench 222 rotates to reach the second position, the second switch locking structure 744 is separated from the unlocking wrench 222 and moves in a direction close to the working baseplate under an action of the gravity of the second switch locking structure 744, to contact and bear against the machine body 1, to seal the second opening 7442, so that the trigger member 722 is also blocked from bearing against the switch 724 even if it has passed through the first opening 7422.

For the sanding machine, the switch locking structure 740 may lock or unlock the control switch 720 according to a different situation of the working baseplate, to prevent the operator from starting the sanding machine to cause a hidden danger in a situation that the machine body 1 is not fixedly connected to the working baseplate.

Embodiment 11

Figure 66:
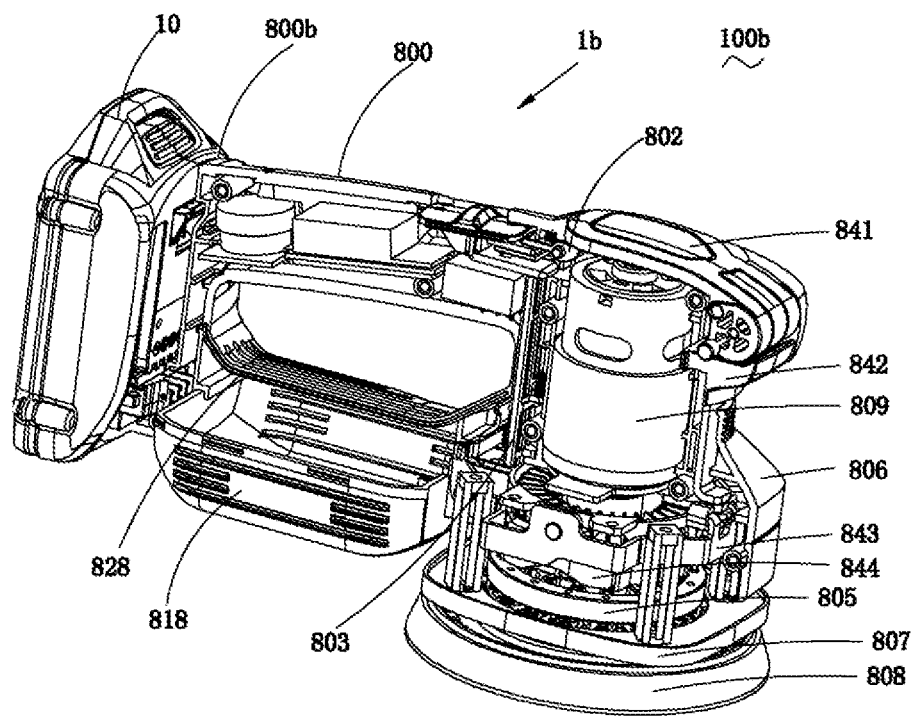
FIG. 66 is a schematic three-dimensional diagram of a sanding machine after a member of the housing is removed according to Embodiment 11 of the present invention.
Figure 67:
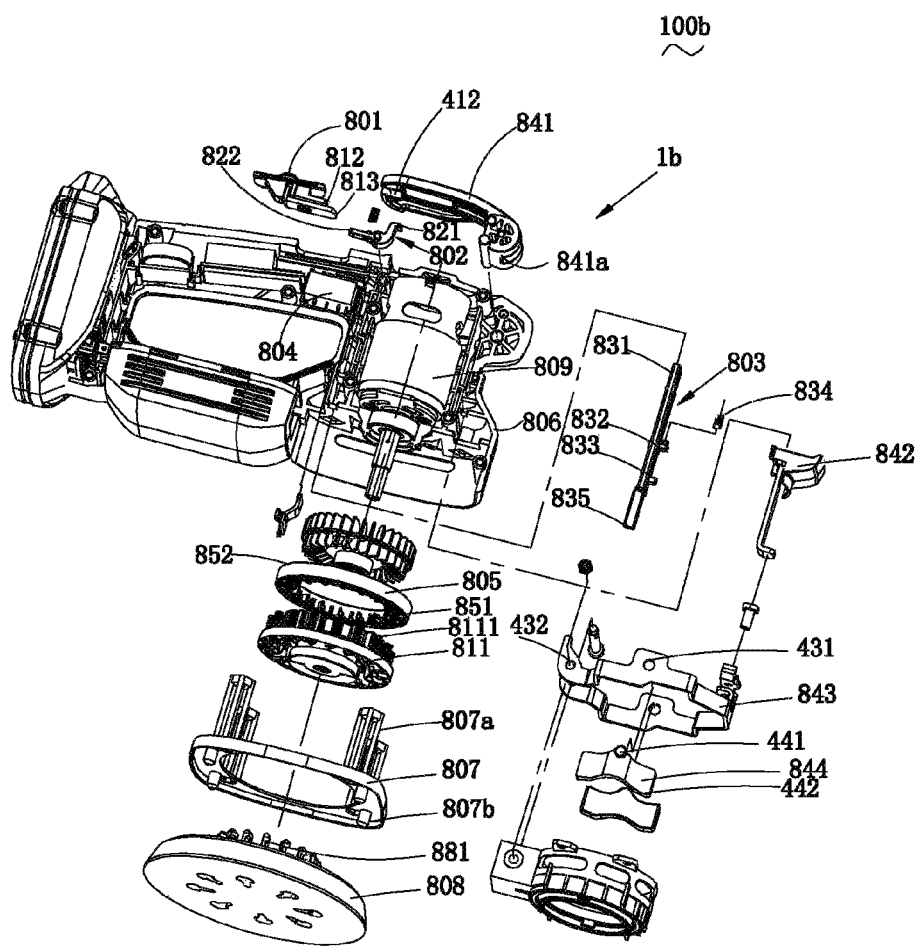
FIG. 67 is a three-dimensional exploded diagram of the sanding machine in FIG. 66.

Referring to FIG. 66 and FIG. 67, this embodiment describes a DC handheld sander 100*b*, including a main body portion 1*b* and a battery pack 10 connected to the main body portion 1*b*. The main body portion 1*b* includes a machine body, a motor 809 and a power component. The machine body includes a head shell 806 and a holding portion 800. The power component is disposed in the head shell 806 of the machine body and includes a motor 809 and a drive component for transmitting power of the motor 809 to the working baseplate 808, and the motor 809 is disposed vertically along a height direction of the sanding machine 100*b*. The working baseplate 808 is installed on the head shell 806, and the working baseplate 808 in this embodiment is a round sanding baseplate. An installation portion 800*b* is disposed at one end of the holding portion 800 away from the head shell 806. The battery pack 10 may be detachably connected to the installation portion 800*b*. The head shell 806, the holding portion 800, and the battery pack 10 are disposed sequentially along a lengthwise direction of the sanding machine 100*b*. The machine body further includes a dust collection box 818 connected to the head shell 806, the dust collection box 818 is located under the holding portion 800 in a height direction of the sanding machine, and the extending direction of the dust collection box 818 is substantially parallel to the extending direction of the holding portion 800.

Thus, the working baseplate 808 is disposed at the bottom end of the head shell 806, the motor 809 and the drive component are accommodated in the head shell 806, the installation portion 800*b* is located at one side of the machine body and is connected to the holding portion 800, so that the battery pack 10 and the motor 809 are disposed at two ends of the holding portion 800 of the machine body oppositely, to make holding be more convenient, satisfy ergonomics, and enhance stability when the operator uses the handheld sander 100*b*.

Specifically, the machine body may be an injection molded member and is shell-shaped, the front end is the head shell 806, the middle portion is the holding portion 800, and the rear end is the installation portion 800*b*. In this embodiment, the machine body consists of two half shells. The motor 809 is an electric motor, the drive component includes an eccentric transmission shaft, a bearing and a balance block (not shown) connected to the eccentric transmission shaft, the motor 809 is accommodated in an upper portion of the head shell 806, the drive component is accommodated in a lower portion of the head shell 806, to output rotation of the motor 809 to the working baseplate 808. The holding portion 800 has a switch component (not numbered) that controls the battery pack 10 to provide power to the motor 809, and if the operator holds the holding portion 800 normally, fingertips of a hand for holding are near the switch component.

In this embodiment, the installation portion 800*b* includes an installation groove for installing the battery pack 10, and the battery pack 10 is inserted into the installation groove, to implement fixation. The installation portion 800*b* further includes an interface abutting the battery pack 20, to implement electrical conduction. Certainly, in some other embodiments, other fixation manners may also be adopted, for example, an installation position is a battery cavity, the battery pack 10 is accommodated in the battery cavity, or the battery pack 10 is installed at the installation position through a guide rail or other connection apparatuses.

Preferably, the working baseplate 808 is located at one end of the output shaft of the motor 809, and the installation portion 800*b* is located at one side of the output shaft of the motor 809. The working baseplate 808 is located at the bottom end of the head shell 806 and at one end of the output shaft of the motor 809. That is, the motor 809 is arranged in an up and down direction as shown in FIG. 66 and FIG. 67. Thus, when the operator holds the holding portion 800, a gravity direction of one side of the head shell 806 is downward vertically, so that the operator feels more comfortable and will not feel tired easily.

Preferably, after the handheld sanding machine 100*b* is connected to the battery pack 10, the center of gravity is located at the holding portion 800 or a portion of the head shell 806 close to the holding portion.

The weight of the handheld sanding machine 100*b* is mainly focused on the following members: the motor, the drive component, the working baseplate, and the like. The motor, the drive component, and the working baseplate are disposed in a vertical direction, so that the gravity of the machine body is concentrated. The installation portion 800*b* for installing the battery pack 10 is disposed opposite to the head shell 806, so that after the battery pack 10 is connected to the installation portion 800*b*, the center of the whole machine is concentrated onto the holding portion 800 of the machine body, and then, the operator can extrude a to-be-processed workpiece efficiently under an action of the gravity of the handheld sanding machine 100*b* if the operator holds the sanding machine 100*b* normally, to enhance working efficiency and operate more comfortably.

Preferably, the battery pack 10 is installed on the installation portion 800*b* in an installation direction parallel to the direction of the output shaft of the motor 809. In this embodiment, the battery pack 10 has a battery pack main body extending in a lengthwise direction, and the lengthwise extending direction of the battery pack main body is parallel to the axial direction of the output shaft of the motor 809. During an installation process, one end of the battery pack main body that is extended in the lengthwise direction is inserted into an installation groove at the other side of the installation portion 800*b*, which is away from the head shell 806, in a direction parallel to the axial direction of the output shaft of the motor 809. That is, the end of the battery pack main body is inserted in a vertical direction, to be used conveniently. Furthermore, one side of the head shell 806 and one side of the installation portion 800*b* are balanced efficiently, and the center of the whole machine is concentrated on the holding portion 800 of the machine body, to ensure comfort and stability of operation.

It should be understood that, in some embodiments, the battery pack 10 is installed at the installation portion in an installation direction that forms an included angle with the axial direction of the output shaft of the motor 809. Specifically, the battery pack 10 is installed at the installation portion in an installation direction that inclines forward or backward by a certain angle relative to the axial direction of the output shaft of the motor 809, that is, a vertical direction.

Preferably, a strengthening portion 828 is further disposed between the head shell 806 and the installation portion 800*b*. In this embodiment, the strengthening portion 828 is a connection stiffener and the strengthening portion 828 and the holding portion 800 are disposed alternately. One end of the strengthening portion 828 is connected to a lower side of the head shell 806 and the other end is connected to a lower side of the installation portion 800. As a preferred implementation, the strengthening portion 828 is substantially parallel to the holding portion 800, to further strengthen connection strength and stability of the handheld sanding machine 100*b*.

It should be indicated that, in this embodiment, the head shell 806, the holding portion 800, the strengthening portion 828, and the installation portion 800*b* are all hollow shell structures, that is, the machine body is formed by two half shells through fitting. Thus, the cost is saved, the weight of the machine body is reduced, and the use convenience is enhanced.

For the sander 100*b*, the working baseplate 808 is disposed on the bottom end of the head shell 806, the motor 809 and the drive component are accommodated in the head shell 806, and the installation portion 800*b* is located at the end of the holding portion 800 at one side of the machine body, so that the battery pack 10 and the motor 809 are disposed separately and oppositely, and the operator can keep balanced efficiently in a normal holding situation, to make operation be more comfortable and convenient, satisfy ergonomics, and enhance stability when the operator uses the handheld sander 100*b*. The drive component further includes a tension ring 805 fitted to the working baseplate 808, a support disc 811 for supporting the tension ring 805, and springs 8111 disposed on the support disc 811 for abutting the tension ring 805. The tension ring 805 has a hook surface 851, the working baseplate 808 correspondingly has a hook surface 881, when the working baseplate 808 is not installed on the head shell 806, the hook surface 881 of the working baseplate 808 does not hook the hook surface 851 of the tension ring 805, and the tension ring 805 is located at a high position under an action of the springs 8111. When the working baseplate 808 is installed on the head shell 806, the hook surface 881 and the hook surface 851 are engaged and the tension ring 805 moves downward.

The main body portion 1*b* of the sander 100*b* further has a swing component configured to connect the flat sanding baseplate to the head shell 806 to be used as flat sanding when the working baseplate 808 is replaced as the flat sanding baseplate. The swing component includes swing pins 807*a*, a swing plate 807 connected to the swing pins 807*a*, and limiting columns 807*b* connected to the swing plate 807, and the limiting columns 807*b* and the flat sanding baseplate 808 are fitted. In this embodiment, the swing pins 807*a*, the swing plate 807, and the limiting columns 807*b* are an integrated structure.

The sanding machine 100*b* has a control system, including an operation member disposed one end on the top of the head shell 806 and away from the end of the holding portion 800, where the operation member in this embodiment is set as a form of an operation wrench, and specifically, a pivotal cam wrench 841, and an urging portion 412 is disposed at one side of the cam wrench 841 facing the head shell 806; and a transmission device disposed between the cam wrench 841 and the tension ring 805, configured to convert and transmit pivotal motion of the cam wrench 841, so that the tension ring 805 moves in an axial direction of the motor. The transmission device includes a cam contact rod 842 disposed in the head shell 806 and bearing against the cam portion 841a of the cam wrench 841, a pressure plate 843 driven by the cam contact rod 842 to pivot, and pressure blocks 844 driven by the pressure plate 843 to move along an axial direction of the motor. The cam contact rod 842 is located at one side with the motor 809 in the head shell 806, the cam contact rod 842 is driven by the cam portion 841a of the cam wrench 841 and can move in a direction of the motor axis in the head shell 806, to drive the pressure plate 843 to pivot around a rotation shaft 432 relative to the head shell 806, the motion of the pressure plate 843 drives the pressure blocks 844 to move in a direction parallel to the motor axis, and a bottom end face 442 of each of the pressure blocks 844 bears against an end face 852 of the tension ring 805 to drive the tension ring 805 to move in the axial direction of the motor. The pressure plate 843 in this embodiment is configured to substantially form an annular arm, two opposite sides of the annular arm respectively have a through hole 431, and a pair of pressure blocks 844 are fitted to the through holes 431 of the pressure plate 843 through convex columns 441 formed on the pressure blocks 844, so that motion of the pressure plate 843 may be transmitted to the tension ring 805 through the pressure blocks 844 more stably and uniformly. A second interlocking member 803 that extends in a height direction of the head shell 806 is disposed at the other side of the motor 809 opposite to the cam contact rod 842 in the head shell 806 and the second interlocking member 803 can move in a direction of the motor axis. A first interlocking member 802 is pivotally disposed at the housing on a top of the second interlocking member 803.

The second interlocking member 803 is substantially a rod-shaped member, and sequentially has a resistant portion 831, a support portion 832, a positioning portion 833, and an abutment portion 835 in a height direction, and an elastic member 834 is sleeved over the support portion 832. The first interlocking member 802 is substantially located at a junction of the head shell 806 and the holding portion 800 of the machine body, the first interlocking member 802 is substantially a rocker member and includes a blocking portion 822 and an urging portion 821 respectively located at the two ends of a pivot shaft. The holding portion 800 includes a main switch 804, and a trigger 801 is disposed on the holding portion 800, so that the operator may perform a sliding operation of the main switch 804 when holding the sanding machine 100b. An abutting portion is disposed at one side of the trigger 801 toward the first interlocking member 802 and is used to prevent the trigger 801 from moving when abutting the first interlocking member 802. The abutting portion includes a first extension portion 812 and a second extension portion 813 that are substantially extending parallel to each other. The abutting portion and the trigger 801 in this embodiment are integrally formed, to make the structure be compact and operate conveniently. Certainly, a person skilled in the art may also dispose the abutting portion and the trigger 801 separately. The second extension portion 813 is closer to the main switch 804 compared with the first extension portion 812 and motion of the second extension portion 813 directly causes a change of the main switch 804 between a disconnected state and a triggered state. The holding portion 800 has a first channel 133 for accommodating the first extension portion 812 and allowing it to move therein and a second channel 122 for accommodating the second extension portion 813 and allowing it to move therein.

Figure 68:
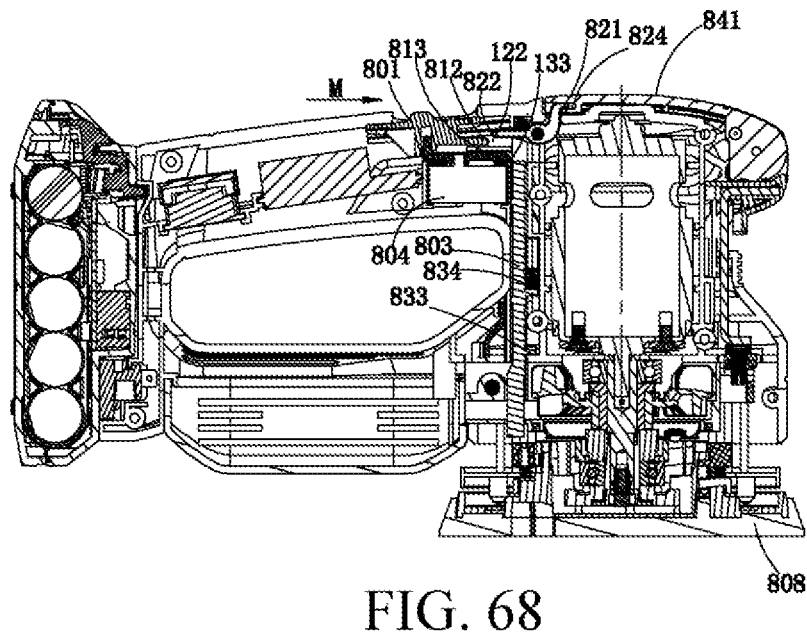
FIG. 68 is a cross-sectional view of the sanding machine in FIG. 66 in a main view direction, where a switch is not triggered by a trigger member.

Further referring to FIG. 68, when the cam wrench 841 is pivoted to a position to be combined with the top of the head shell 806, the urging portion 412 of the cam wrench 841 abuts against a top surface of the head shell 806, the urging portion 821 of the first interlocking member 802 extends into the clamping groove 824 disposed on the urging portion 412 of the cam wrench 841. In this case, the second channel 122 is opened, and the first extension portion 812 of the trigger 801 and the blocking portion 822 of the first interlocking member 802 are separated. In this case, the working baseplate 808 is installed in place, the tension ring 5 moves downward, and the second interlocking member 803 moves downward under an action of an elastic biasing force of the elastic members 834. In this case, the second channel 122 is opened and the positioning portion 833 of the second interlocking member 803 moves to abut against a stiffener in the head shell 806. The first channel 133 and the second channel 122 are opened, to allow the trigger 801 to move in a direction shown by an arrow M, to trigger the main switch 804.

Figure 69:
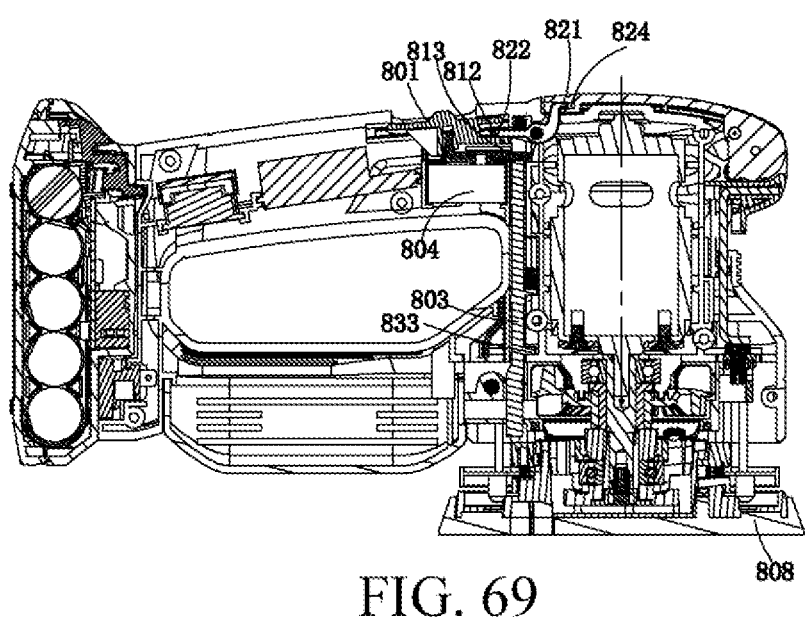
FIG. 69 is a cross-sectional view of the sanding machine in FIG. 66 in a main view direction, where the switch is triggered by the trigger member.

As shown in FIG. 69, when the trigger 801 moves to a position to trigger the main switch 804, the first extension portion 812 of the trigger abuts against the blocking portion 822 of the first interlocking member 802, and correspondingly, the second extension portion 813 of the trigger moves to be above the second interlocking member 803 and blocks the channel for the second interlocking member 803 to move upward. The trigger 801, the first interlocking member 802, and the cam wrench 841 are disposed in such a manner that, when the main switch 804 is triggered to start, the blocking portion 822 and the urging portion 821 of the first interlocking member 802 are limited and cannot move, and the cam wrench 841 clamped with the urging portion 821 through the clamping groove 824 cannot be pivoted or folded to be in an open state, and the tension ring 805 cannot be pressed downward and the working baseplate 808 can not be disassembled from the drive component. Thus, when the main switch 804 is started, since the trigger 801 forms a first interlocking relationship with the first interlocking member 802 and the cam wrench 841, the working baseplate 808 cannot be separated from the tension ring 805, to ensure secure operation of the working baseplate 808.

Figure 70:
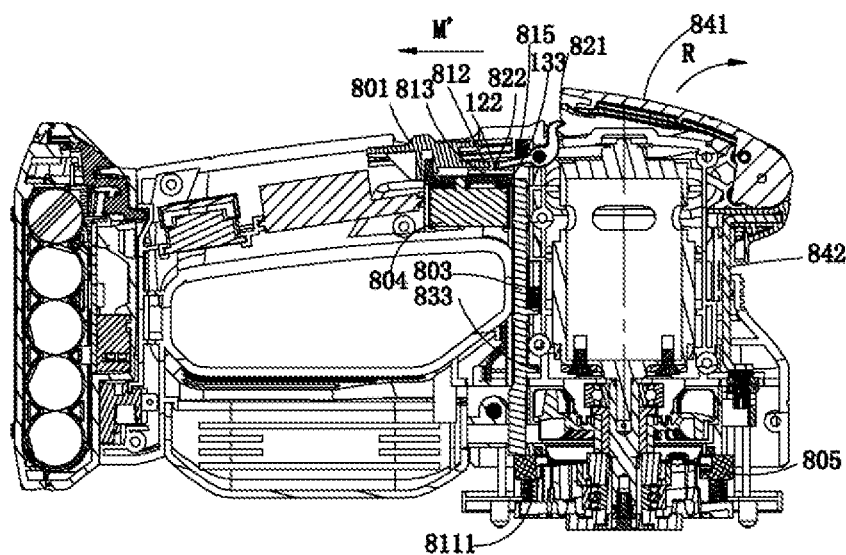
FIG. 70 is a cross-sectional view of the sanding machine in FIG. 66 in a main view direction, where a working baseplate is disassembled and an operation wrench is at an opened position.

As shown in FIG. 70, only when the trigger 801 moves to an initial position along a direction shown by an arrow M', that is, when trigger 801 moves to a position for disconnecting the main switch 804, the first channel 133 and the second channel 122 are opened respectively, to provide a space for pivoting the blocking portion 822 of the first interlocking member 802, the first interlocking member 802 pivots under an action of the pressure springs 815, so that the blocking portion 822 blocks the second channel 122, when the first interlocking member 802 is pivoting, the urging portion 821 of the first interlocking member 802 is disconnected from the clamping groove 824 of the cam wrench 841, so that the cam wrench 841 is unlocked and can pivot around a pivot in a direction shown by an arrow R. When the cam wrench 841 is pivoted to a preset extreme position, pivoting motion of the cam wrench 841 is transmitted to the tension ring 805 through a transmission device, that is, the tension ring 805 is pressed downward to move to a position for disconnecting the working baseplate 808 from the tension ring 805.

Once the working baseplate 808 is separated from the tension ring 805, under an action of the springs 8111, the tension ring 805 overcomes an acting force of the elastic members 834 to move upward, to support up the second interlocking member 803. In this case, the positioning portion 833 of the second interlocking member 803 moves to be separated from the stiffener in the head shell 806, and the top of the second interlocking member 803 extends into the second channel 122 to block the second extension portion 813 from moving in the direction of the arrow M. That is, when the working baseplate 808 is disassembled or is not installed and fitted to the tension ring 805, the trigger 801 cannot move and cannot trigger the main switch 804. A second interlocking relationship is formed between the second interlocking member 803, the trigger 801, and the tension ring 805.

Figure 71:
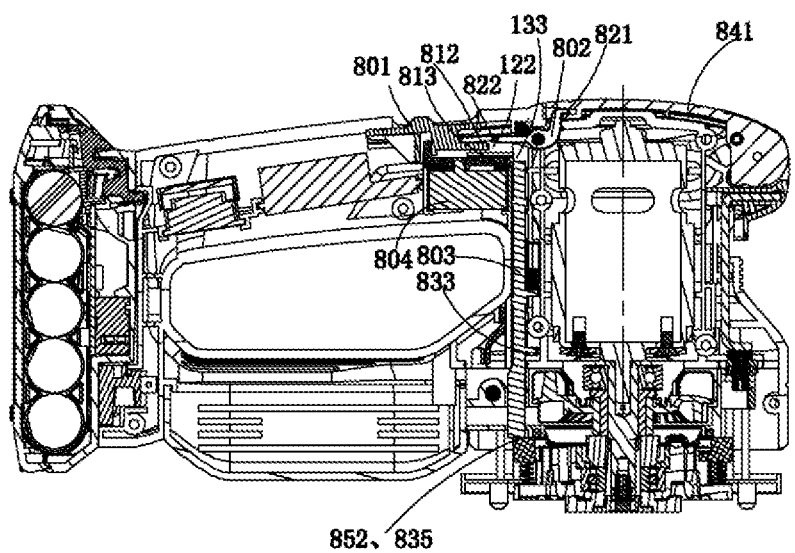
FIG. 71 is a cross-sectional view of the sanding machine in FIG. 66 in a main view direction, where the working baseplate is disassembled and the operation wrench is at a closed position.

As shown in FIG. 71, when the working baseplate 808 is not connected to the tension ring 805, even if the cam wrench 841 is pivoted to a closed position, an end face 852 of the tension ring abuts against the abutment portion 835 of the second interlocking member to support up the second interlocking member 803, the second channel 122 is blocked by the second interlocking member 803, so that the trigger 801 still cannot move along the direction of the arrow M to trigger the main switch 804.

In view of the above, the first interlocking relationship ensures secure operation of the working baseplate when the sanding machine is working. The second interlocking relationship embodies that only when the working baseplate 808 is installed in place, that is, the working baseplate 802 is fitted to the tension ring 805 and the cam wrench 841 restores to the closed position, the main switch 804 can be started to perform a starting operation, to ensure validity of operation of the sanding machine.

The cam wrench 841, as an operation member, may rotate relative to the housing around a fixed pivot shaft or a non-fixed pivot shaft, that is, the operation member may be disposed reversibly relative to the housing.

Embodiment 12

Referring to FIG. 72 to FIG. 75, the sanding machine according to yet another embodiment of the present invention includes a housing 900, an electric motor disposed in the housing 900, and a grinding element disposed under the housing 900, that is, the working baseplate 902 performs a sanding operation on an object. The controller is disposed on the housing 900, the electric motor is electrically connected to the controller and is controlled by the controller, and the controller can control a rotation speed and a rotation direction of the electric motor. The sander further includes a detection sensor 905, configured to detect whether the working baseplate 902 is installed, output a first detection signal when the working baseplate 902 is in an installation state, and output a second detection signal when the working baseplate 902 is in a non-installation state, and when the detection sensor output the second detection signal, the controller controls the electric motor not to operate.

The sander detects whether the working baseplate 902 is installed through the detection sensor 905, to control whether to start the electric machinery. When the working baseplate 902 is not installed, the electric motor is controlled not to operate, to prevent the electric motor from starting and operating abnormally to drive an exposed output end to rotate, causing a security problem.

In an embodiment, the detection sensor 905 includes a detection element, a trigger element is installed on the working baseplate 902, and when the detection element senses the trigger element, the detection sensor outputs the first detection signal, and in this case, the electric motor can operate. When the detection element does not sense the trigger element, the detection sensor outputs the second detection signal, and the controller controls the electric machinery not to operate.

Figure 75:
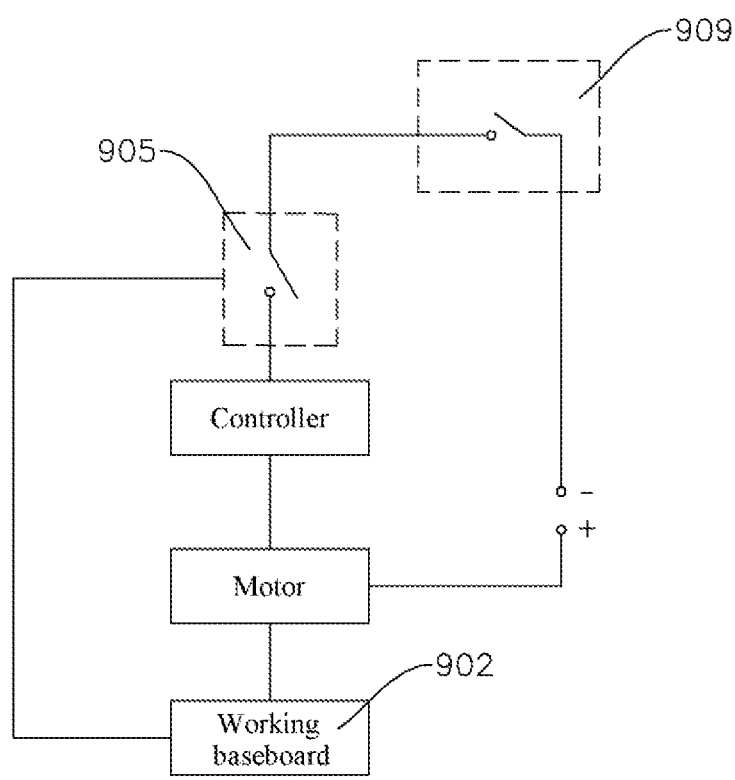
FIG. 75 is a schematic diagram of a working principle of a detection sensor of the sanding machine in FIG. 74.

Specifically, the detection element and the trigger element may be triggered in a contact-type manner. Preferably, the detection element is a micro switch and the trigger element is a trigger lever 966. When the working baseplate 902 is in the installation state, the trigger lever 966 can contact with the micro switch and enable the micro switch to output the first detection signal, and in this case, the controller can control the electric motor to operate. When the working baseplate 902 is in the non-installation state, the trigger lever 966 can be separated from the micro switch and enable the micro switch to output the second detection signal, and in this case, the controller can control the electric machinery not to operate. As shown in FIG. 75, specifically, the micro switch is serially connected in a control circuit between the controller and the electric machinery and the control circuit is connected or disconnected through the micro switch. When the working baseplate 902 is not detected to be installed, the micro switch disconnects the control circuit, and in this case, the controller cannot control the electric machinery to start operation. The sanding machine further has a main switch 909, and the main switch 909 is electrically connected to the control circuit and used to control ON and OFF of the control circuit. When the working baseplate 902 is installed, the micro switch is in a connected state, and in this case, the main switch is turned on, and the control circuit is connected and controls the electric machinery to operate to drive the working baseplate 902 to perform a sanding operation. When the working baseplate 902 is disassembled, the micro switch is in a disconnected state, and in this case, even if the main switch is turned on, the control circuit is also in a disconnected state, and in this case, the electric machinery cannot operate.

The trigger lever 966 may also be disposed on the housing 900 of the sander. Specifically, the sander further includes a drive disc 907, an output end of the electric motor is connected to the drive disc 907, the drive disc 907 is connected to the working baseplate 902, the trigger lever 966 is disposed between the swing pins 906 and the drive disc 907 of the sanding machine and is disposed perpendicular to the working baseplate 902. When the working baseplate 902 is installed, the working baseplate 902 supports up the trigger lever 966 and then is connected with the micro switch, the micro switch outputs the first detection signal, that is, connecting the control circuit, and the controller can control the electric motor to operate. After the working baseplate 902 is disassembled, the trigger lever 966 is reset, the micro switch is in a disconnected state, the micro switch outputs the second detection signal, thereby disconnecting the control circuit, and the controller controls the electric machinery not to operate. Specifically, the housing 900 has a through hole, and one end of a guide rod extends out of the through hole, to control the micro switch to be connected and disconnected. After the working baseplate 902 is installed, an upper surface of the working baseplate 902 supports up the guide rod. An elastic member, such as a spring, is disposed on the guide rod, and can reset the guide rod to disconnect from the micro switch through an elastic force after the working baseplate 902 is disassembled.

The detection element and the trigger element may also be triggered in a non-contact-type manner. Preferably, the detection element is a Hall sensor, and the trigger element is magnetic steel. When the Hall sensor detects the magnetic steel, the Hall sensor outputs a first detection signal. In this case, the controller may control the electric machinery to rotate. When the Hall sensor does not detect the magnetic steel, the Hall sensor outputs a second detection signal. In this case, the controller controls the electric machinery not to operate. The detection sensor 500 may further be a non-contact-type sensor such as an electromagnetic sensor, a photoelectric sensor, a differential transformer type sensor, an eddy current type sensor, a capacitor type sensor, and a reed switch type sensor. The foregoing sensors are used to detect whether the working baseplate 902 is installed.

The working baseplate 902 includes a sand board, a sand wheel, a sand belt, or a polishing wheel.

Figure 72:
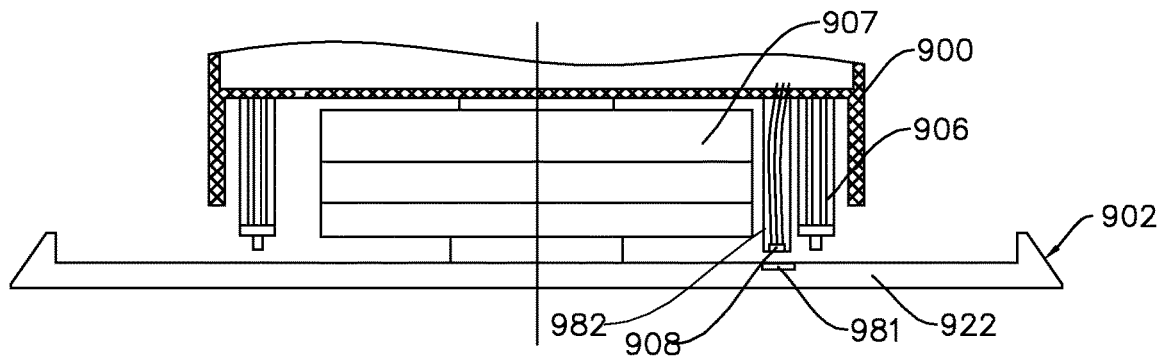
FIG. 72 is a schematic structural diagram of a sanding machine according to Embodiment 12 of the present invention.
Figure 73:
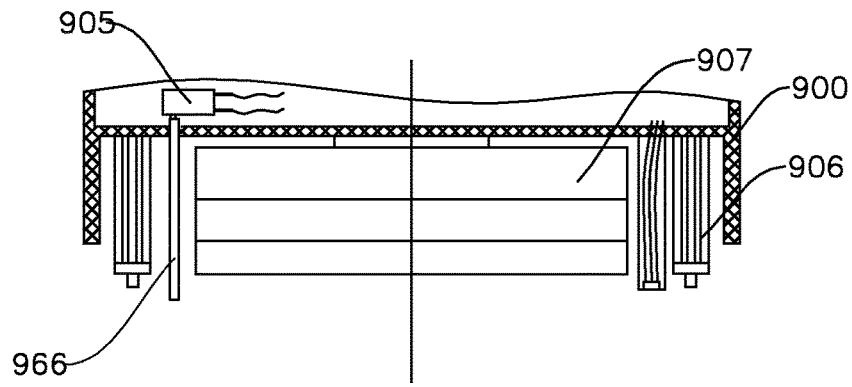
FIG. 73 is a simple deformation of the sanding machine in FIG. 72, where a working baseplate is not installed.
Figure 74:
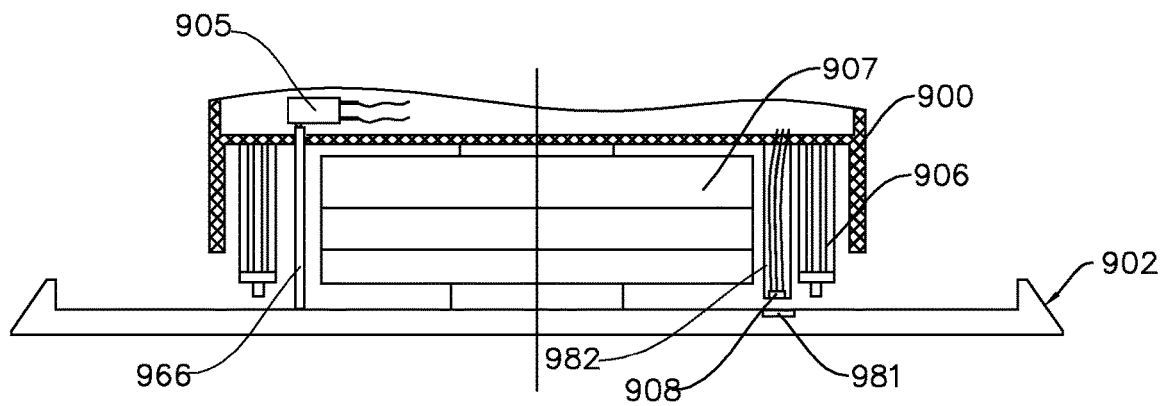
FIG. 74 shows a state in which the working baseplate is installed on the sanding machine in FIG. 73.

Furthermore, as shown in FIG. 72 and FIG. 74, the sanding machine further includes an identification sensor 908, and the identification sensor 908 is electrically connected to the controller. The identification sensor 908 is configured to identify whether the working baseplate 902 is provided with a sensing element 981. When the sensing element 981 is installed on the working baseplate 902, the identification sensor 908 outputs a first identification signal. When the sensing element 981 is not installed on the working baseplate 902, the identification sensor 908 outputs a second identification signal. The controller can correspondingly output a first speed and a second speed of the electric motor according to the first identification signal and the second identification signal.

An operation speed of the electric motor may be controlled and changed intelligently by using the identification sensor 908 to identify the sensing element 981. After a different type of working baseplate 902 is replaced, manual adjustment is no longer required, through identification of the identification sensor 908, the controller can be controlled to adjust the speed of the electric machinery to a reasonable speed required by a different working baseplate, and the operation is intelligent, convenient, secure, reliable, and high-efficient.

The first speed and the second speed are preset in the controller.

The identification sensor 908 can also identify different sensing elements to generate different identification information and the identification sensor 908 transmits identification information to the controller, and the controller controls the operation speed of the electric motor according to different identification information. The identification sensor 908 may be an RFID sensor, the sensing element is a radio frequency tag, the RFID sensor reads different radio frequency tags and transmits the identification information to the controller, and the controller controls the electric machinery according to different identification information, so that the electric machinery operates at different speeds.

A sand board is a round sand board or a flat sand board. Sand boards with different shapes are installed to implement multi-functional grinding for different grinding situations. The flat sand board and the round sand board need different rotation speeds during a grinding process, and generally, the round sand board rotates at a high speed and the flat sand board rotates at a lower speed. To implement a function for performing intelligent speed distribution according to different sand boards, the round sand board has the sensing element 981 and the flat sand board does not have the sensing element 981; therefore, the identification sensor 908 can identify whether the sand board is the round sand board or the flat sand board according to whether the sensing element 981 exists. The identification sensor 908 further controls the controller to change the preset speed of the electric machinery, to control the electric machinery to operate at a suitable speed required by a different sand board.

Preferably, the sensing element 981 is disposed on the flat sand board. Because the round sand board is a round symmetric structure, when the sensing element 981 is disposed on the round sand board, the round sand board needs to rotate to a suitable position when the sensing element 981 is opposite to the identification sensor 908. It is relatively easy install the flat sand board 922 to make the sensing element 981 opposite to the identification sensor 908. In this case, the second speed is greater than the first speed. When the sand board is replaced to be the round sand board, the identification sensor 908 does not identify the sensing element 981, the identification sensor 908 outputs the second identification signal, and the controller controls the electric motor to operate at the second speed, that is, operate at a high speed. When the sand board is replaced to be the flat sand board and the identification sensor 908 identifies the sensing element 981, the identification sensor 908 outputs the first identification signal and the controller controls the electric machinery to operate at the first speed, that is, operate at a low speed.

Preferably, the identification sensor 908 is a Hall sensor, and the sensing element 981 is magnetic steel. When the Hall sensor detects the flat sand board with magnetic steel, the Hall sensor outputs the first identification signal, so that the controller controls the speed of the electric machinery to be the first speed. The identification sensor 908 may further be a photoelectric sensor, and preferably a reflective plate type photoelectric switch, and the sensing element 981 is a reflective plate. When the round sand board without the reflective plate is installed, light emitted by the reflective plate type photoelectric switch is blocked by the round sand board and cannot be recovered. In this case, the reflective plate type photoelectric switch outputs the second identification signal, so that the controller controls the speed of the electric machinery to be the second speed.

The sanding machine further includes a connection column 982, the connection column 982 has one end extending toward the working baseplate 902, and the identification sensor 908 is disposed at one end of the connection column 982 close to the working baseplate 902.

The sanding machine further includes a drive disc 907, the output end of the electric machinery is connected to the drive disc 907, the drive disc 907 is connected to the working baseplate 902, and the connection column 982 is disposed between the swing pins 906 and the drive disc 907 of the sanding machine.

The identification sensor 908 is disposed facing the sensing element 981.

Embodiment 13

Figure 76:
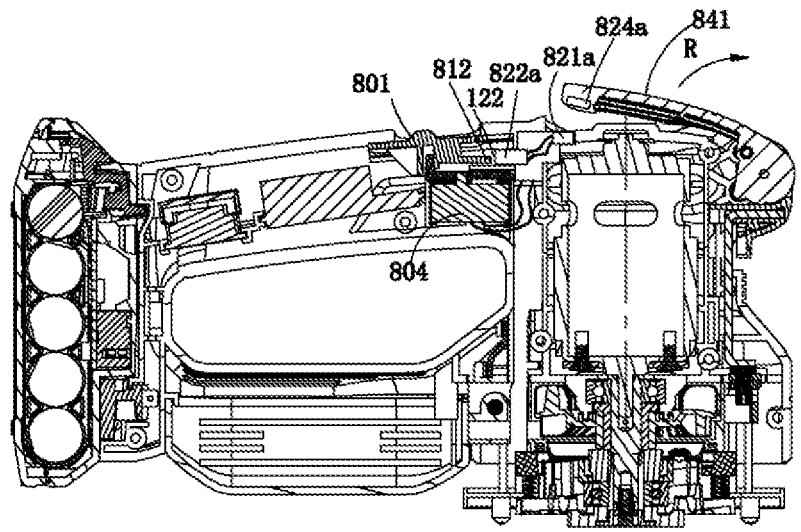
FIG. 76 is a schematic structural diagram of a secure interlocking mechanism of a sanding machine according to Embodiment 13 of the present invention.
Figure 77:
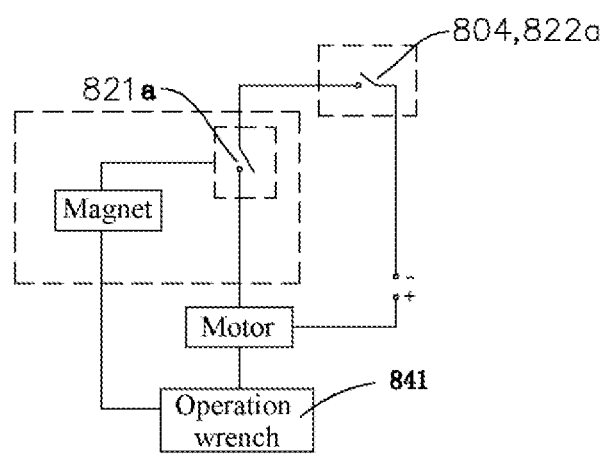
FIG. 77 is a diagram of a working principle of a circuit of the sanding machine in FIG. 76.

Referring to FIG. 76 and FIG. 77, this embodiment is a deformation of the secure interlocking structure of the sanding machine in Embodiment 11. In this embodiment, the secure interlocking mechanism does not have the second interlocking member, an electronic control apparatus replaces the first interlocking member, and the other same structures are represented by the same reference numerals and will not be repeated.

In this embodiment, the electronic control apparatus is disposed in the housing, that is, the position where the first interlocking member is located in Embodiment 11, specifically, located at a connection position of the holding portion and the head shell portion, and the electronic control apparatus includes a first functional module and a second functional module. The first functional module includes a position sensor for detecting the position of the operation member, that is, the cam wrench 841, and electromagnet generating magnetism after being electrified. In addition, a magnet 824*a* is disposed at a portion of a free end of the cam wrench 841 fitted to the first functional module. In this embodiment, the second functional module includes a linkage switch 822*a* serially connected to the switch 804, and the linkage switch 822*a* and the switch 804 are triggered by the trigger member 801 at the same time.

Referring to FIG. 77, the position sensor in this embodiment is set as in a form of a micro switch 821*a*. When the cam wrench 841 is in a first state in which the cam wrench 841 is fitted to the first functional module, the free end of the cam wrench 841 triggers the micro switch 821*a*. In this case, if the trigger member 801 is operated to move toward the switch 804, the switch 804 may be triggered. Once the switch 804 is in a triggered state, the linkage switch 822*a* is triggered by the trigger member 801, to conduct a working circuit of the sanding machine, the electromagnet is electrified to generate magnetism to generate magnetic attraction with the magnet 824*a* of the free end of the cam wrench 841, to prevent the cam wrench 841 in the first state from being converted to a second state in which the cam wrench 841 is separated from the first functional module 821*a*.

When the cam wrench 841 is in a second state in which the cam wrench 841 is separated from the first functional module, the micro switch 821*a* is in a disconnected state, so that even if the trigger member 801 is triggered, the circuit cannot be conducted, and therefore, the motor cannot be started.

Embodiment 14

Figure 78:
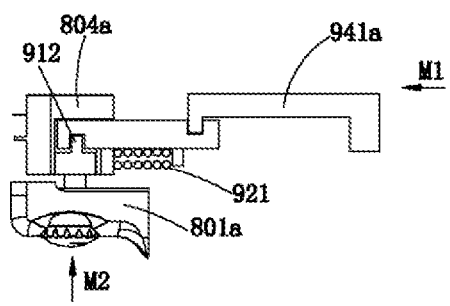
FIG. 78 is a schematic structural diagram of State 1 of a secure interlocking mechanism of a sanding machine according to Embodiment 14 of the present invention.
Figure 79:
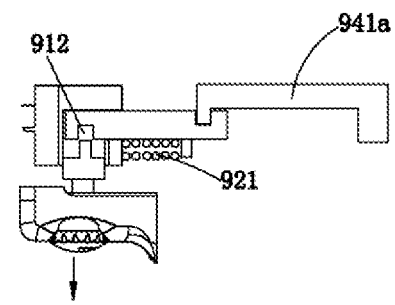
FIG. 79 is a schematic structural diagram of State 2 of the secure interlocking mechanism in FIG. 78.
Figure 80:
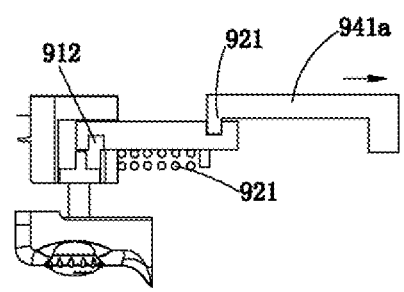
FIG. 80 is a schematic structural diagram of State 3 of the secure interlocking mechanism in FIG. 78.

Referring to FIG. 78 to FIG. 80, this embodiment is another deformation of the secure interlocking mechanism of the sanding machine in Embodiment 13. The same structures are represented by the same reference numerals and will not be repeated.

The operation member 841*a* is disposed slidably relative to the housing (not shown) of the sanding machine, when the operation member 841*a* slides from the first state to the second state in a direction shown by an arrow M1 in FIG. 78, and the trigger member 801*a* can trigger the switch 804*a* along the direction of the arrow M2. The operation member 841*a* overcomes an acting force of the springs 921 during a process of moving from the first state to the second state. When the switch 804*a* is at the triggered position, one end of the trigger member 801*a* is engaged with the groove 912 of the operation member 841*a*, to prevent the operation member 841*a* from sliding from the second state to the first state.

As shown in FIG. 79, when the state of the operation member 841*a* needs to be changed, that is, the operation member 841*a* is shifted from the second state to the first state, the trigger member 801*a* needs to be released first, so that the trigger member 801*a* restores to a position, where the switch 804*a* is disconnected, along a direction opposite to the arrow M2 under an action of the elastic force of the trigger member 801*a*. That is, one end of the trigger member 801*a* stops being engaged with the groove 912.

As shown in FIG. 80, when one end of the trigger member 801*a* is disconnected from the groove 912 of the operation member 841*a*, under a restoring force of the springs 921, the operation member 841*a* is shifted from the second state to the first state along a direction opposite to the arrow M1. In this case, one end of the trigger member 801*a* abuts against one end of the operation member 841*a*, that is, the operation member 841*a* prevents the switch from being triggered by the trigger 801*a*.

The embodiments above merely represent several embodiments of the present invention, and the description thereof is specific and detailed, but is not to be construed as a limitation on the protection scope of the present invention. It should be noted that a person of ordinary skill in the art may make some variations and modifications without departing from the concept of the present invention. Therefore, the protection scope of the present invention is subject to the attached claims.

What is claimed is:

1. A sander comprising:
a main body comprising a housing;
a motor being disposed in the housing;
a switch mechanism for starting or stopping the motor, and the switch mechanism comprise a switch;
and a drive component being driven by the motor to rotate;
a working head adapted to the drive component;
wherein the main body further comprises an interlocking mechanism, the interlocking mechanism comprises an operation member movably disposed relative to the housing, the operation member is operably shifted between a first state and a second state, when the operation member is in the first state, the interlocking mechanism allows the switch to be triggered, when the switch is in a triggered state, the operation member is prevented from being shifted from the first state to the second state; and when the operation member is in the second state, the interlocking mechanism prevents the switch from being triggered;
wherein the switch mechanism further comprises a trigger member, the interlocking mechanism comprises a first interlocking member selectively engaged to or separated from the operation member; when the operation member is in the first state, the first interlocking member is engaged to the operation member and allows the trigger member to trigger the switch, and when the switch is in a triggered state in which the motor is started, the operation member is prevented from being separated from the first interlocking member; and when the operation member is in the second state, the first interlocking member is separated from the operation member, and the first interlocking member prevents the trigger member from triggering the switch; and
wherein the interlocking mechanism further comprising an abutting member capable of abutting against or getting separated from the first interlocking member, when the operation member is in the first state, the abutting member is separated from the first interlocking member and the trigger member can be moved to trigger the switch; and when the operation member is in the second state, the abutting member abuts against the first interlocking member to prevent the trigger member from triggering the switch.

2. The sander according to claim 1, wherein the abutting member and the trigger member are integrally formed.

3. The sander according to claim 1, wherein the operation member is foldable relative to the housing.

4. The sander according to claim 3, wherein the operation member is configured to be a cam wrench, the cam wrench comprises a handle portion and a cam portion, the cam portion is connected to the housing, and the handle portion comprises a free end.

5. The sander according to claim 1, wherein the housing comprises a head portion for accommodating the motor and a holding portion provided with a handle, the operation member is connected to the head portion, and the trigger member is disposed at the holding portion, the trigger member is slidably disposed along an extending direction of the holding portion, when the first interlocking member is engaged to the operation member, the first interlocking member allows the trigger member to slide; and when the first interlocking member is separated from the operation member, the first interlocking member prevents the trigger member from sliding.

6. The sander according to claim 1, wherein the working head comprises at least two baseplates having different shapes and one of the baseplates is selectively to be separated from or engaged to the drive component.

\* \* \* \* \*